(12) United States Patent
Sugimoto

(10) Patent No.: US 10,808,824 B2
(45) Date of Patent: Oct. 20, 2020

(54) BICYCLE SPROCKET ASSEMBLY

(71) Applicant: SHIMANO INC., Sakai (JP)

(72) Inventor: Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 231 days.

(21) Appl. No.: 15/649,610

(22) Filed: Jul. 13, 2017

(65) Prior Publication Data

US 2019/0017586 A1    Jan. 17, 2019

(51) Int. Cl.
  *F16H 55/30* (2006.01)
  *B62M 9/10* (2006.01)

(52) U.S. Cl.
  CPC .............. *F16H 55/30* (2013.01); *B62M 9/10* (2013.01)

(58) Field of Classification Search
  CPC .......... B62M 9/10; B62M 9/105; B62M 9/12; B62M 9/122; F16H 55/08
  USPC ......................................................... 474/160
  See application file for complete search history.

(56) References Cited

U.S. PATENT DOCUMENTS

| | | | | |
|---|---|---|---|---|
| 4,174,642 A * | 11/1979 | Martin | ..................... | F16H 55/30 474/152 |
| 5,192,248 A * | 3/1993 | Nagano | ..................... | B62M 9/10 474/140 |
| 5,971,878 A * | 10/1999 | Leng | ........................ | F16H 55/30 474/160 |
| 6,007,442 A * | 12/1999 | Schmidt | ................... | B62M 9/10 474/122 |
| 6,340,338 B1 * | 1/2002 | Kamada | ................... | B62M 9/10 474/152 |
| 6,572,500 B2 * | 6/2003 | Tetsuka | .................... | B62M 9/10 474/160 |
| 8,092,329 B2 * | 1/2012 | Wickliffe | ............... | B62M 9/105 474/160 |
| 8,235,850 B2 * | 8/2012 | Lin | ........................ | B62M 9/105 474/160 |
| 8,550,944 B2 * | 10/2013 | Esquibel | .................. | B62M 9/10 474/160 |
| 8,617,015 B2 * | 12/2013 | Wickliffe | ................ | F16H 55/30 474/160 |
| 8,968,130 B2 * | 3/2015 | Liao | ......................... | B62M 9/10 474/160 |
| 8,978,514 B2 * | 3/2015 | Shiraishi | ................ | B62M 9/105 74/594.2 |
| 9,011,282 B2 * | 4/2015 | Staples | .................... | B62M 9/12 474/160 |

(Continued)

*Primary Examiner* — Henry Y Liu
(74) *Attorney, Agent, or Firm* — Mori & Ward, LLP

(57) ABSTRACT

A bicycle sprocket assembly comprises a first sprocket. The first sprocket comprises a first sprocket body, a shifting facilitation area, and a plurality of first sprocket teeth. The plurality of first sprocket teeth includes a plurality of first teeth and a plurality of second teeth. The plurality of first teeth includes a shifting-facilitation tooth and a first driving tooth. A maximum axial top width of the shifting-facilitation tooth is smaller than a maximum axial bottom width of the shifting-facilitation tooth. The maximum axial top width of the shifting-facilitation tooth is smaller than a maximum axial top width of the first driving tooth. The plurality of second teeth includes a second driving tooth extending radially outwardly from the first sprocket body. The plurality of second teeth has a maximum axial width smaller than a maximum axial bottom width of the first driving tooth.

23 Claims, 43 Drawing Sheets

(56) References Cited

U.S. PATENT DOCUMENTS

| | | | | |
|---|---|---|---|---|
| 9,086,138 B1* | 7/2015 | Emura | | B62M 9/105 |
| 9,404,565 B2* | 8/2016 | Pfeiffer | | B62M 9/10 |
| 9,457,870 B2* | 10/2016 | Sugimoto | | B62M 9/105 |
| 9,463,844 B2* | 10/2016 | Fukunaga | | B62M 9/10 |
| 9,581,230 B2* | 2/2017 | Pfeiffer | | F16H 7/06 |
| 9,631,714 B2* | 4/2017 | Watarai | | F16H 55/30 |
| 9,701,364 B2* | 7/2017 | Sugimoto | | B62M 1/36 |
| 9,719,590 B2* | 8/2017 | Reiter | | F16H 55/30 |
| 9,873,481 B2* | 1/2018 | Braedt | | B62M 9/10 |
| 9,963,196 B2* | 5/2018 | Sugimoto | | F16H 55/303 |
| 10,358,186 B2* | 7/2019 | Sugimoto | | B62M 9/105 |
| 10,359,106 B2* | 7/2019 | Akanishi | | B62M 9/10 |
| 2005/0282671 A1* | 12/2005 | Emura | | B62M 9/06 |
| | | | | 474/160 |
| 2007/0054768 A1* | 3/2007 | Miyazawa | | F16H 55/30 |
| | | | | 474/152 |
| 2010/0081531 A1* | 4/2010 | Esquibel | | B62M 9/10 |
| | | | | 474/160 |
| 2010/0137086 A1* | 6/2010 | Lin | | B62M 9/105 |
| | | | | 474/160 |
| 2013/0139642 A1* | 6/2013 | Reiter | | B62M 9/105 |
| | | | | 74/594.2 |
| 2014/0338494 A1* | 11/2014 | Sugimoto | | B62M 1/36 |
| | | | | 74/594.2 |
| 2015/0191214 A1* | 7/2015 | Emura | | B62M 3/00 |
| | | | | 74/594.2 |
| 2015/0198231 A1* | 7/2015 | Emura | | B62M 9/105 |
| | | | | 474/156 |
| 2015/0337943 A1* | 11/2015 | Sugimoto | | B62M 9/02 |
| | | | | 474/152 |
| 2015/0362057 A1* | 12/2015 | Wesling | | F16H 55/06 |
| | | | | 474/152 |
| 2016/0101825 A1* | 4/2016 | Braedt | | B62M 9/12 |
| | | | | 474/160 |
| 2016/0347409 A1* | 12/2016 | Watarai | | B62M 9/02 |
| 2017/0355422 A1* | 12/2017 | Sugimoto | | F16H 55/303 |
| 2018/0290712 A1* | 10/2018 | Taniguchi | | B62M 9/12 |

* cited by examiner

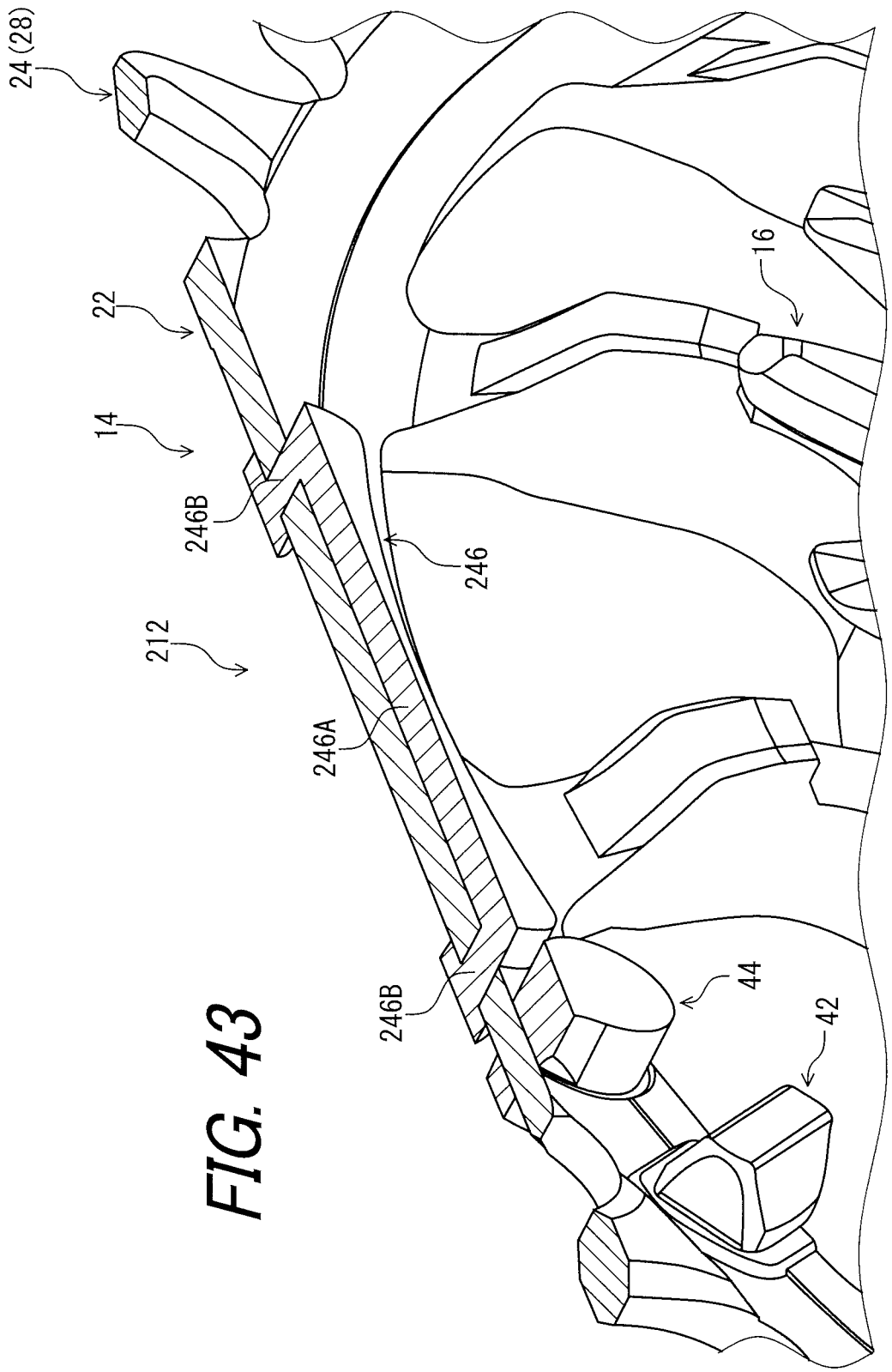

BICYCLE SPROCKET ASSEMBLY

BACKGROUND OF THE INVENTION

Field of the Invention

The present invention relates to a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly.

SUMMARY OF THE INVENTION

In accordance with a first aspect of the present invention, a bicycle sprocket assembly comprises a first sprocket. The first sprocket comprises a first sprocket body, a shifting facilitation area, and a plurality of first sprocket teeth. The first sprocket body has a rotational center axis. The shifting facilitation area is to facilitate a shifting operation in which a bicycle chain is shifted between the first sprocket and a second sprocket adjacent to the first sprocket. The plurality of first sprocket teeth each has a maximum axial top width and a maximum axial bottom width. The plurality of first sprocket teeth includes a plurality of first teeth and a plurality of second teeth. The plurality of first teeth is configured to engage with an outer link space provided between an opposed pair of outer link plates of the bicycle chain. The plurality of first teeth includes a shifting-facilitation tooth and a first driving tooth. The shifting-facilitation tooth extends radially outwardly from the first sprocket body. The shifting-facilitation tooth is provided in the shifting facilitation area. The maximum axial top width of the shifting-facilitation tooth is smaller than the maximum axial bottom width of the shifting-facilitation tooth. The first driving tooth extends radially outwardly from the first sprocket body. The first driving tooth is provided outside the shifting facilitation area. The maximum axial top width of the shifting-facilitation tooth is smaller than the maximum axial top width of the first driving tooth. The plurality of second teeth is configured to engage with an inner link space provided between an opposed pair of inner link plates of the bicycle chain. The plurality of second teeth includes a second driving tooth extending radially outwardly from the first sprocket body. The second driving tooth is provided outside the shifting facilitation area. The plurality of second teeth has the maximum axial width smaller than the maximum axial bottom width of the first driving tooth.

With the bicycle sprocket assembly according to the first aspect, it is possible to improve chain-holding performance with facilitating the shifting operation since the maximum axial top width of the shifting-facilitation tooth is smaller than the maximum axial top width of the first driving tooth.

In accordance with a second aspect of the present invention, the bicycle sprocket assembly according to the first aspect is configured so that the shifting-facilitation tooth has a first radial height extending radially outwardly from the first sprocket body to a radially outermost edge of the shifting-facilitation tooth. The first driving tooth has a second radial height extending radially outwardly from the first sprocket body to a radially outermost edge of the first driving tooth. The first radial height is smaller than the second radial height.

With the bicycle sprocket assembly according to the second aspect, the first radial height smooths insertion of the shifting-facilitation tooth into the outer link space of the bicycle chain.

In accordance with a third aspect of the present invention, the bicycle sprocket assembly according to the first or second aspect is configured so that the shifting-facilitation tooth has a first radial height extending radially outwardly from the first sprocket body to a radially outermost edge of the shifting-facilitation tooth. The second driving tooth has a third radial height extending radially outwardly from the first sprocket body to a radially outermost edge of the second driving tooth. The first radial height is smaller than the third radial height.

With the bicycle sprocket assembly according to the third aspect, the first radial height smooths insertion of the shifting-facilitation tooth into the outer link space of the bicycle chain.

In accordance with a fourth aspect of the present invention, the bicycle sprocket assembly according to any one of the first to third aspects is configured so that the first sprocket comprises a first shifting facilitation projection to facilitate the shifting operation. The shifting-facilitation tooth is provided on an upstream side of the first shifting facilitation projection in a first circumferential direction in which the bicycle sprocket assembly is rotated about the rotational center axis during pedaling.

With the bicycle sprocket assembly according to the fourth aspect, the first shifting facilitation projection enables the shifting-facilitation tooth to first receive the bicycle chain in the shifting operation.

In accordance with a fifth aspect of the present invention, the bicycle sprocket assembly according to the fourth aspect is configured so that the shifting-facilitation tooth is spaced apart from the first shifting facilitation projection by a first distance corresponding to two chain pitches of the bicycle chain.

With the bicycle sprocket assembly according to the fifth aspect, the first distance effectively enables the shifting-facilitation tooth to first receive the bicycle chain in the shifting operation.

In accordance with a sixth aspect of the present invention, the bicycle sprocket assembly according to the fourth or fifth aspect is configured so that the shifting-facilitation tooth is configured to be first engaged with an outer link space of the bicycle chain in a first shifting operation in which the bicycle chain is shifted from the second sprocket to the first sprocket. The first sprocket has a first pitch-circle diameter larger than a second pitch-circle diameter of the second sprocket.

With the bicycle sprocket assembly according to the sixth aspect, the shifting-facilitation tooth facilitates the first shifting operation.

In accordance with a seventh aspect of the present invention, the bicycle sprocket assembly according to any one of the first to sixth aspects is configured so that the plurality of second teeth includes a derailing tooth configured to first derail the bicycle chain from the first sprocket in a second shifting operation in which the bicycle chain is shifted from the first sprocket to the second sprocket. The first sprocket has a first pitch-circle diameter larger than a second pitch-circle diameter of the second sprocket. The shifting-facilitation tooth is provided on a downstream side of the derailing tooth in a first circumferential direction in which the bicycle sprocket assembly is rotated about the rotational center axis during pedaling.

With the bicycle sprocket assembly according to the seventh aspect, the shifting-facilitation tooth smooths derailing of the bicycle chain from the first sprocket at the derailing tooth in the second shifting operation.

In accordance with an eighth aspect of the present invention, the bicycle sprocket assembly according to the seventh aspect is configured so that the shifting-facilitation tooth is adjacent to the derailing tooth in the first circumferential direction without another tooth between the shifting-facilitation tooth and the derailing tooth.

With the bicycle sprocket assembly according to the eighth aspect, the shifting-facilitation tooth further smooths derailing of the bicycle chain from the first sprocket at the derailing tooth in the second shifting operation.

In accordance with a ninth aspect of the present invention, the bicycle sprocket assembly according to any one of the first to eighth aspects is configured so that each of the plurality of first sprocket teeth includes a bottom portion and a top portion extending radially outwardly from the bottom portion. The bottom portion has the maximum axial bottom width of each of the plurality of first sprocket teeth. The top portion has the maximum axial top width of each of the plurality of first sprocket teeth. The first sprocket has a reference circle with respect to a rotational center axis of the bicycle sprocket assembly. The bottom portion is provided radially inwardly of the reference circle. The top portion is provided radially outwardly of the reference circle.

With the bicycle sprocket assembly according to the ninth aspect, it is possible to improve chain-holding performance with facilitating the shifting operation.

In accordance with a tenth aspect of the present invention, the bicycle sprocket assembly according to the ninth aspect is configured so that the first sprocket has a first pitch circle, a first outer circle, and a first inner circle. A first outward distance is defined radially outwardly from the first pitch circle to the first outer circle. The first outward distance is equal to or smaller than 3 mm. A first inward distance is defined radially inwardly from the first pitch circle to the first inner circle. The first inward distance is equal to or smaller than 4 mm. The reference circle is provided between the first outer circle and the first inner circle.

With the bicycle sprocket assembly according to the tenth aspect, it is possible to arrange the top portion and the bottom portion of the shifting-facilitation tooth at a preferable position.

In accordance with an eleventh aspect of the present invention, the bicycle sprocket assembly according to the ninth or tenth aspect is configured so that each of the plurality of first teeth includes a first projection provided on one of a first axial side and a second axial side of the bottom portion. The first axial side is a reverse side of the second axial side in an axial direction parallel to the rotational center axis.

With the bicycle sprocket assembly according to the eleventh aspect, the first projection further improves chain-holding performance.

In accordance with a twelfth aspect of the present invention, the bicycle sprocket assembly according to the eleventh aspect is configured so that each of the plurality of first teeth includes a second projection provided on another of the first axial side and the second axial side of the bottom portion.

With the bicycle sprocket assembly according to the twelfth aspect, the first projection and the second projection further improve chain-holding performance.

In accordance with a thirteenth aspect of the present invention, the bicycle sprocket assembly according to any one of the ninth to twelfth aspects is configured so that the bottom portion of the plurality of first teeth includes a first chain-engagement surface, a first bottom driving surface, and a first chamfer provided between the first chain-engagement surface and the first bottom driving surface. The first chain-engagement surface faces in the axial direction. The first bottom driving surface faces in a first circumferential direction in which the bicycle sprocket assembly is rotated about the rotational center axis during pedaling.

With the bicycle sprocket assembly according to the thirteenth aspect, the first chamfer reduces interference between the first tooth and the bicycle chain, reducing noise caused by interference between the first tooth and the bicycle chain.

In accordance with a fourteenth aspect of the present invention, the bicycle sprocket assembly according to any one of the ninth to twelfth aspects is configured so that the bottom portion of the plurality of first teeth includes a first chain-engagement surface, a first bottom non-driving surface, and a second chamfer provided between the first chain-engagement surface and the first bottom non-driving surface. The first chain-engagement surface faces in the axial direction. The first bottom non-driving surface faces in a second circumferential direction opposite to a first circumferential direction in which the bicycle sprocket assembly is rotated about the rotational center axis during pedaling.

With the bicycle sprocket assembly according to the fourteenth aspect, the first chamfer and the second chamfer improve chain-holding performance with reducing noise.

In accordance with a fifteenth aspect of the present invention, the bicycle sprocket assembly according to any one of the first to fourteenth aspects is configured so that the maximum axial bottom width of the shifting-facilitation tooth is substantially equal to the maximum axial bottom width of the first driving tooth.

With the bicycle sprocket assembly according to the fifteenth aspect, it is possible to improve chain-holding performance in the shifting facilitation area as well as outside the shifting facilitation area.

In accordance with a sixteenth aspect of the present invention, the bicycle sprocket assembly according to any one of the first to fifteenth aspects is configured so that the first sprocket comprises a second shifting facilitation projection to facilitate the shifting operation. The shifting-facilitation tooth is provided on a downstream side of the second shifting facilitation projection in a first circumferential direction in which the bicycle sprocket assembly is rotated about the rotational center axis during pedaling.

With the bicycle sprocket assembly according to the sixteenth aspect, the second shifting facilitation projection smooths derailing of the bicycle chain from the first sprocket in the shifting operation.

In accordance with a seventeenth aspect of the present invention, the bicycle sprocket assembly according to any one of the first to sixteenth aspects is configured so that the shifting-facilitation tooth is spaced apart from the second shifting facilitation projection by a second distance corresponding to two chain pitches of the bicycle chain.

With the bicycle sprocket assembly according to the seventeenth aspect, the second distance effectively facilitates derailing of the bicycle chain from the first sprocket in the shifting operation.

In accordance with an eighteenth aspect of the present invention, the bicycle sprocket assembly according to any one of the first to seventeenth aspects is configured so that the maximum axial top width of the shifting-facilitation tooth is smaller than the maximum top with of the second driving tooth.

With the bicycle sprocket assembly according to the eighteenth aspect, it is possible to improve chain-holding performance with effectively facilitating the shifting operation.

In accordance with a nineteenth aspect of the present invention, the bicycle sprocket assembly according to any one of the first to eighteenth aspects is configured so that each of the plurality of first teeth includes a driving surface and a non-driving surface. The shifting-facilitation tooth has a first circumferential length defined between the driving surface and the non-driving surface in a circumferential direction of the rotational center axis. The first driving tooth has a second circumferential length defined between the driving surface and the non-driving surface in the circumferential direction. The first circumferential length is smaller than the second circumferential length.

With the bicycle sprocket assembly according to the nineteenth aspect, it is possible to improve chain-holding performance with effectively facilitating the shifting operation.

In accordance with a twentieth aspect of the present invention, the bicycle sprocket assembly according to the nineteenth aspect is configured so that the driving surface of the plurality of first teeth is arranged in the circumferential direction at a constant pitch.

With the bicycle sprocket assembly according to the twentieth aspect, it is possible to effectively disperse a rotational force applied the plurality of first sprocket teeth.

In accordance with a twenty-first aspect of the present invention, a bicycle sprocket assembly comprises a first sprocket and a second sprocket. The first sprocket comprises a first sprocket body, a shifting facilitation area, and a plurality of first sprocket teeth. The first sprocket body has a rotational center axis. The shifting facilitation area is to facilitate a shifting operation in which a bicycle chain is shifted between the first sprocket and a second sprocket adjacent to the first sprocket. The plurality of first sprocket teeth is made of a first material having a first wear resistance. The plurality of first sprocket teeth includes a plurality of first teeth and a plurality of second teeth. The plurality of first teeth is configured to engage with an outer link space provided between an opposed pair of outer link plates of the bicycle chain. The plurality of second teeth is configured to engage with an inner link space provided between an opposed pair of inner link plates of the bicycle chain. The second sprocket comprises a second sprocket body and a plurality of second sprocket teeth. The second sprocket body has a rotational center axis. The plurality of second sprocket teeth is made of a second material having a second wear resistance. A total number of the plurality of second sprocket teeth is smaller than a total number of the plurality of first sprocket teeth. The first wear resistance is greater than the second wear resistance.

With the bicycle sprocket assembly according to the twenty-first aspect, the first material reduces wear of the first sprocket, reducing deterioration of shifting performance caused by wear of the first sprocket. Furthermore, the second material can save a weight of the second sprocket.

In accordance with a twenty-second aspect of the present invention, a bicycle sprocket assembly comprises a first sprocket and a second sprocket. The first sprocket has a first pitch-circle diameter. The first sprocket comprises a first sprocket body, a shifting facilitation area, and a plurality of first sprocket teeth. The first sprocket body has a rotational center axis. The shifting facilitation area is to facilitate a shifting operation in which a bicycle chain is shifted between the first sprocket and a second sprocket adjacent to the first sprocket. The plurality of first sprocket teeth includes a plurality of first teeth and a plurality of second teeth. The plurality of first teeth has a first maximum axial width. The plurality of second teeth has a second maximum axial width smaller than the first maximum axial width. The second sprocket has a second pitch-circle diameter smaller than the first pitch circle diameter. The second sprocket comprises a second sprocket body and a plurality of second sprocket teeth. The second sprocket body has the rotational center axis. The plurality of second sprocket teeth includes a plurality of third teeth and a plurality of fourth teeth. The plurality of third teeth has a third maximum axial width. At least one tooth of the plurality of third teeth includes a radially outermost edge, a chain-engagement surface, and an inclined surface. The chain-engagement surface faces in an axial direction parallel to the rotational center axis. The inclined surface extends from the chain-engagement surface toward the radially outermost edge. The inclined surface is inclined relative to the chain-engagement surface by an inclination angle which is equal to or larger than 40 degrees. The plurality of fourth teeth has a fourth maximum axial width smaller than the third maximum axial width.

With the bicycle sprocket assembly according to the twenty-second aspect, the inclined surface restricts at least one tooth of the plurality of third teeth to be unintentionally inserted into an inner link space defined between an opposed pair of inner link plates when a shifting operation from a second sprocket toward a first sprocket is unintentionally ended in failure. Thus, it is possible to maintain a correct chain-phase for the second sprocket even after the failure of the shifting operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 43 is a partial perspective view of the bicycle sprocket assembly in accordance with a modification of the second embodiment, with a cross-section.

DESCRIPTION OF THE EMBODIMENTS

Figure 1:
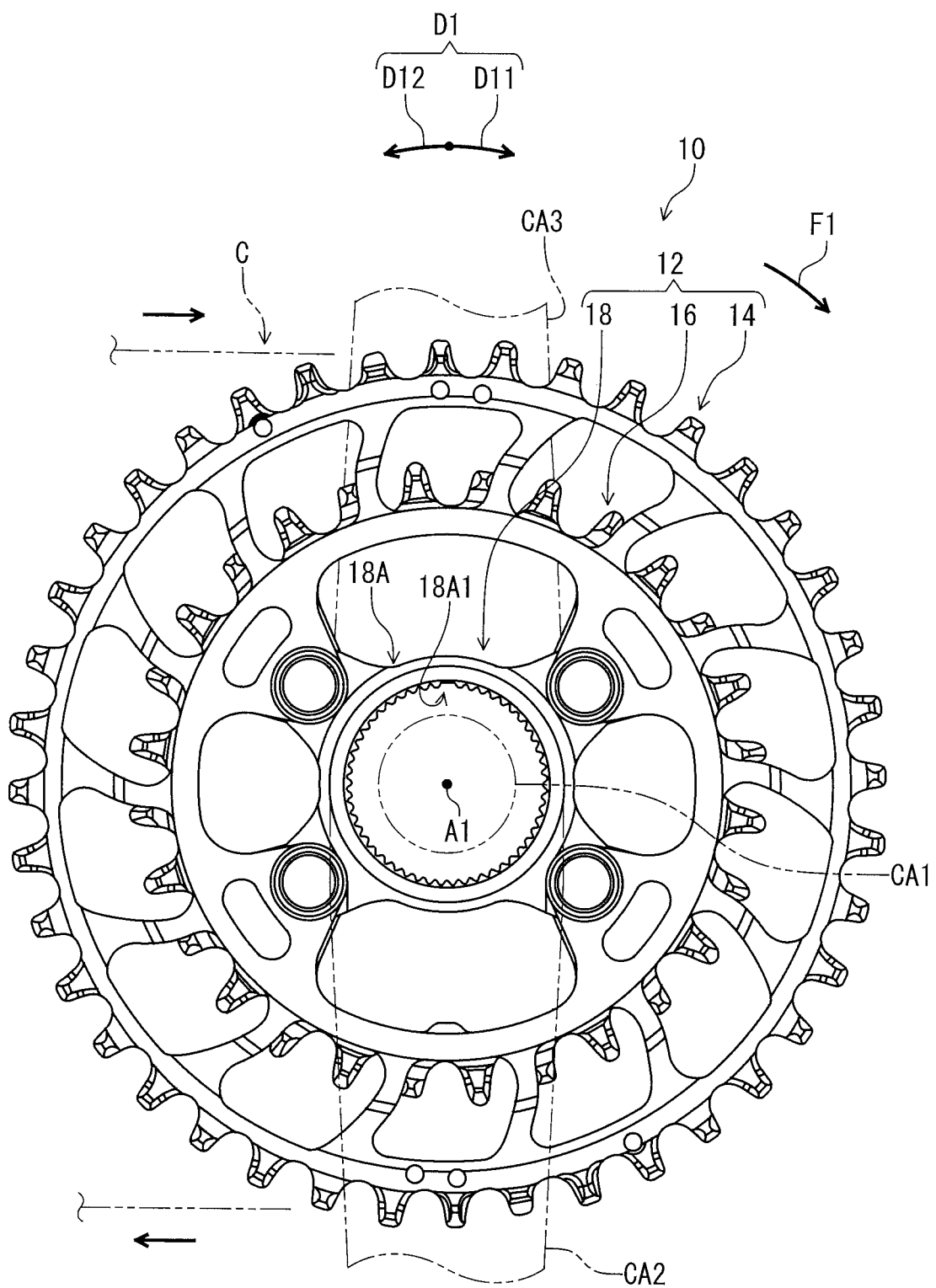
FIG. 1 is a side elevational view of a bicycle sprocket assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle crank assembly 10 includes a bicycle sprocket assembly 12 in accordance with a first embodiment. The bicycle crank assembly 10 includes a crank axle CA1 and crank arms CA2 and CA3. The crank arms CA2 and CA3 and the sprocket mounting member CA4 are secured to the crank axle CA1. The bicycle sprocket assembly 12 is secured to the crank arm CA2 to rotate integrally with the crank axle CA1 and the crank arms CA2 and CA3 about a rotational center axis A1. However, the bicycle sprocket assembly 12 can be secured to the crank axle CAL The bicycle sprocket assembly 12 is engageable with a bicycle chain C to transmit a pedaling force F1 between the bicycle chain C and the bicycle sprocket assembly 12. The bicycle sprocket assembly 12 is rotated about the rotational center axis A1 in a first circumferential direction D11 during pedaling. The first circumferential direction D11 extends along a circumferential direction D1 of the bicycle sprocket assembly 12. A second circumferential direction D12 extends along the circumferential direction D1 and is opposite to the first circumferential direction D11. In this embodiment, the bicycle sprocket assembly 12 is a front sprocket assembly. However, structures of the bicycle sprocket assembly 12 can be applied to a rear sprocket assembly.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 12, should be interpreted relative to the bicycle equipped with the bicycle sprocket assembly 12 as used in an upright riding position on a horizontal surface.

Figure 2:
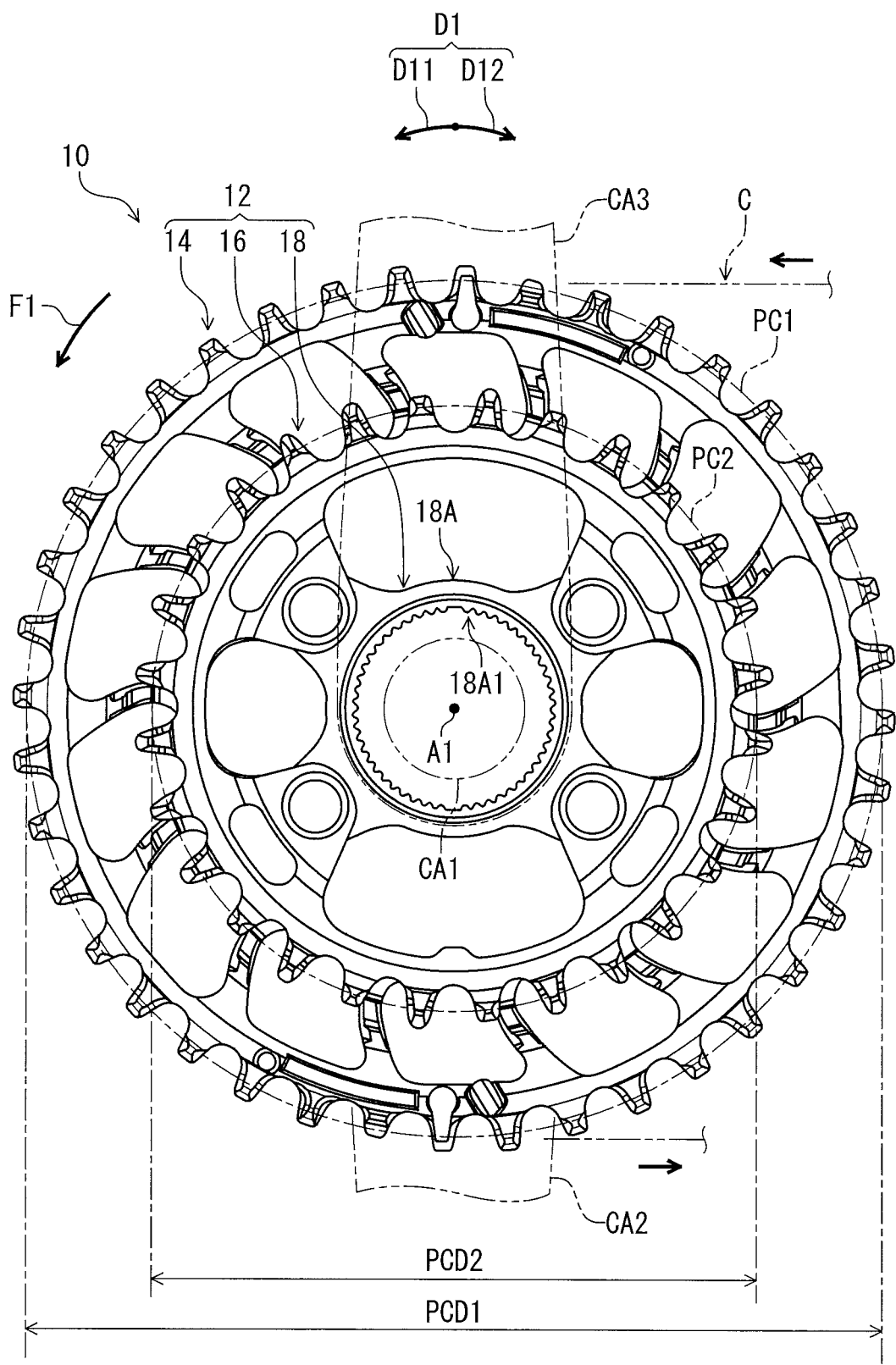
FIG. 2 is another side elevational view of the bicycle crank assembly illustrated in FIG. 1.

As seen in FIG. 2, the bicycle sprocket assembly 12 comprises a first sprocket 14 and a second sprocket 16. The first sprocket 14 has a first pitch circle PC1. The second sprocket 16 has a second pitch circle PC2. The first pitch circle PC1 is defined by centers C31 of pins C3 (FIG. 18) of the bicycle chain C engaged with the first sprocket 14. The second pitch circle PC2 is defined by the centers C31 of the pins C3 (FIG. 18) of the bicycle chain C engaged with the second sprocket 16. The first sprocket 14 has a first pitch-circle diameter PCD1. The second sprocket 16 has a second pitch-circle diameter PCD2. The first pitch-circle diameter PCD1 is a diameter of the first pitch circle PC1. The second pitch-circle diameter PCD2 is a diameter of the second pitch circle PC2. The first pitch-circle diameter PCD1 is larger than the second pitch-circle diameter PCD2 of the second sprocket 16. In other words, the second pitch-circle diameter PCD2 is smaller than the first pitch circle diameter PCD1. Thus, the first sprocket 14 can also be referred to as a larger sprocket 14, and the second sprocket 16 can also be referred to as a smaller sprocket 16.

The bicycle sprocket assembly 12 comprises a mounting member 18. The mounting member 18 is coupled to the first sprocket 14 and the second sprocket 16. The mounting member 18 includes a mounting body 18A having an internal spline 18A1. The internal spline 18A1 is configured to mesh with an external spline of the crank arm CA2. Thus, the first sprocket 14, the second sprocket 16, and the mounting member 18 rotate along with the crank axle CA1 and the crank arms CA2 and CA3 about the rotational center axis A1.

Figure 3:
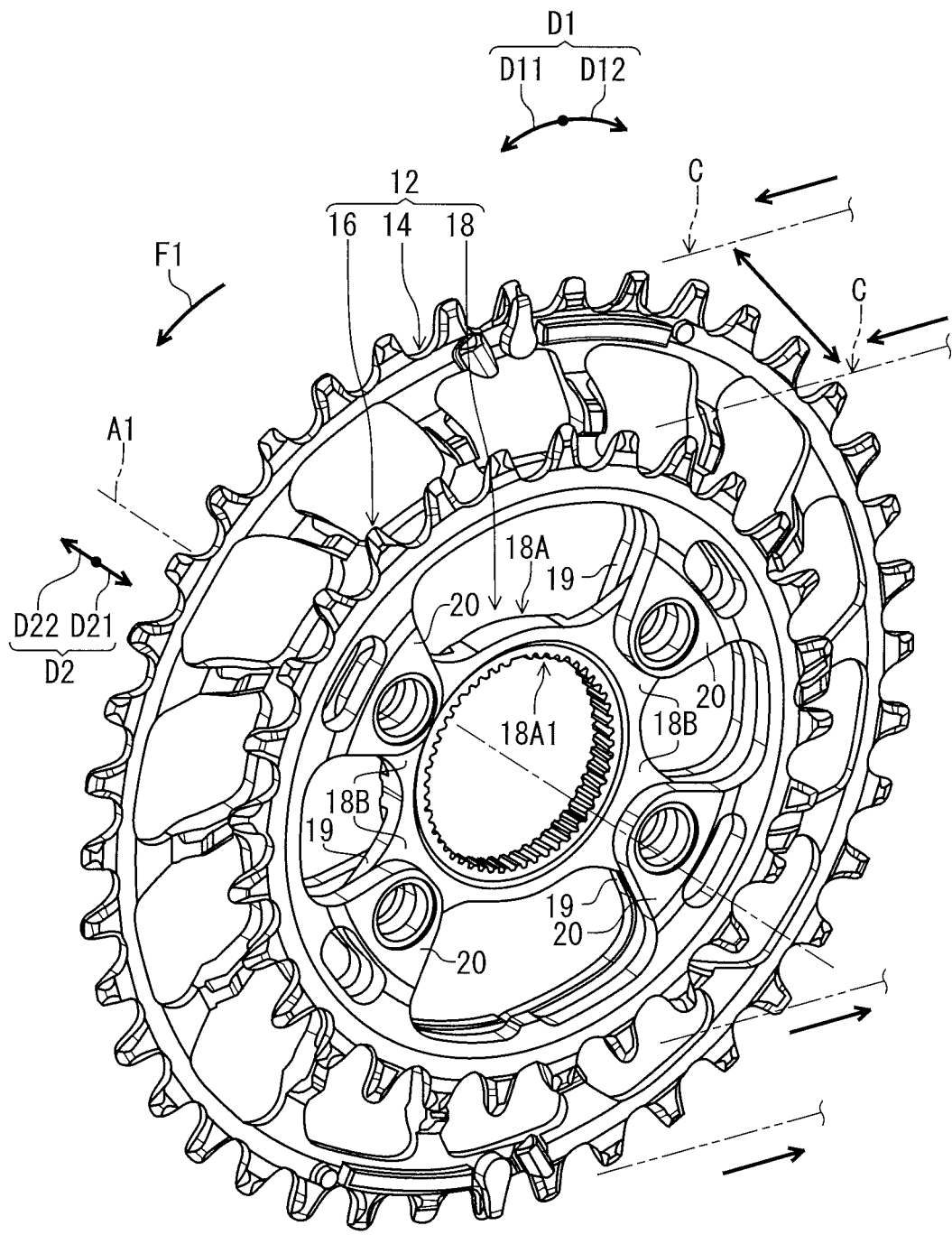
FIG. 3 is a perspective view of the bicycle sprocket assembly illustrated in FIG. 1.

As seen in FIG. 3, the mounting member 18 includes connecting arms 18B extending radially outwardly from the mounting body 18A. The first sprocket 14 comprises crank attachment portions 19. The second sprocket 16 comprises additional crank attachment portions 20. The crank attachment portions 19 are respectively fastened to by the connecting arms 18B by fasteners such as bolts (not shown). The additional crank attachment portions 20 are fastened to the connecting arms 18B by fasteners such as bolts (not shown).

The second sprocket 16 is adjacent to the first sprocket 14 in an axial direction D2 without another sprocket between the first sprocket 14 and the second sprocket 16. The axial direction D2 is parallel to the rotational center axis A1. A first axial direction D21 is defined along the axial direction D2. A second axial direction D22 is defined along the axial direction D2 and is opposite to the first axial direction D21. In this embodiment, the bicycle sprocket assembly 12 includes only the first sprocket 14 and the second sprocket 16. However, a total number of sprockets of the bicycle sprocket assembly 12 is not limited to this embodiment.

Each of the first sprocket 14 and the second sprocket 16 is engageable with the bicycle chain C to transmit the pedaling force F1 between the bicycle sprocket assembly 12 and the bicycle chain C. The bicycle chain C is shifted between the first sprocket 14 and the second sprocket 16 by a derailleur (not shown).

Figure 4:
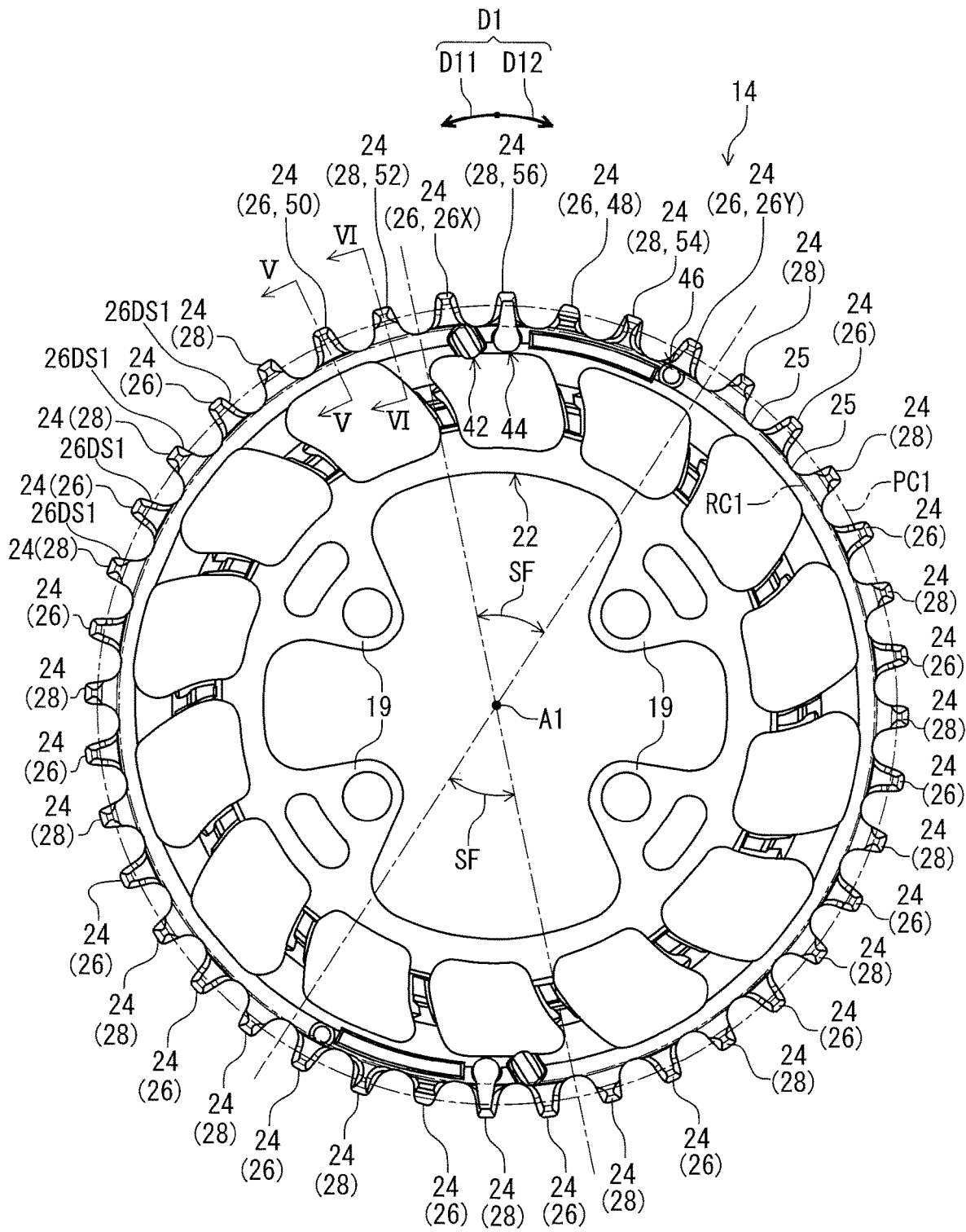
FIG. 4 is a side elevational view of a first sprocket of the bicycle sprocket assembly illustrated in FIG. 1.

As seen in FIG. 4, the first sprocket 14 comprises a first sprocket body 22 and a plurality of first sprocket teeth 24. The first sprocket body 22 has the rotational center axis A1. The plurality of first sprocket teeth 24 extends radially outwardly from the first sprocket body 22. The plurality of first sprocket teeth 24 includes a plurality of first teeth 26 and a plurality of second teeth 28. The plurality of first sprocket teeth 24 and the plurality of second teeth 28 extend radially outwardly from the first sprocket body 22. The first teeth 26 and the second teeth 28 are alternately arranged in the circumferential direction D1.

The first sprocket 14 includes a plurality of first tooth bottoms 25 provided between the plurality of first sprocket teeth 24. The plurality of first tooth bottoms 25 define a first root circle RC1. The first root circle RC1 is coincident with an outer periphery of the first sprocket body 22.

Figure 5:
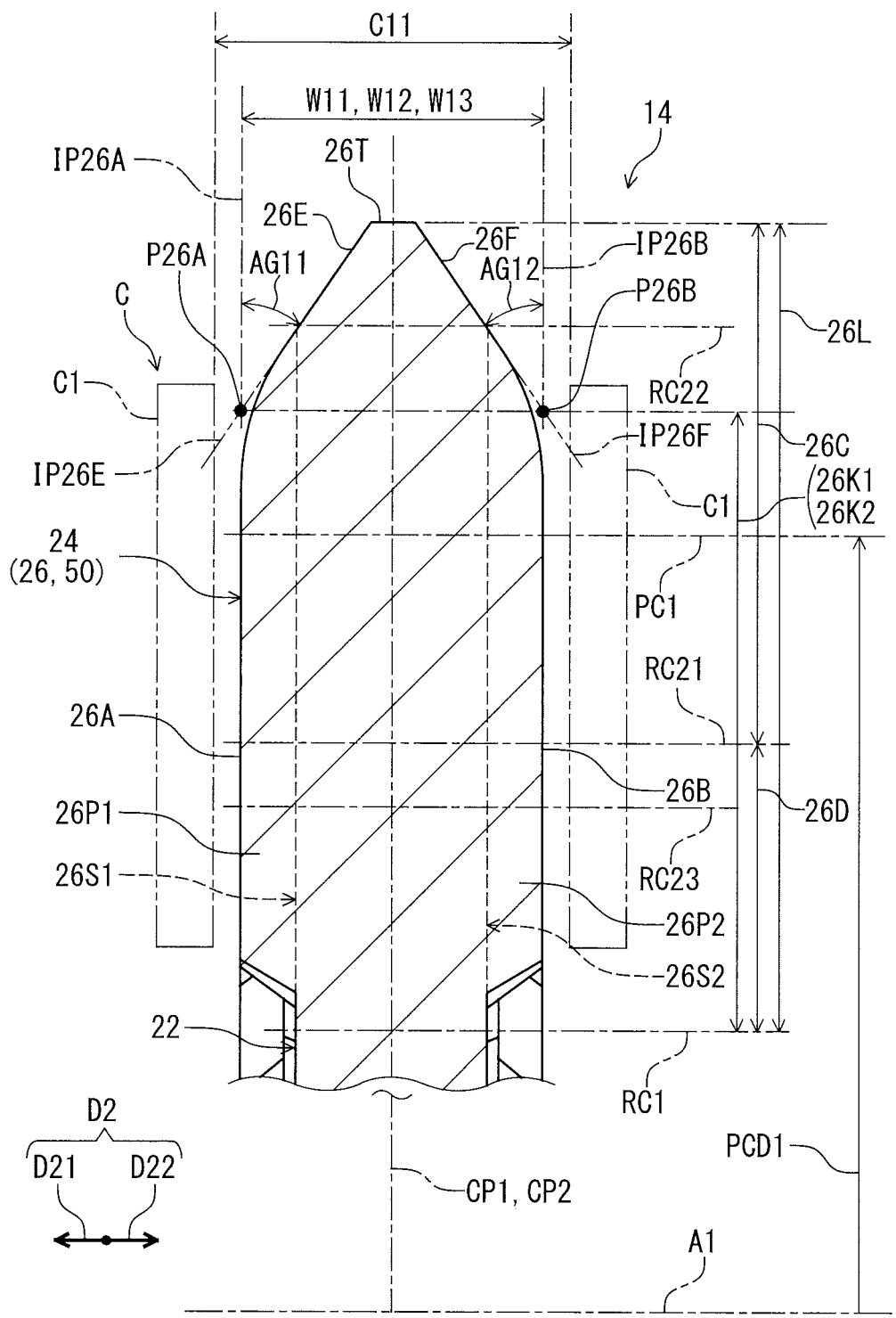
FIG. 5 is a cross-sectional view of the first sprocket taken along line V-V of FIG. 4.

As seen in FIG. 5, the plurality of first teeth 26 is configured to engage with an outer link space C11 provided between an opposed pair of outer link plates C1 of the bicycle chain C. The first tooth 26 extends radially outwardly from the first sprocket body 22 to be received in only the outer link space C11.

The plurality of first teeth 26 has a first maximum axial width W11 defined in the axial direction D2. The first tooth 26 includes a first chain-engagement surface 26A and a first additional chain-engagement surface 26B. The first chain-engagement surface 26A faces in the axial direction D2. The first additional chain-engagement surface 26B faces in the axial direction D2 and is provided on a reverse side of the first chain-engagement surface 26A. The first maximum axial width W11 is defined between the first chain-engagement surface 26A and the first additional chain-engagement surface 26B in the axial direction D2. The first maximum axial width W11 can also be referred to as a maximum axial width W11.

The first tooth 26 has a first center plane CP1 defined to bisect the first maximum axial width W11 in the axial direction D2. The first center plane CP1 is perpendicular to the rotational center axis A1. The first tooth 26 has a symmetrical shape with respect to the first center plane CP1. However, the first tooth 26 can have an asymmetrical shape with respect to the first center plane CP1.

The first tooth 26 includes a first inclined surface 26E, a first additional inclined surface 26F, and a radially outermost edge 26T. The first tooth 26 has a first radial length 26L which is radially defined from the root circle RC1 to the radially outermost edge 26T. The first inclined surface 26E extends from the radially outermost edge 26T toward the first chain-engagement surface 26A. The first additional inclined surface 26F extends from the radially outermost edge 26T toward the first additional chain-engagement surface 26B. The first inclined surface 26E is inclined relative to the first chain-engagement surface 26A by a first inclination angle AG11. The first additional inclined surface 26F is inclined relative to the first additional chain-engagement surface 26B by a first additional inclination angle AG12. The first inclination angle AG11 is substantially equal to the first additional inclination angle AG12. However, the first inclination angle AG11 can be different from the first additional inclination angle AG12.

An imaginary plane IP26A is defined along the first chain-engagement surface 26A. An imaginary plane IP26B is defined along the first additional chain-engagement surface 26B. An imaginary plane IP26E is defined along the first inclination surface 26E. An imaginary plane IP26F is defined along the first additional inclination surface 26F. A radial distance 26K1 is radially defined from the root circle RC1 to a cross point P26A of the imaginary planes IP26A and IP26E. A radial distance 26K2 is radially defined from the root circle RC1 to a cross point P26B of the imaginary planes IP26B and IP26F. The radial distance 26K2 is equal to the radial distance 26K1. However, the radial distance 26K2 can be different from the radial distance 26K1.

Figure 6:
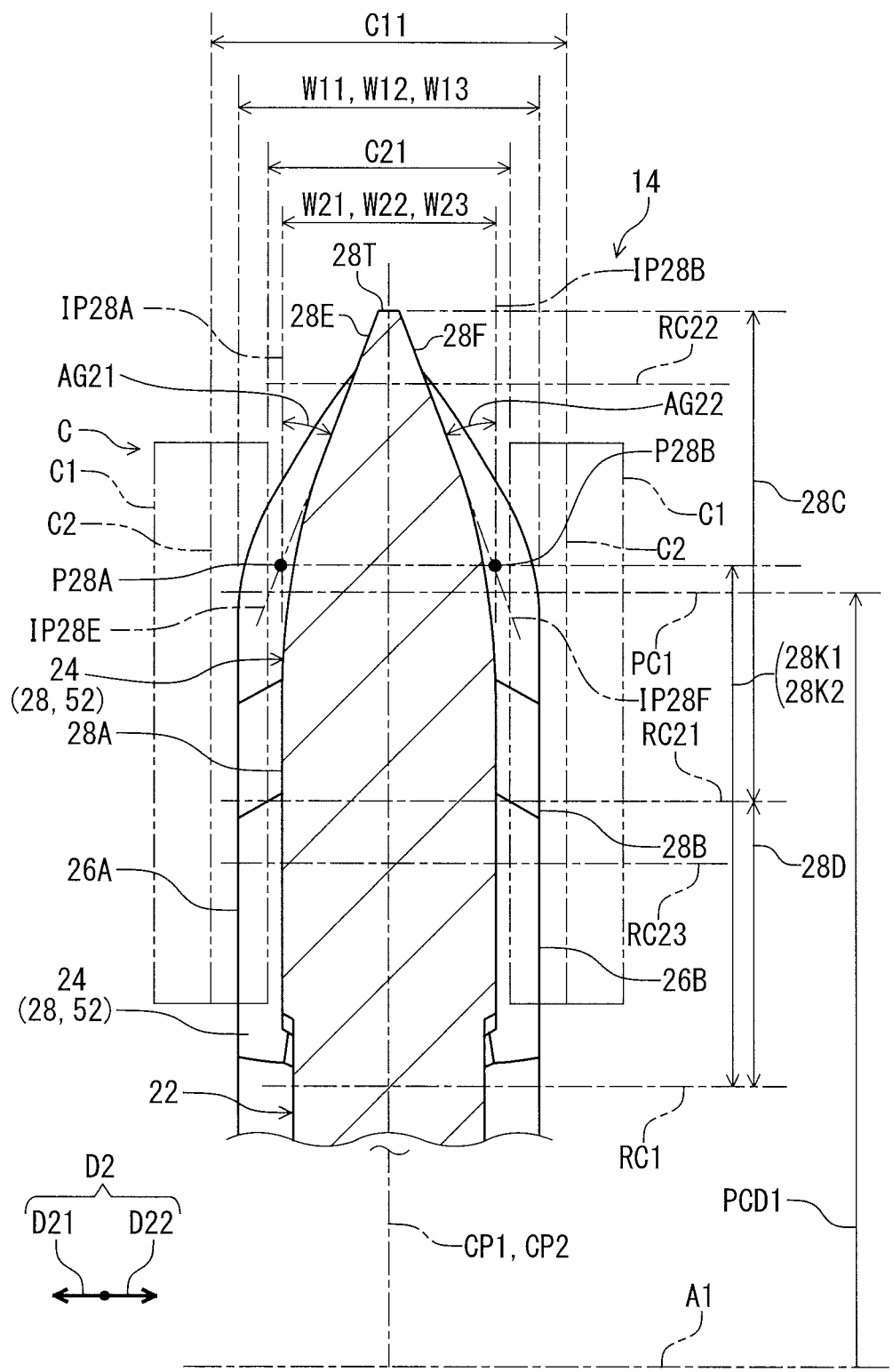
FIG. 6 is a cross-sectional view of the first sprocket taken along line VI-VI of FIG. 4.

As seen in FIG. 6, the plurality of second teeth 28 is configured to engage with an inner link space C21 provided between an opposed pair of inner link plates C2 of the bicycle chain C. The second tooth 28 extends radially outwardly from the first sprocket body 22 to be received in only the inner link space C21 during driving the bicycle chain C.

The plurality of second teeth 28 has a second maximum axial width W21 defined in the axial direction D2. The second tooth 28 includes a second chain-engagement surface 28A and a second additional chain-engagement surface 28B. The second chain-engagement surface 28A faces in the axial direction D2. The second additional chain-engagement surface 28B faces in the axial direction D2 and is provided on a reverse side of the second chain-engagement surface 28A. The second maximum axial width W21 is defined between the second chain-engagement surface 28A and the second additional chain-engagement surface 28B in the axial direction D2. The second maximum axial width W21 can also be referred to as a maximum axial width W21.

The second tooth 28 has a second center plane CP2 defined to bisect the second maximum axial width W21 in the axial direction D2. The second center plane CP2 is perpendicular to the rotational center axis A1. In this embodiment, the second center plane CP2 is coincident with the first center plane CP1. However, the second center plane CP2 can be offset from the first center plane CP1 in the axial direction D2. The second tooth 28 has a symmetrical shape with respect to the second center plane CP2. However, the second tooth 28 can have an asymmetrical shape with respect to the second center plane CP2.

As seen in FIG. 6, the first maximum axial width W11 is larger than the second maximum axial width W21. In other words, the second maximum axial width W21 is smaller than the first maximum axial width W11. The first maximum axial width W11 is smaller than an axial width of the outer link space C11 and is larger than an axial width of the inner link space C21. The second maximum axial width W21 is smaller than the axial width of the inner link space C21. However, the first maximum axial width W11 can be equal to or smaller than the second maximum axial width W21.

The second tooth 28 includes a second inclined surface 28E, a second additional inclined surface 28F, and a radially outermost edge 28T. The second tooth 28 has a second radial length 28L which is radially defined from the root circle RC1 to the radially outermost edge 28T. The second inclined surface 28E extends from the radially outermost edge 28T toward the second chain-engagement surface 28A. The second additional inclined surface 28F extends from the radially outermost edge 28T toward the second additional chain-engagement surface 28B. The second inclined surface 28E is inclined relative to the second chain-engagement surface 28A by a second inclination angle AG21. The second additional inclined surface 28F is inclined relative to the second additional chain-engagement surface 28B by a second additional inclination angle AG22. The second inclination angle AG21 is substantially equal to the second additional inclination angle AG22. However, the second inclination angle AG21 can be different from the second additional inclination angle AG22.

In this embodiment, the first inclination angle AG11 is larger than the second inclination angle AG21 and the second additional inclination angle AG22. The first additional inclination angle AG12 is larger than the second inclination angle AG21 and the second additional inclination angle AG22. However, the first inclination angle AG11 can be equal to or smaller than at least one of the second inclination angle AG21 and the second additional inclination angle AG22. The first additional inclination angle AG12 can be equal to or smaller than at least one of the second inclination angle AG21 and the second additional inclination angle AG22.

An imaginary plane IP28A is defined along the second chain-engagement surface 28A. An imaginary plane IP28B is defined along the second additional chain-engagement surface 28B. An imaginary plane IP28E is defined along the second inclination surface 28E. An imaginary plane IP28F is defined along the second additional inclination surface 28F. A radial distance 28K1 is radially defined from the root circle RC1 to a cross point P28A of the imaginary planes IP28A and IP28E. A radial distance 28K2 is radially defined from the root circle RC1 to a cross point P28B of the imaginary planes IP28B and IP28F. The radial distance 28K2 is equal to the radial distance 28K1. However, the radial distance 28K2 can be different from the radial distance 28K1.

As seen in FIGS. 5 and 6, the plurality of first sprocket teeth 24 each has a maximum axial top width and a maximum axial bottom width. Each of the plurality of first sprocket teeth 24 includes a bottom portion and a top portion extending radially outwardly from the bottom portion. The top portion has the maximum axial top width of each of the plurality of first sprocket teeth 24. The bottom portion has the maximum axial bottom width of each of the plurality of first sprocket teeth 24.

As seen in FIG. 5, the first tooth 26 has a maximum axial top width W12 and a maximum axial bottom width W13. The maximum axial top width W12 is defined in the axial direction D2. The maximum axial bottom width W13 is defined in the axial direction D2. The first tooth 26 includes a top portion 26C and a bottom portion 26D. The top portion 26C extends radially outwardly from the bottom portion 26D. The top portion 26C has the maximum axial top width W12. The bottom portion 26D has the maximum axial bottom width W13.

In this embodiment, the maximum axial top width W12 is equal to the maximum axial bottom width W13. The maximum axial top width W12 and the maximum axial bottom width W13 are equal to the first maximum axial width W11. However, at least one of the first maximum axial width W11, the maximum axial top width W12, and the maximum axial bottom width W13 can be different from another of the first maximum axial width W11, the maximum axial top width W12, and the maximum axial bottom width W13.

Figure 7:
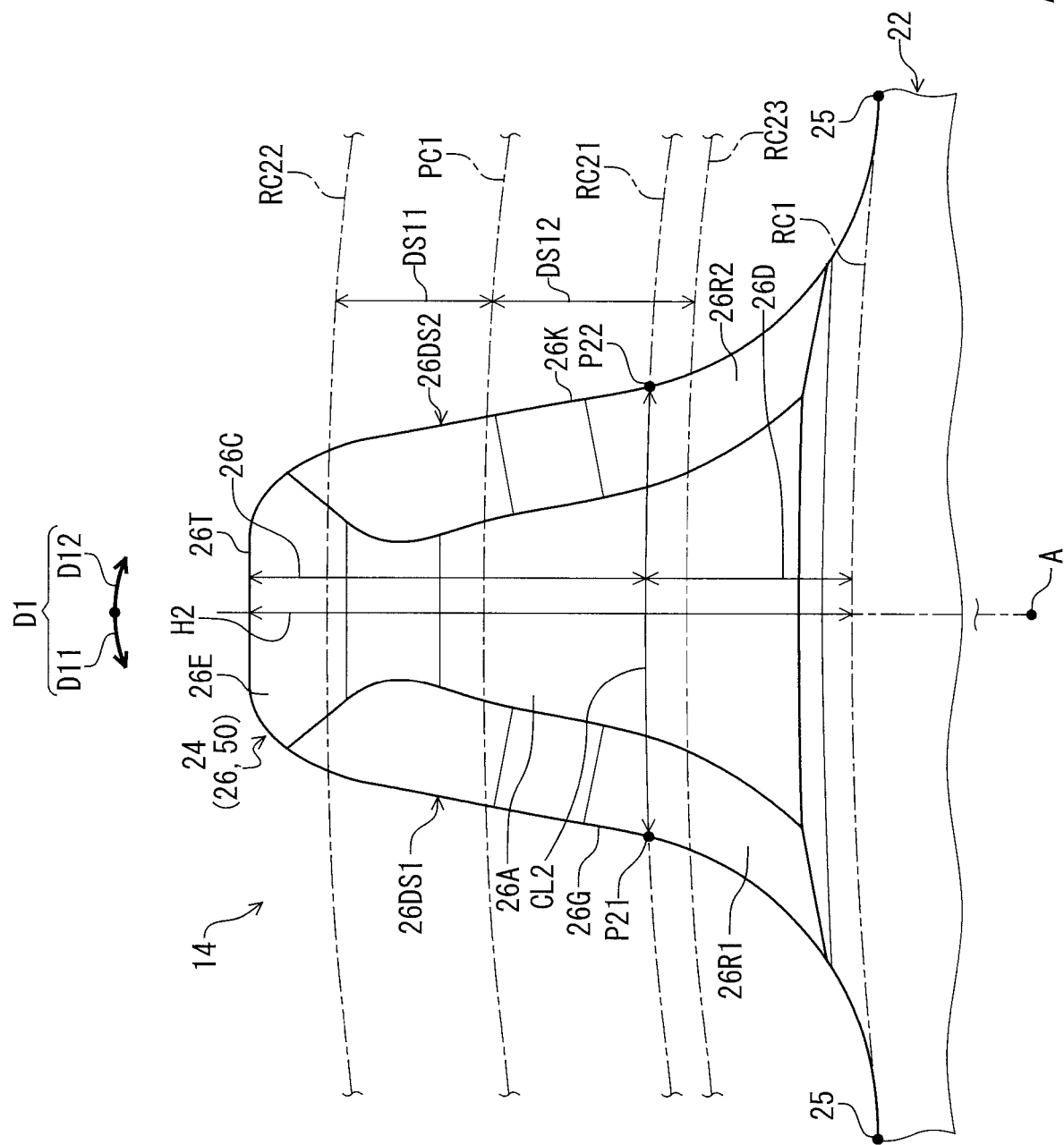
FIG. 7 is a side elevational view of a first tooth of the first sprocket of the bicycle sprocket assembly illustrated in FIG. 1.

As seen in FIG. 7, the first sprocket 14 has a reference circle RC21 with respect to the rotational center axis A1 of the bicycle sprocket assembly 12. The top portion 26C is provided radially outwardly of the reference circle RC21. The bottom portion 26D is provided radially inwardly of the reference circle RC21. The top portion 26C is provided between the reference circle RC21 and the radially outermost edge 26T of the first tooth 26. The bottom portion 26D is provided between the reference circle RC21 and the first root circle RC1.

The first sprocket 14 has a first outer circle RC22 and a first inner circle RC23. A first outward distance DS11 is defined radially outwardly from the first pitch circle PC1 to the first outer circle RC22. The first outward distance DS11 is equal to or smaller than 3 mm. A first inward distance DS12 is defined radially inwardly from the first pitch circle PC1 to the first inner circle RC23. The first inward distance DS12 is equal to or smaller than 4 mm. The reference circle RC21 is provided between the first outer circle RC22 and the first inner circle RC23. The reference circle RC21 is preferably provided on the first pitch circle PC1 or provided radially inwardly of the first pitch circle PC1. In this embodiment, the reference circle RC21 is provided between the first pitch circle PC1 and the first inner circle RC23. The reference circle RC21 is provided radially inwardly of the first pitch circle PC1 by 1.8 mm. However, the reference circle RC21 can be provided in a radial area between the first outer circle RC22 and the first inner circle RC23.

As seen in FIG. 6, the second tooth 28 has a maximum axial top width W22 and a maximum axial bottom width W23. The maximum axial top width W22 is defined in the axial direction D2. The maximum axial bottom width W23 is defined in the axial direction D2. The second tooth 28 includes a top portion 28C and a bottom portion 28D. The top portion 28C extends radially outwardly from the bottom portion 28D. The top portion 28C has the maximum axial top width W22. The bottom portion 28D has the maximum axial bottom width W23. The second maximum axial width W21 of the second tooth 28 is smaller than the maximum axial bottom width W13 of the first tooth 26.

In this embodiment, the maximum axial top width W22 is equal to the maximum axial bottom width W23. The maximum axial top width W22 and the maximum axial bottom width W23 are equal to the second maximum axial width W21. However, at least one of the second maximum axial width W21, the maximum axial top width W22, and the maximum axial bottom width W23 can be different from another of the second maximum axial width W21, the maximum axial top width W22, and the maximum axial bottom width W23.

Figure 8:
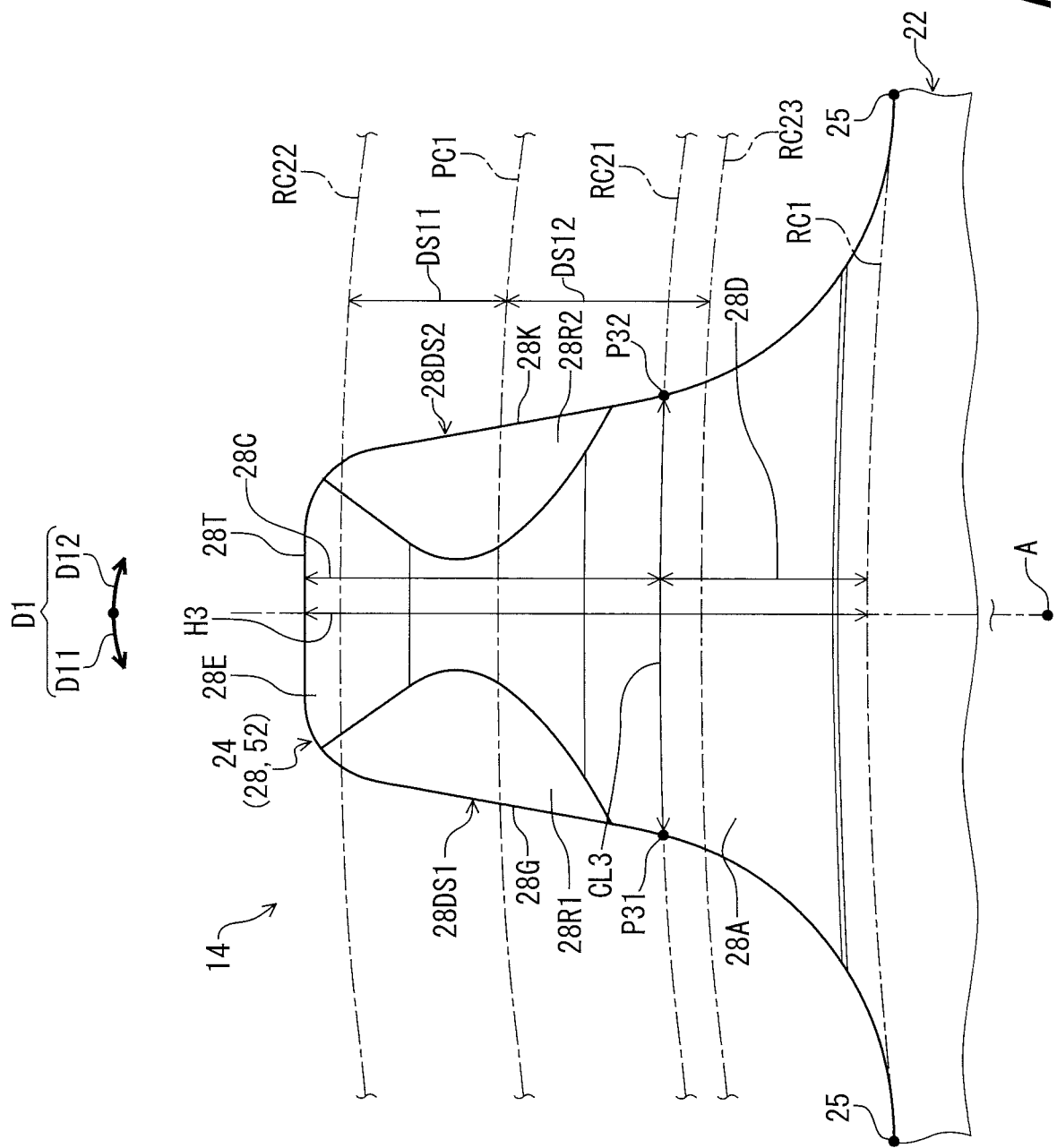
FIG. 8 is a side elevational view of a second tooth of the first sprocket of the bicycle sprocket assembly illustrated in FIG. 1.

As seen in FIG. 8, the top portion 28C is provided radially outwardly of the reference circle RC21. The bottom portion 28D is provided radially inwardly of the reference circle RC21. The top portion 28C is provided between the reference circle RC21 and the radially outermost edge 28T of the second tooth 28. The bottom portion 28D is provided between the reference circle RC21 and the first root circle RC1.

As seen in FIG. 5, each of the plurality of first teeth 26 includes a first projection 26P1 provided on one of a first axial side 26S1 and a second axial side 26S2 of the bottom portion 26D. Each of the plurality of first teeth 26 includes a second projection 26P2 provided on another of the first axial side 26S1 and the second axial side 26S2 of the bottom portion 26D. The first axial side 26S1 is a reverse side of the second axial side 26S2 in the axial direction D2 parallel to the rotational center axis A1. In this embodiment, the first projection 26P1 is provided on the first axial side 26S1 of the bottom portion 26D. The second projection 26P2 is provided on the second axial side 26S2. However, at least one of the first projection 26P1 and the second projection 26P2 can be omitted from the first tooth 26.

In this embodiment, the first projection 26P1 is provided on the first axial side 26S1 of the top portion 26C. The second projection 26P2 is provided on the second axial side 26S2 of the top portion 26C. However, the first projection 26P1 can be provided on the first axial side 26S1 of only one of the top portion 26C and the bottom portion 26D. The second projection 26P2 can be provided on the second axial side 26S2 of only one of the top portion 26C and the bottom portion 26D.

As seen in FIG. 7, the plurality of first teeth 26 includes a driving surface 26DS1 and a non-driving surface 26DS2. The driving surface 26DS1 faces in the first circumferential direction D11 in which the bicycle sprocket assembly 12 is rotated about the rotational center axis A1 during pedaling. The non-driving surface 26DS2 faces in the second circumferential direction D12 opposite to the first circumferential direction D11. As seen in FIG. 4, the driving surface 26DS1 of the plurality of first teeth 26 is arranged in the circumferential direction D1 at a constant pitch.

Figure 9:
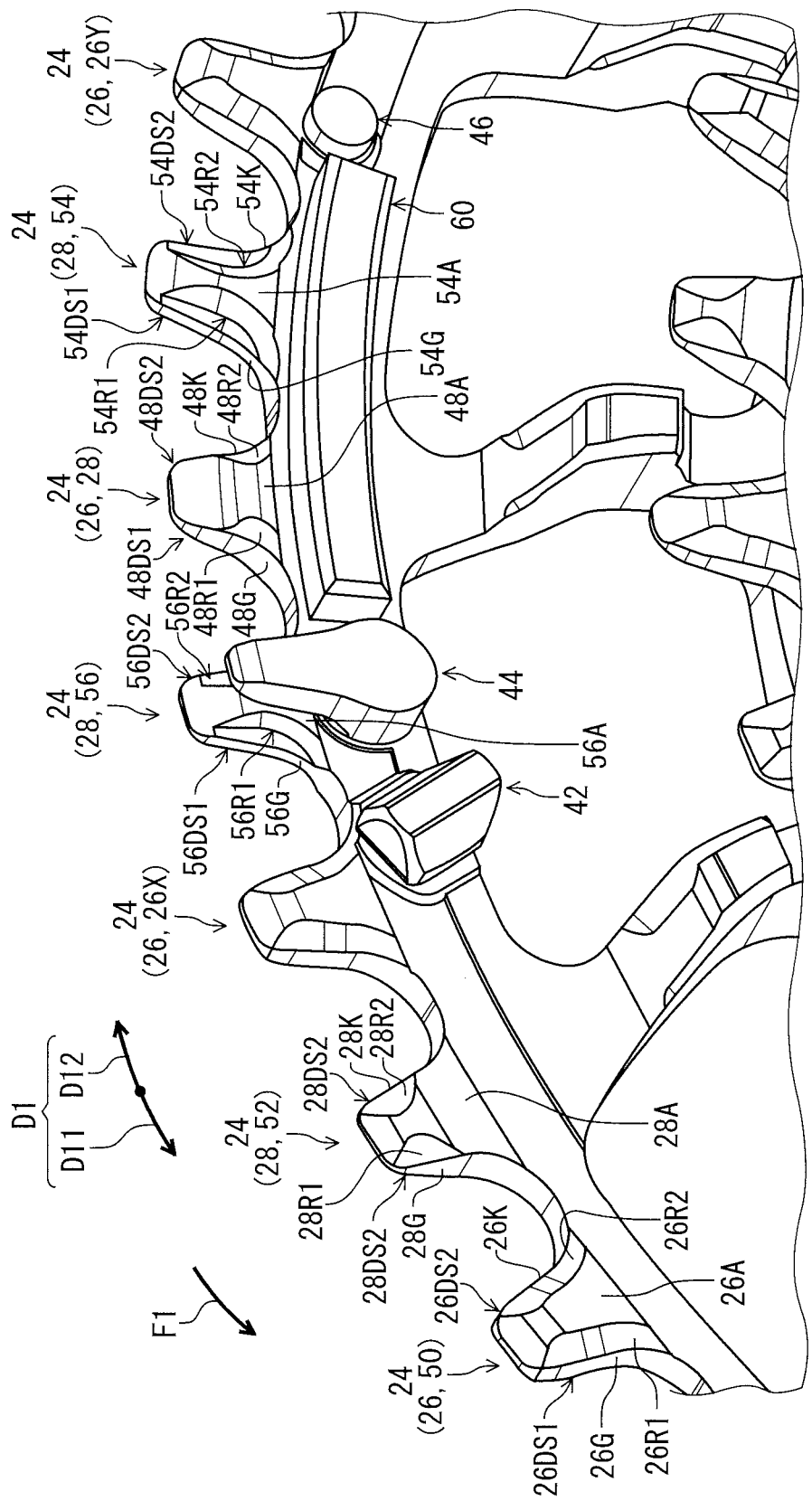
FIG. 9 is a partial perspective view of the bicycle sprocket assembly illustrated in FIG. 1.

As seen in FIGS. 7 and 9, the bottom portion 26D of the plurality of first teeth 26 includes the first chain-engagement surface 26A, a first bottom driving surface 26G, and a first chamfer 26R1. The first chamfer 26R1 is provided between the first chain-engagement surface 26A and the first bottom driving surface 26G. The first bottom driving surface 26G faces in the first circumferential direction D11 in which the bicycle sprocket assembly 12 is rotated about the rotational center axis A1 during pedaling. The driving surface 26DS1 includes the first bottom driving surface 26G. The top portion 26C and the bottom portion 26D include the first chain-engagement surface 26A. However, the first chain-engagement surface 26A can be provided to only the bottom portion 26D. The top portion 26C and the bottom portion 26D includes the first chamfer 26R1.

The bottom portion 26D of the plurality of first teeth 26 includes a first bottom non-driving surface 26K and a second chamfer 26R2. The second chamfer 26R2 is provided between the first chain-engagement surface 26A and the first bottom non-driving surface 26K. The first bottom non-driving surface 26K faces in the second circumferential direction D12 opposite to the first circumferential direction D11 in which the bicycle sprocket assembly 12 is rotated about the rotational center axis A1 during pedaling. The non-driving surface 26DS2 includes the first bottom non-driving surface 26K. The top portion 26C and the bottom portion 26D includes the second chamfer 26R2.

Figure 10:
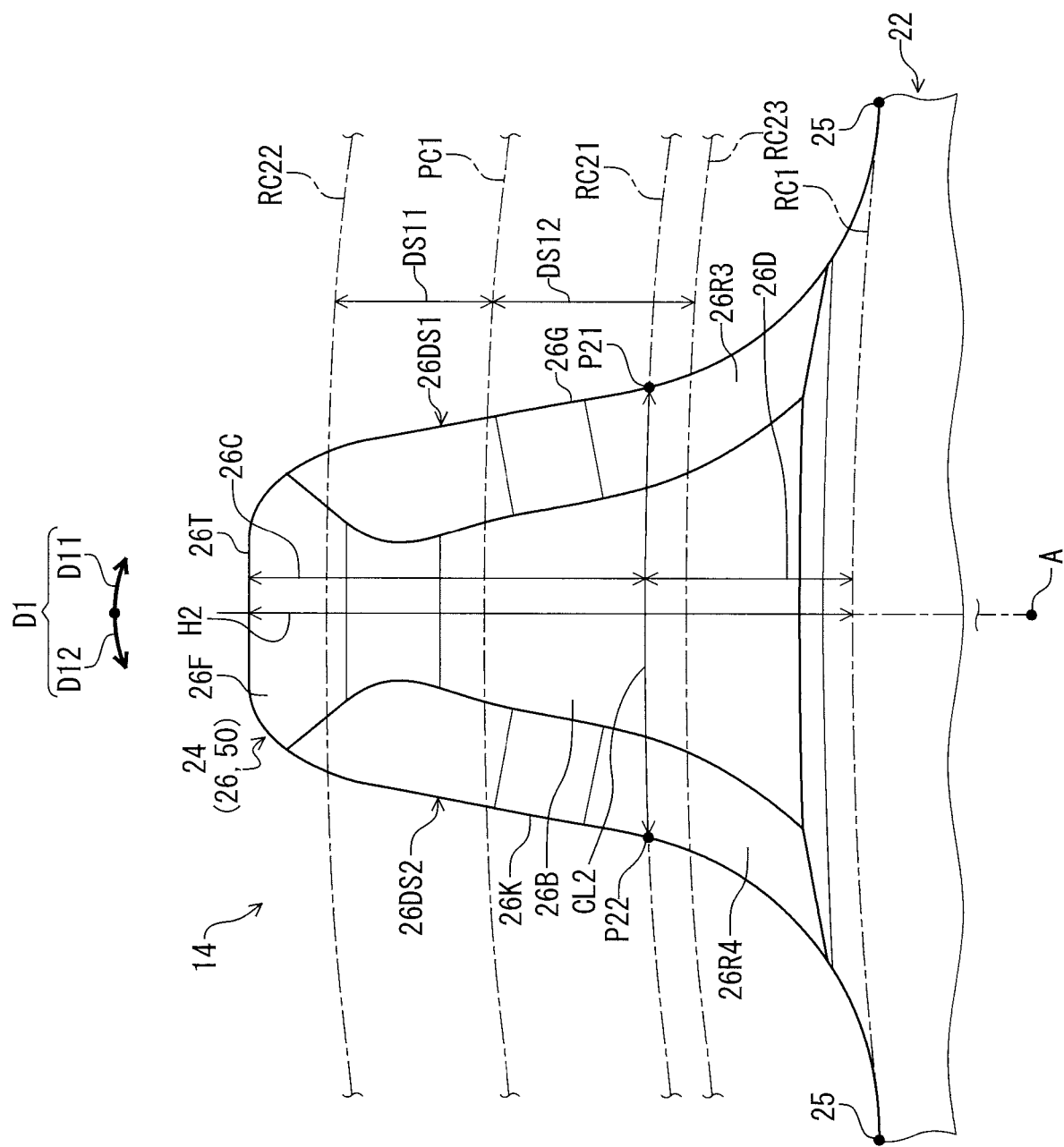
FIG. 10 is another side elevational view of the first tooth of the first sprocket of the bicycle sprocket assembly illustrated in FIG. 1.
Figure 11:
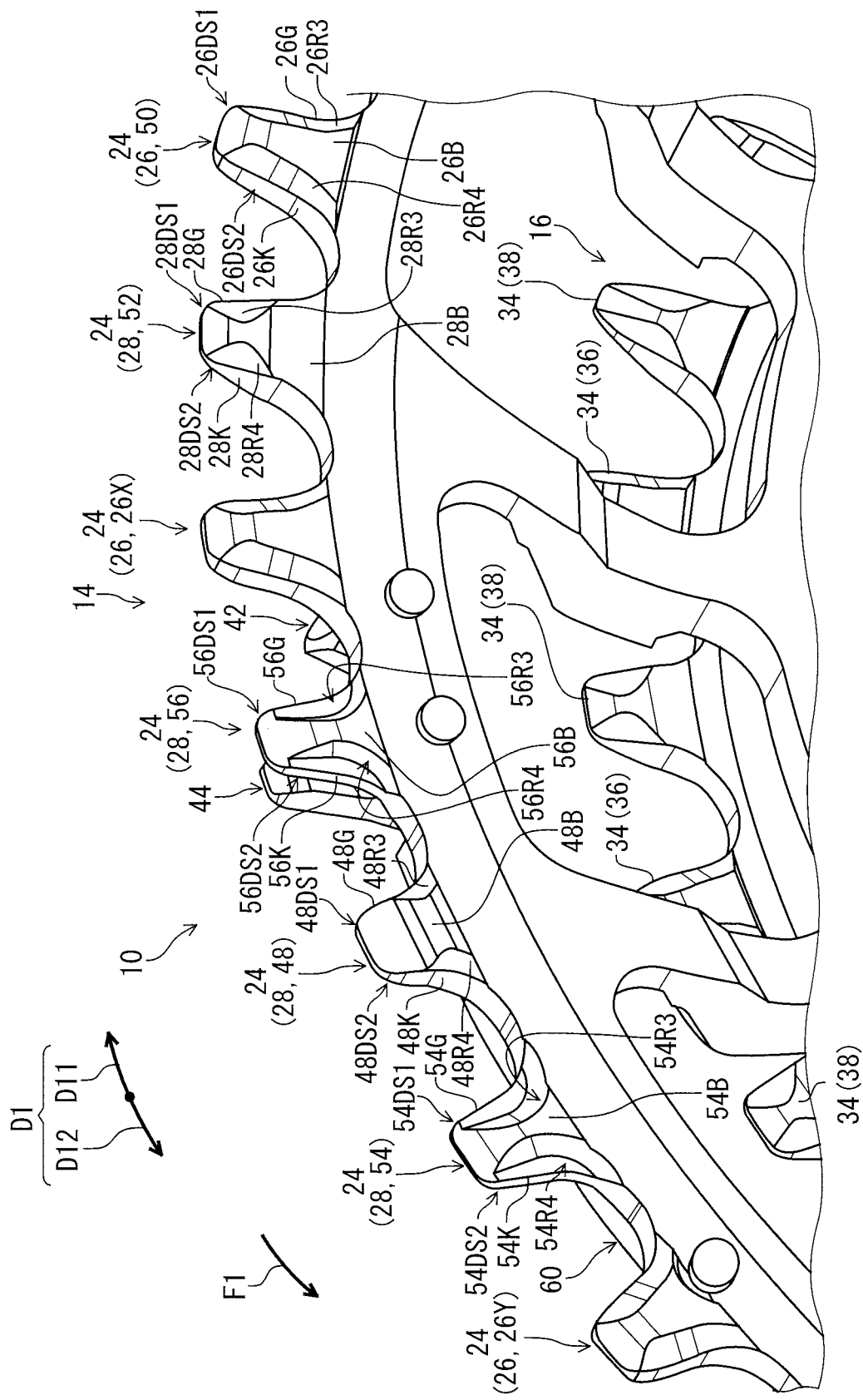
FIG. 11 is a partial perspective view of the bicycle sprocket assembly illustrated in FIG. 1.

As seen in FIGS. 10 and 11, the bottom portion 26D of the plurality of first teeth 26 includes a third chamfer 26R3. The third chamfer 26R3 is provided between the first additional chain-engagement surface 26B and the first bottom driving surface 26G. The top portion 26C and the bottom portion 26D includes the third chamfer 26R3.

The bottom portion 26D of the plurality of first teeth 26 includes a fourth chamfer 26R4. The fourth chamfer 26R4 is provided between the first additional chain-engagement surface 26B and the first bottom non-driving surface 26K. The top portion 26C and the bottom portion 26D includes the fourth chamfer 26R4.

As seen in FIG. 8, each of the plurality of second teeth 28 includes a driving surface 28DS1 and a non-driving surface 28DS2. The driving surface 28DS1 faces in the first circumferential direction D11 in which the bicycle sprocket assembly 12 is rotated about the rotational center axis A1 during pedaling. The non-driving surface 28DS2 faces in the second circumferential direction D12 opposite to the first circumferential direction D11. As seen in FIG. 4, the driving surface 28DS1 of the plurality of second teeth 28 is arranged in the circumferential direction D1 at a constant pitch.

As seen in FIGS. 8 and 9, the top portion 28C of the plurality of second teeth 28 includes the second chain-engagement surface 28A, a second top driving surface 28G, and a first chamfer 28R1. The first chamfer 28R1 is provided between the second chain-engagement surface 28A and the second top driving surface 28G. The second top driving surface 28G faces in the first circumferential direction D11. The driving surface 28DS1 includes the second top driving surface 28G. The top portion 28C and the bottom portion 28D include the second chain-engagement surface 28A. However, the second chain-engagement surface 28D can be provided to only the bottom portion 28D.

The top portion 28C of the plurality of second teeth 28 includes a second top non-driving surface 28K and a second chamfer 28R2. The second chamfer 28R2 is provided between the second chain-engagement surface 28A and the second top non-driving surface 28K. The second top non-driving surface 28K faces in the second circumferential direction D12. The non-driving surface 28DS2 includes the second top non-driving surface 28K.

Figure 12:
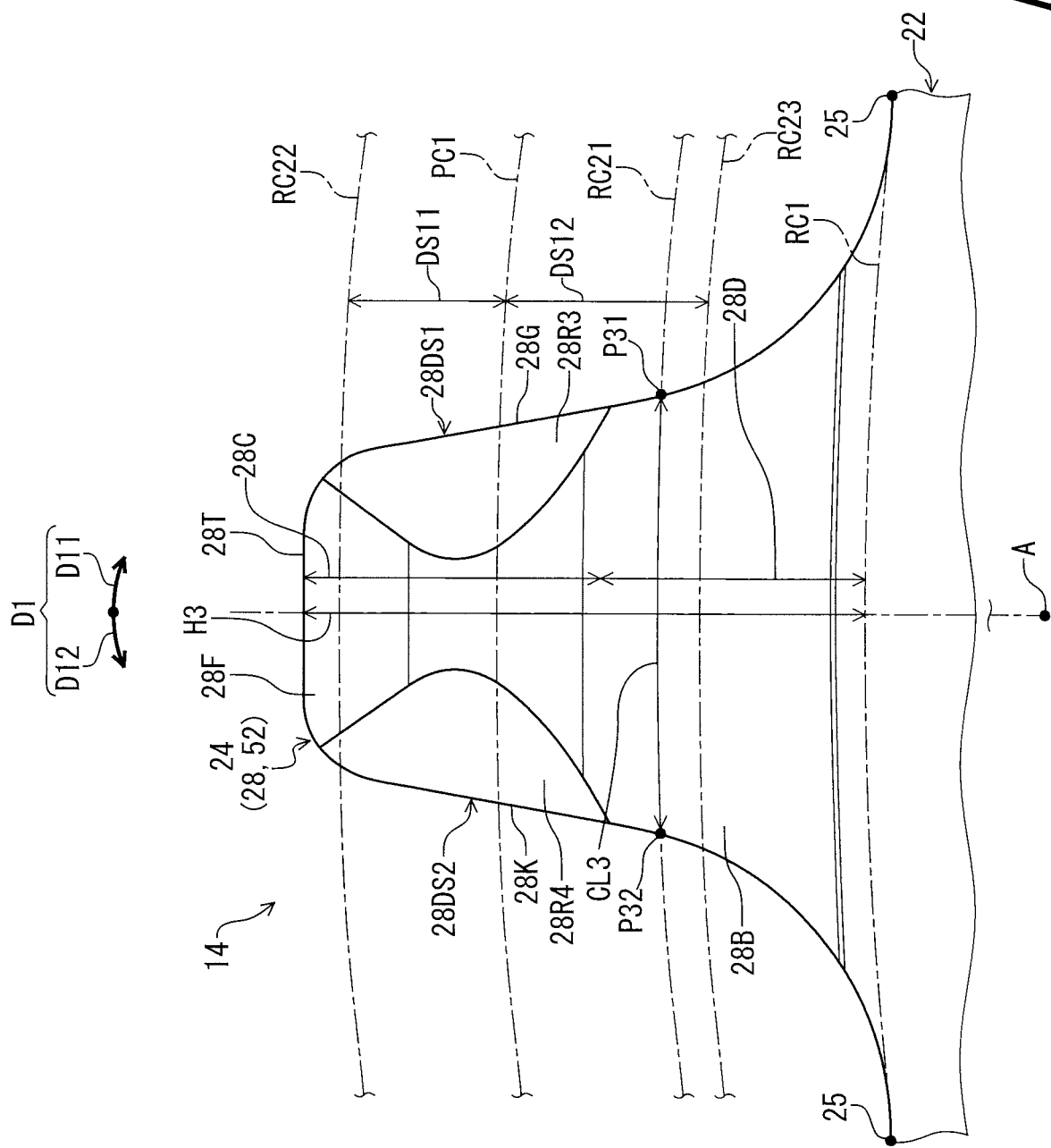
FIG. 12 is another side elevational view of the second tooth of the first sprocket of the bicycle sprocket assembly illustrated in FIG. 1.

As seen in FIGS. 11 and 12, the top portion 28C of the second teeth 28 includes a third chamfer 28R3. The third chamfer 28R3 is provided between the second additional chain-engagement surface 28B and the second top driving surface 28G.

The top portion 28C of the second teeth 28 includes a fourth chamfer 28R4. The fourth chamfer 28R4 is provided between the second additional chain-engagement surface 28B and the second top non-driving surface 28K.

The structures of the first tooth 26 and the second tooth 28 are not limited to this embodiment. At least one of the first tooth 26 and the second tooth 28 can have other shapes such as a twisted shape or a curved shape.

Figure 13:
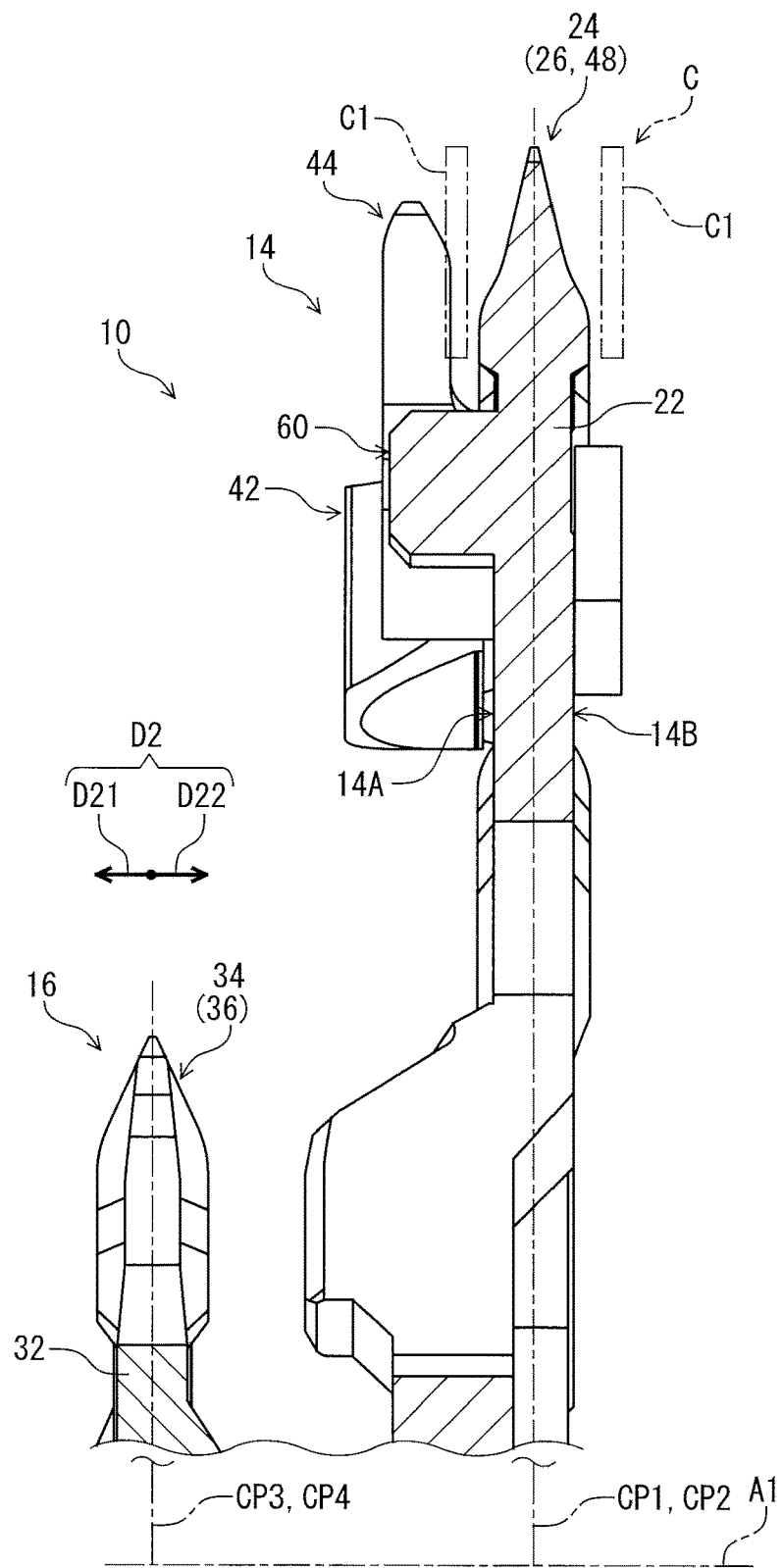
FIG. 13 is a cross-sectional view of the first sprocket taken along line XIII-XIII of FIG. 22.

As seen in FIG. 13, the first sprocket 14 comprises a first side surface 14A and a second side surface 14B. The first side surface 14A is provided on the first sprocket body 22. The second side surface 14B is provided on the first sprocket body 22. The second side surface 14B is provided on a reverse side of the first side surface 14A in the axial direction D2. The first side surface 14A faces in the first axial direction D21. The second side surface 14B faces in the second axial direction D22. The first side surface 14A faces toward the second sprocket 16 in the axial direction D2.

Figure 14:
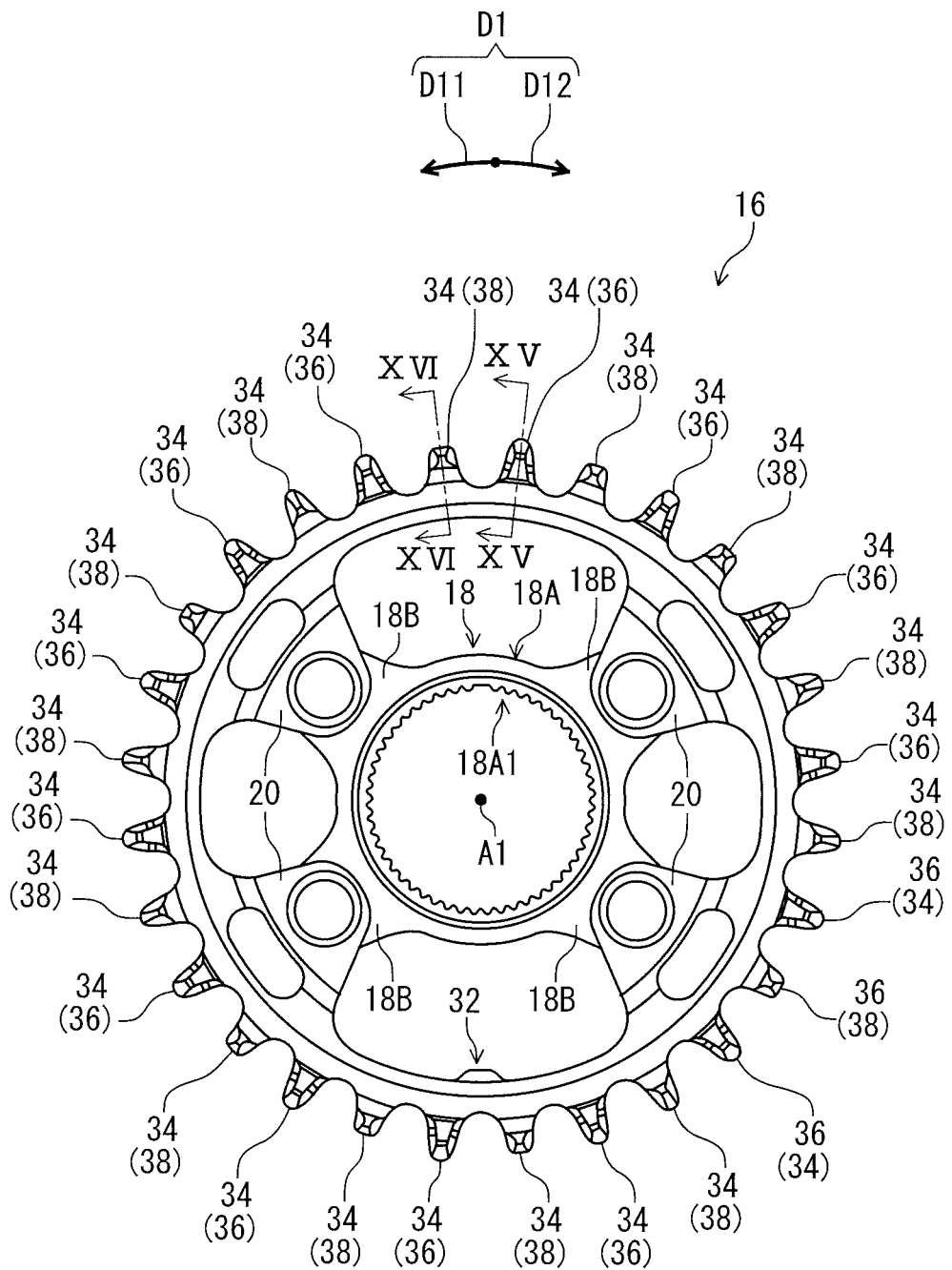
FIG. 14 is a side elevational view of a second sprocket of the bicycle sprocket assembly illustrated in FIG. 1.

As seen in FIG. 14, the second sprocket 16 comprises a second sprocket body 32 and a plurality of second sprocket teeth 34. The second sprocket body 32 has the rotational center axis A1. The plurality of second sprocket teeth 34 extends radially outwardly from the second sprocket body 32. The plurality of second sprocket teeth 34 includes a plurality of third teeth 36 and a plurality of fourth teeth 38. The plurality of third teeth 36 and the plurality of fourth teeth 38 extend radially outwardly from the second sprocket body 32. The third teeth 36 and the fourth teeth 38 are alternately arranged in the circumferential direction D1.

As seen in FIGS. 4, and 14, a total number (28 in this embodiment) of the plurality of second sprocket teeth 34 is smaller than a total number (40 in this embodiment) of the plurality of first sprocket teeth 24. However, the total number of plurality of first sprocket teeth 24 is not limited to this embodiment. The total number of the plurality of second sprocket teeth 34 is not limited to this embodiment. For example, the total number of the plurality of second sprocket teeth can be 26. The total number of the plurality of first sprocket teeth can be 38. The plurality of first sprocket teeth 24 is made of a first material having a first wear resistance. The plurality of second sprocket teeth 34 is made of a second material having a second wear resistance. The first wear resistance is greater than the second wear resistance. However, the first wear resistance can be equal to or less than the second wear resistance. Examples of the first material include iron, stainless steel, and a metallic material with a plated layer. The plated layer can include, for example, nickel chrome plating plated on a base material made on an aluminum alloy. Examples of the second material include iron, stainless steel, aluminum, and titanium.

Figure 15:
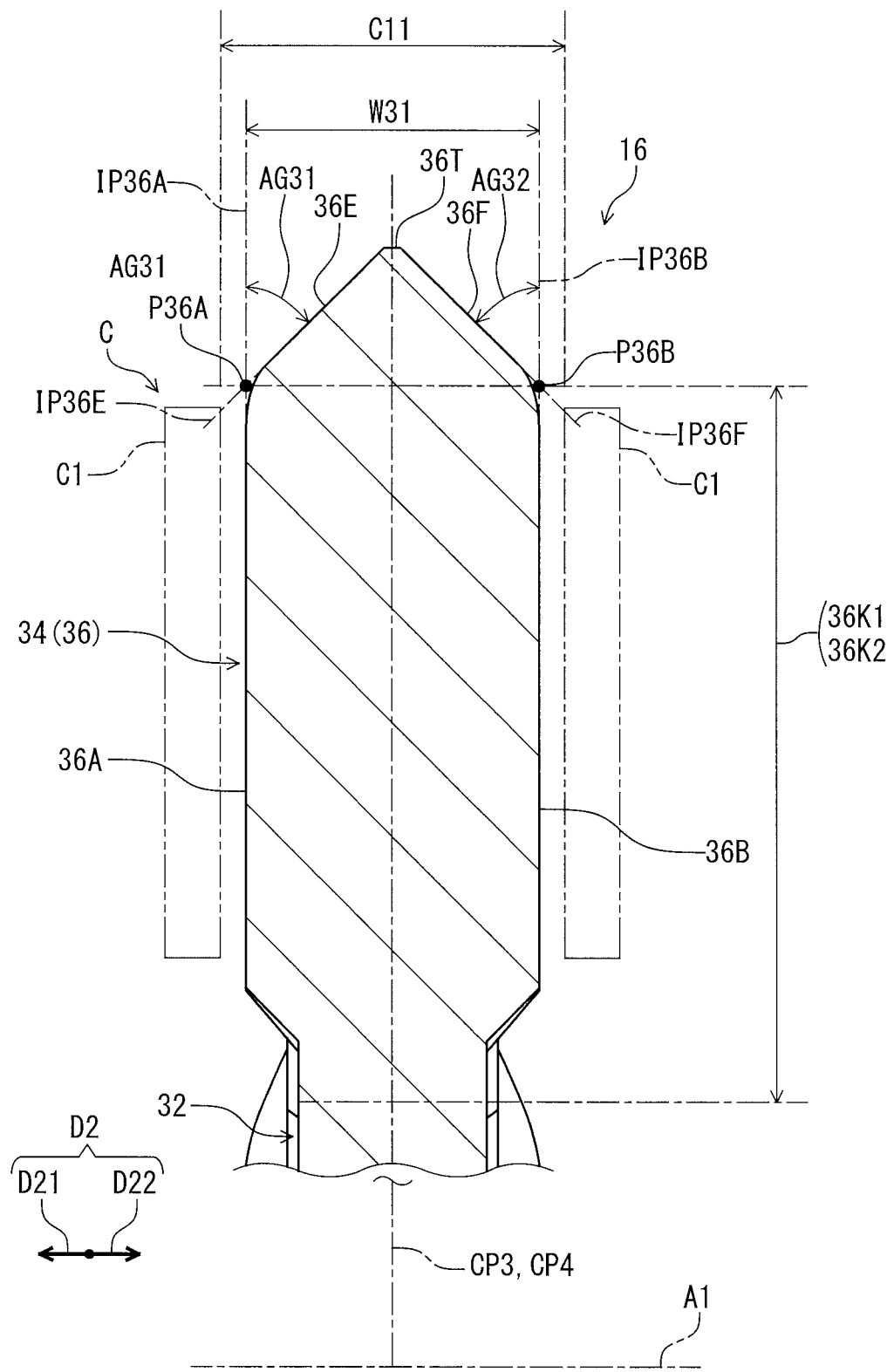
FIG. 15 is a cross-sectional view of the first sprocket taken along line XV-XV of FIG. 14.

As seen in FIG. 15, the plurality of third tooth 36 is configured to engage with the outer link space C11 provided between the opposed pair of outer link plates C1 of the bicycle chain C. The third teeth 36 extends radially outwardly from the first sprocket body 22 to be received in only the outer link space C11.

The plurality of third teeth 36 has a third maximum axial width W31 defined in the axial direction D2. The third tooth 36 includes a third chain-engagement surface 36A and a third additional chain-engagement surface 36B. The third chain-engagement surface 36A can also be referred to as a chain-engagement surface 36A. The third additional chain-engagement surface 36B can also be referred to as a chain-engagement surface 36B. The third chain-engagement surface (the chain-engagement surface) 36A faces in the axial direction D2. The third additional chain-engagement surface 36B (the chain-engagement surface) faces in the axial direction D2 and is provided on a reverse side of the third chain-engagement surface 36A. The third maximum axial width W31 is defined between the third chain-engagement surface 36A and the third additional chain-engagement surface 36B in the axial direction D2.

The third tooth 36 has a third center plane CP3 defined to bisect the third maximum axial width W31 in the axial direction D2. The third center plane CP3 is perpendicular to the rotational center axis A1.

At least one tooth of the plurality of third teeth 36 includes a radially outermost edge 36T and an inclined surface 36E, and an inclined surface 36F. The third tooth 36 has a third radial length 36L which is radially defined from the root circle RC1 to the radially outermost edge 36T. The inclined surface 36E extends from the chain-engagement surface 36A toward the radially outermost edge 36T. The inclined surface 36F extends from the chain-engagement surface 36B toward the radially outermost edge 36T. The inclined surface 36E is inclined relative to the chain-engagement surface 36A by an inclination angle AG31 which is equal to or larger than 40 degrees. The inclined surface 36F is inclined relative to the chain-engagement surface 36B by an inclination angle AG32 which is equal to or larger than 40 degrees. In this embodiment, the inclination angle AG31 is equal to the inclination angle AG32. The inclination angle AG31 is 45 degrees. The inclination angle AG32 is 45 degrees. However, the inclination angles AG31 and AG32 are not limited to this embodiment and the above ranges. The inclination angle AG31 can be different from the inclination angle AG32. The inclination angle AG31 can be 90 degrees. The inclination angle AG32 can be 90 degrees. Preferably, the inclination angles AG31 and AG32 are in a range less than or equal to 90 degrees and larger than or equal to 40 degrees.

Each of the inclination angles AG31 and AG32 is larger than the first inclination angle AG11 (FIG. 5) and the first additional inclination angle AG12 (FIG. 5). However, at least one of the inclination angels AG31 and AG32 can be equal to or smaller than at least one of the first inclination angle AG11 (FIG. 5) and the first additional inclination angle AG12 (FIG. 5).

An imaginary plane IP36A is defined along the chain-engagement surface 36A. An imaginary plane IP36B is defined along the chain-engagement surface 36B. An imaginary plane IP36E is defined along the inclination surface 36E. An imaginary plane IP36F is defined along the inclination surface 36F. A radial distance 36K1 is radially defined from the root circle RC1 to a cross point P36A of the imaginary planes IP36A and IP36E. A radial distance 36K2 is radially defined from the root circle RC1 to a cross point P36B of the imaginary planes IP36B and IP36F. The radial distance 36K2 is equal to the radial distance 36K1. However, the radial distance 36K2 can be different from the radial distance 36K1.

Each of the radial distances 36K1 and 36K2 is larger than the radial distances 26K1 and 26K2 (FIG. 5). Each of the radial distances 36K1 and 36K2 is larger than the radial distances 28K1 and 28K2 (FIG. 6). However, at least one of the radial distances 36K1 and 36K2 can be equal to or smaller than at least one of the radial distances 26K1 and 26K2 (FIG. 5). At least one of the radial distances 36K1 and 36K2 can be equal to or smaller than at least one of the radial distances 28K1 and 28K2 (FIG. 6).

The third radial length 36L is larger than the first radial length 26L (FIG. 5). However, the third radial length 36L can be equal to or smaller than the first radial length 36L (FIG. 5).

Figure 16:
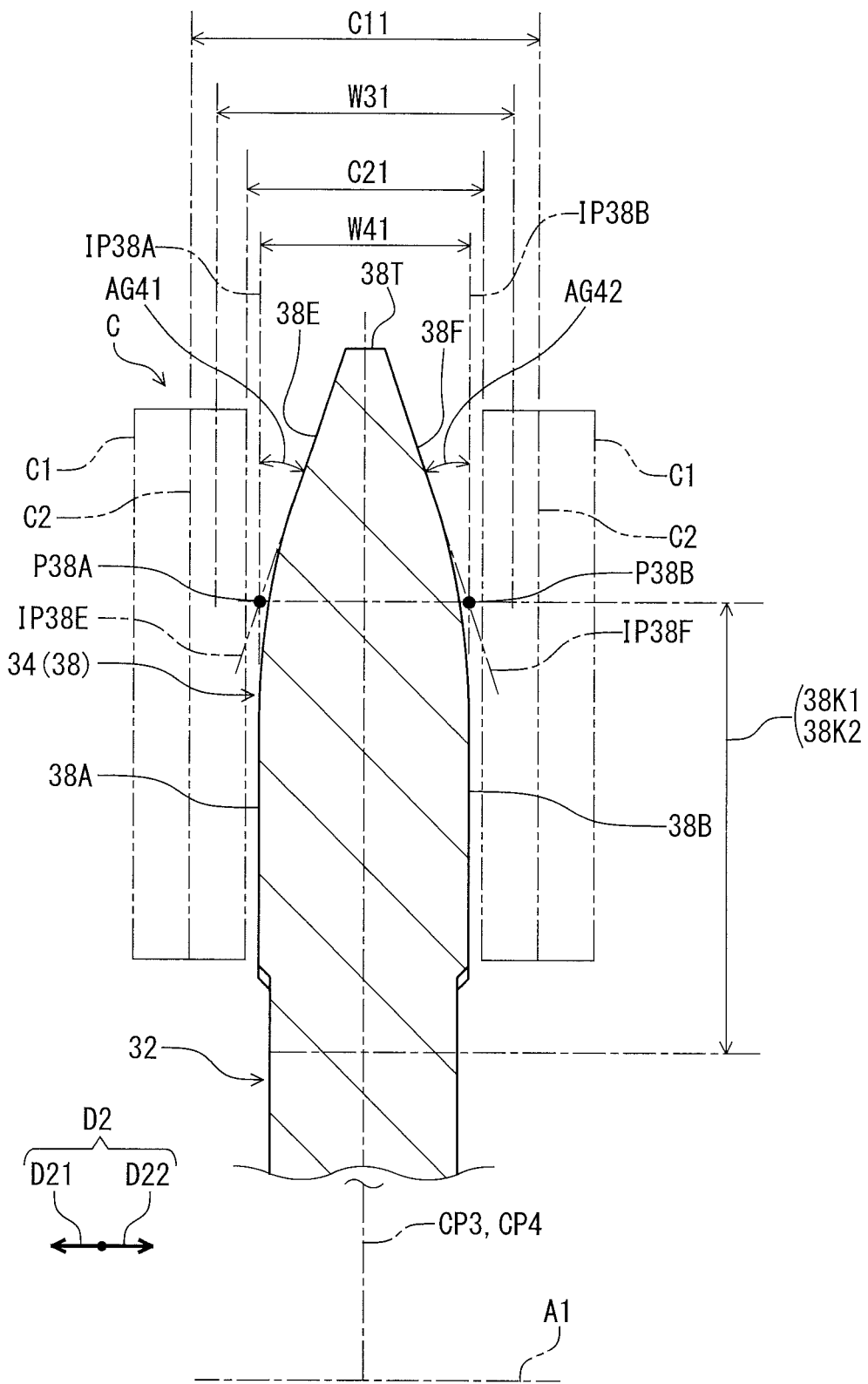
FIG. 16 is a cross-sectional view of the first sprocket taken along line XVI-XVI of FIG. 14.

As seen in FIG. 16, the plurality of fourth teeth 38 is configured to engage with the inner link space C21 provided between the opposed pair of inner link plates C2 of the bicycle chain C. The fourth tooth 38 extends radially outwardly from the second sprocket body 32 to be received in only the inner link space C21.

The plurality of fourth teeth 38 has a fourth maximum axial width W41 defined in the axial direction D2. The fourth tooth 38 includes a fourth chain-engagement surface 38A and a fourth additional chain-engagement surface 38B. The fourth chain-engagement surface 38A faces in the axial direction D2. The fourth additional chain-engagement surface 38B faces in the axial direction D2 and is provided on a reverse side of the fourth chain-engagement surface 38A. The fourth maximum axial width W41 is defined between the fourth chain-engagement surface 38A and the fourth additional chain-engagement surface 38B in the axial direction D2.

The fourth tooth 38 has a fourth center plane CP4 defined to bisect the fourth maximum axial width W41 in the axial direction D2. The fourth center plane CP4 is perpendicular to the rotational center axis A1. In this embodiment, the fourth center plane CP4 is coincident with the third center plane CP3. However, the fourth center plane CP4 can be offset from the third center plane CP3 in the axial direction D2.

As seen in FIG. 16, the third maximum axial width W31 is larger than the fourth maximum axial width W41. In other words, the fourth maximum axial width W41 is smaller than the third maximum axial width W31. The third maximum axial width W31 is smaller than an axial width of the outer link space C11 and is larger than an axial width of the inner link space C21. The fourth maximum axial width W41 is smaller than the axial width of the inner link space C21. However, the third maximum axial width W31 can be equal to or smaller than the fourth maximum axial width W41.

At least one tooth of the plurality of third teeth 38 includes a radially outermost edge 38T and an inclined surface 38E, and an inclined surface 38F. The fourth tooth 38 has a fourth radial length 38L which is radially defined from the root circle RC1 to the radially outermost edge 38T. The inclined surface 38E extends from the chain-engagement surface 38A toward the radially outermost edge 38T. The inclined surface 38F extends from the chain-engagement surface 38B toward the radially outermost edge 38T. The inclined surface 38E is inclined relative to the chain-engagement surface 38A by an inclination angle AG41. The inclined surface 38F is inclined relative to the chain-engagement surface 38B by an inclination angle AG42. In this embodiment, the inclination angle AG41 is equal to the inclination angle AG42. However, the inclination angle AG41 can be different from the inclination angle AG42.

The inclination angle AG31 (FIG. 15) is larger than the inclination angles AG41 and AG42. The inclination angle AG42 is larger than the first inclination angle AG11 and the first additional inclination angle AG12. However, at least one of the inclination angles AG31 and AG32 (FIG. 15) can be equal to or smaller than at least one of the inclination angles AG41 and AG42.

An imaginary plane IP38A is defined along the chain-engagement surface 38A. An imaginary plane IP38B is defined along the chain-engagement surface 38B. An imaginary plane IP38E is defined along the inclination surface 38E. An imaginary plane IP38F is defined along the inclination surface 38F. A radial distance 38K1 is radially defined from the root circle RC1 to a cross point P38A of the imaginary planes IP38A and IP38E. A radial distance 38K2 is radially defined from the root circle RC1 to a cross point P38B of the imaginary planes IP38B and IP38F. The radial distance 38K2 is equal to the radial distance 38K1. However, the radial distance 38K2 can be different from the radial distance 38K1.

Each of the radial distances 36K1 and 36K2 (FIG. 15) is larger than the radial distances 38K1 and 38K2. However, at least one of the radial distances 36K1 and 36K2 can be equal to or smaller than at least one of the radial distances 38K1 and 38K2.

The third radial length 36L (FIG. 15) is larger than the fourth radial length 38L. However, the third radial length 36L (FIG. 15) can be equal to or smaller than the fourth radial length 38L.

In this embodiment, the structure of the third tooth 36 is substantially the same as that of the first tooth 26. The structure of the fourth tooth 38 is substantially the same as that of the second tooth 28. Thus, they will not be described in detail here for the sake of brevity.

The structures of the third tooth 36 and the fourth tooth 38 are not limited to this embodiment. The third tooth 36 can have a structure different from that of the first tooth 26. The fourth tooth 38 can have a structure different from that of the second tooth 28. At least one of the third tooth 36 and the fourth tooth 38 can have other shapes such as a twisted shape or a curved shape.

Figure 17:
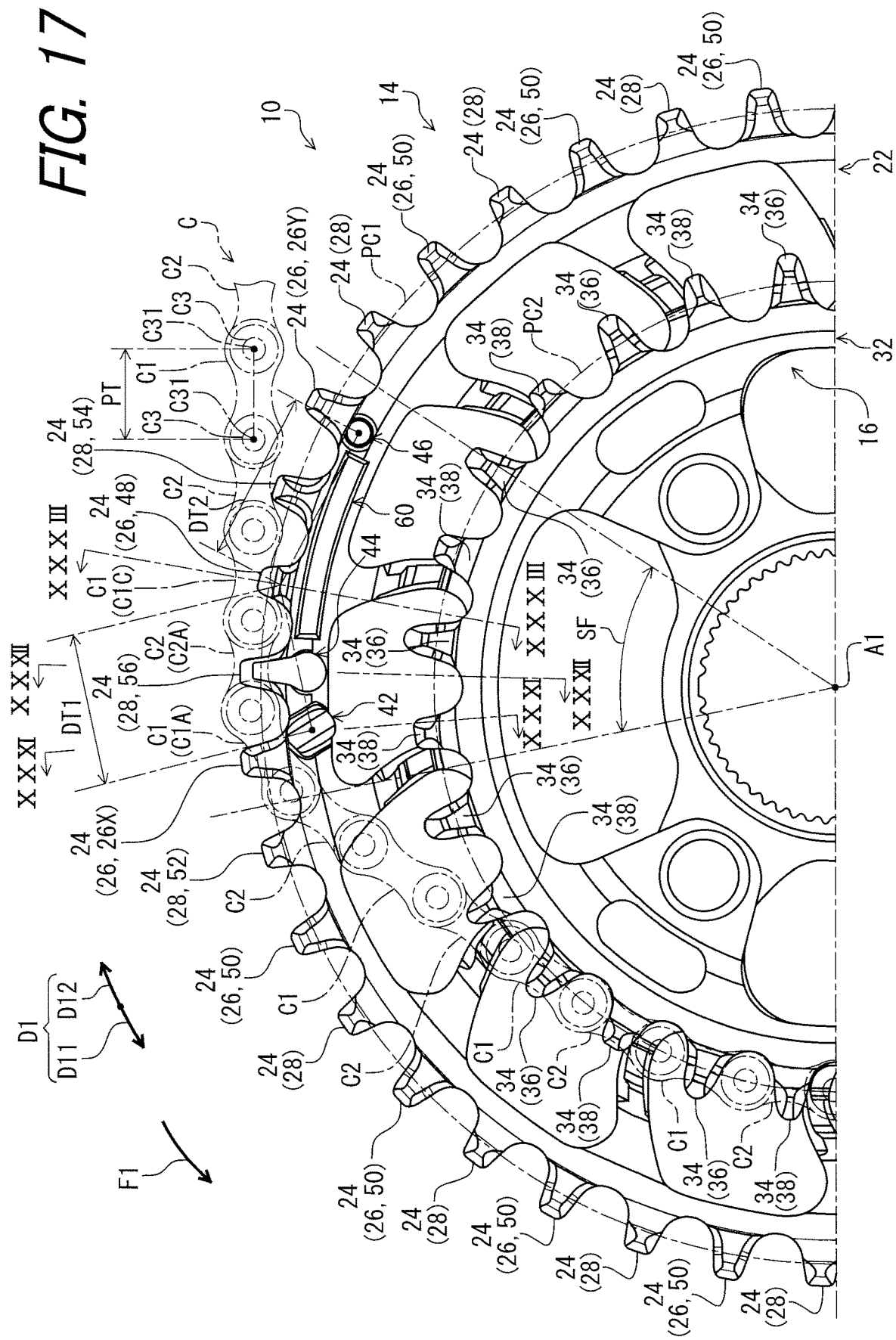
FIG. 17 is a partial side elevational view of the bicycle sprocket assembly illustrated in FIG. 1 with a bicycle chain (first shifting operation).

As seen in FIG. 17, the first sprocket 14 comprises a first shifting facilitation projection 42 to facilitate the shifting operation. The first shifting facilitation projection 42 is configured to facilitate a first shifting operation in which the bicycle chain C is shifted from the second sprocket 16 to the first sprocket 14. The first shifting facilitation projection 42 is provided on the first side surface 14A to lift the outer link plate CIA in the first shifting operation. In this embodiment, the first shifting facilitation projection 42 is secured to the first sprocket body 22 with a fastening structure such as a rivet.

The first sprocket 14 comprises a first additional shifting facilitation projection 44 configured to facilitate the first shifting operation. The first additional shifting facilitation projection 44 is provided on the first side surface 14A to move the inner link plate C2A toward the first sprocket 14 in the first shifting operation. In this embodiment, the first additional shifting facilitation projection 44 is secured to the first sprocket body 22 with a fastening structure such as a rivet.

Figure 18:
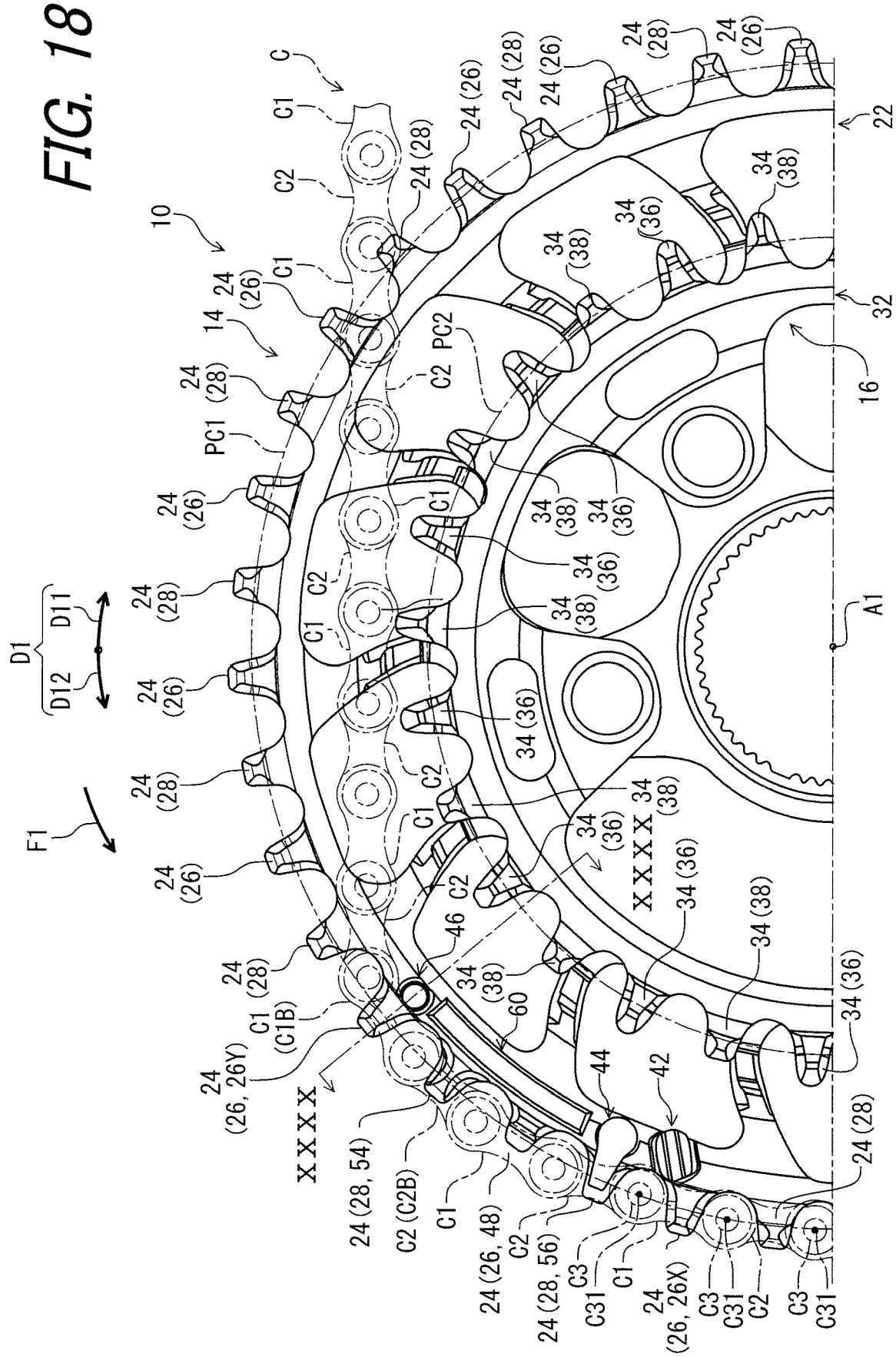
FIG. 18 is a partial side elevational view of the bicycle sprocket assembly illustrated in FIG. 1 with the bicycle chain (second shifting operation).

As seen in FIG. 18, the first sprocket 14 comprises a second shifting facilitation projection 46 to facilitate the shifting operation. The second shifting facilitation projection 46 is provided on the first side surface 14A to facilitate a second shifting operation in which the bicycle chain C is shifted from the first sprocket 14 to the second sprocket 16. The second shifting facilitation projection 46 is configured to engage with the outer link plate C1B to adjust a chain phase of the bicycle chain C for the second sprocket 16 while the bicycle chain C is shifted from the first sprocket 14 toward the second sprocket 16. In this embodiment, the second shifting facilitation projection 46 is secured to the first sprocket body 22 with a fastening structure such as a rivet.

As seen in FIG. 4, the first sprocket 14 comprises a pair of first shifting facilitation projections 42. The first sprocket 14 comprises a pair of first additional shifting facilitation projections 44. The first sprocket 14 comprises a pair of second shifting facilitation projections 46. However, a total number of the first shifting facilitation projections 42 is not limited to this embodiment. A total number of the first additional shifting facilitation projections 44 is not limited to this embodiment. A total number of the second shifting facilitation projections 46 is not limited to this embodiment. At least one of the first shifting facilitation projection 42, the first additional shifting facilitation projection 44, and the second shifting facilitation projection 46 can be omitted from the first sprocket 14.

The first sprocket 14 comprises a shifting facilitation area SF to facilitate a shifting operation in which the bicycle chain C is shifted between the first sprocket 14 and the second sprocket 16 adjacent to the first sprocket 14. In this embodiment, the first sprocket 14 comprises a pair of shifting facilitation areas SF. However, a total number of the shifting facilitation areas SF is not limited to this embodiment.

The first shifting facilitation projection 42, the first additional shifting facilitation projection 44, and the second shifting facilitation projection 46 are provided in the shifting facilitation area SF. The shifting facilitation area SF is defined from the first tooth 26X of the plurality of first teeth 26 to the first tooth 26Y of the plurality of first teeth 26. The first tooth 26X is the closest to the first shifting facilitation projection 42 among the plurality of first sprocket teeth 24. The first tooth 26Y is the closest to the second shifting facilitation projection 46 among the plurality of first sprocket teeth 24. The shifting facilitation area SF has an angular range smaller than 180 degrees. The shifting facilitation area SF has the angular range preferably smaller than 60 degrees.

As seen in FIG. 17, the plurality of first teeth 26 includes a shifting-facilitation tooth 48. The shifting-facilitation tooth 48 extends radially outwardly from the first sprocket body 22. The shifting-facilitation tooth 48 is provided in the shifting facilitation area SF.

The shifting-facilitation tooth 48 is configured to be first engaged with the outer link space C11 of the bicycle chain C in the first shifting operation in which the bicycle chain C is shifted from the second sprocket 16 to the first sprocket 14. The shifting-facilitation tooth 48 is provided on an upstream side of the first shifting facilitation projection 42 in the first circumferential direction D11 in which the bicycle sprocket assembly 12 is rotated about the rotational center axis A1 during pedaling. As seen in FIG. 17, the shifting-facilitation tooth 48 is spaced apart from the first shifting facilitation projection 42 by a first distance DT1 corresponding to two chain pitches PT of the bicycle chain C. The chain pitch PT is defined between the centers C31 of adjacent two pins C3 of the bicycle chain C. Examples of the chain pitch PT include 12.7 mm and 13 mm. The first pitch circle PC1 can be varied in accordance with the chain pitch.

The shifting-facilitation tooth 48 is provided on a downstream side of the second shifting facilitation projection 46 in the first circumferential direction D11 in which the bicycle sprocket assembly 12 is rotated about the rotational center axis A1 during pedaling. The shifting-facilitation tooth 48 is spaced apart from the second shifting facilitation projection 46 by a second distance DT2 corresponding to two chain pitches PT of the bicycle chain C.

Figure 19:
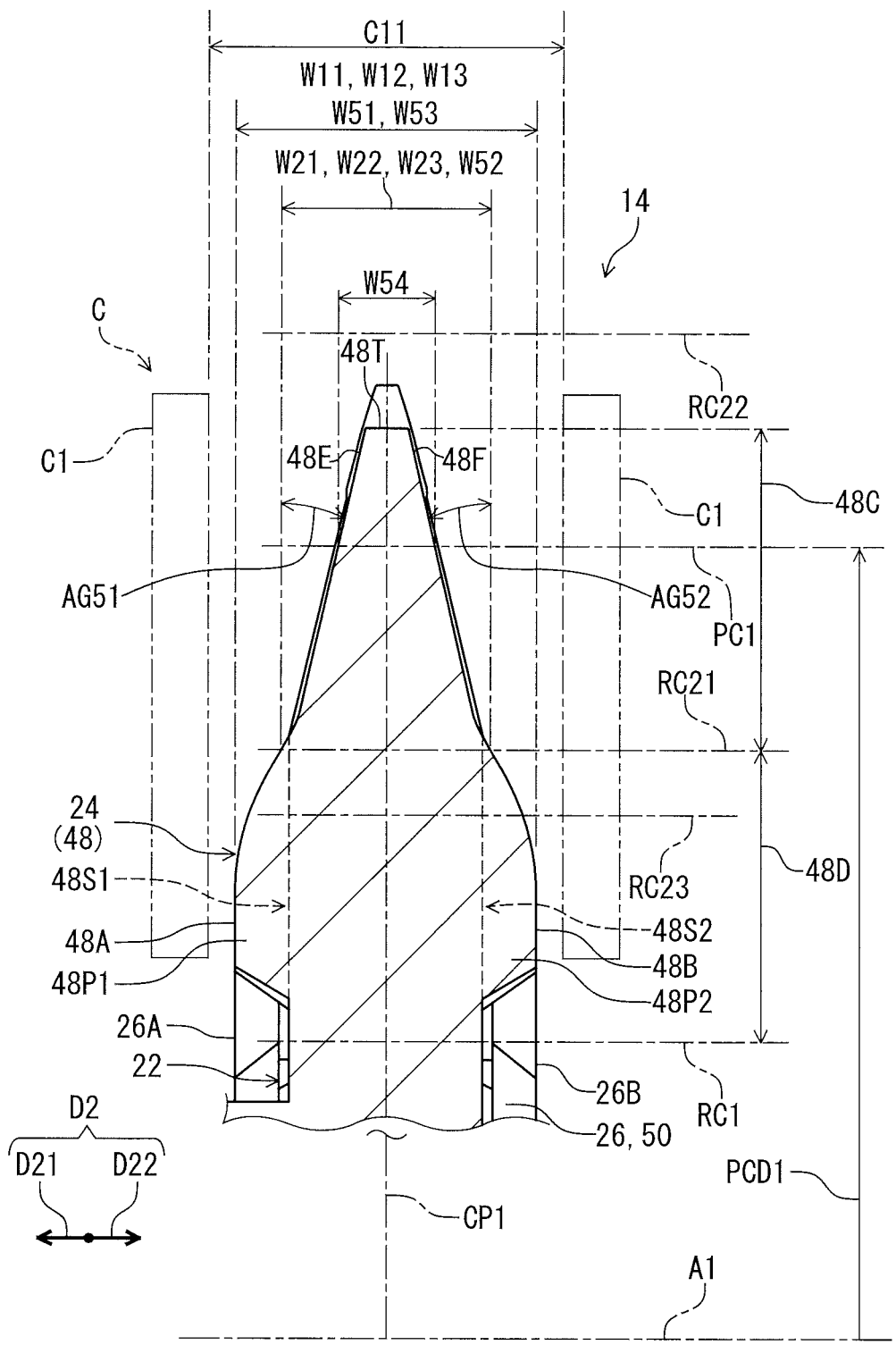
FIG. 19 is a cross-sectional view of the first sprocket taken along line XIX-XIX of FIG. 22.

As seen in FIG. 19, the shifting-facilitation tooth 48 is configured to engage with the outer link space C11 provided between the opposed pair of outer link plates C1 of the bicycle chain C. The shifting-facilitation tooth 48 extends radially outwardly from the first sprocket body 22 to be received in only the outer link space C11.

The shifting-facilitation tooth 48 has a maximum axial width W51 defined in the axial direction D2. The shifting-facilitation tooth 48 includes a chain-engagement surface 48A and an additional chain-engagement surface 48B. The chain-engagement surface 48A faces in the axial direction D2. The additional chain-engagement surface 48B faces in the axial direction D2 and is provided on a reverse side of the chain-engagement surface 48A. The maximum axial width W51 is defined between the chain-engagement surface 48A and the additional chain-engagement surface 48B in the axial direction D2.

The shifting-facilitation tooth 48 includes an inclined surface 48E, an inclined surface 48F, and a radially outermost edge 48T. The inclined surface 48E extends from the radially outermost edge 48T toward the chain-engagement surface 48A. The inclined surface 48F extends from the radially outermost edge 48T toward the additional chain-engagement surface 48B. The inclined surface 48E is inclined relative to the chain-engagement surface 48A by an inclination angle AG51. The inclined surface 48F is inclined relative to the additional chain-engagement surface 48B by an additional inclination angle AG52. The inclination angle AG51 is substantially equal to the additional inclination angle AG52. However, the inclination angle AG51 can be different from the additional inclination angle AG52.

The shifting-facilitation tooth 48 has a maximum axial top width W52 and a maximum axial bottom width W53. The maximum axial top width W52 is defined in the axial direction D2. The maximum axial bottom width W53 is defined in the axial direction D2. The shifting-facilitation tooth 48 includes a top portion 48C and a bottom portion 48D. The top portion 48C extends radially outwardly from the bottom portion 48D. The top portion 48C has the maximum axial top width W52. The bottom portion 48D has the maximum axial bottom width W53. The maximum axial top width W52 is defined on the reference circle RC11.

In this embodiment, the maximum axial top width W52 is different from the maximum axial bottom width W53. The maximum axial top width W52 of the shifting-facilitation tooth 48 is smaller than the maximum axial bottom width W53 of the shifting-facilitation tooth 48. However, the maximum axial top width W52 can be equal to or larger than the maximum axial bottom width W53. At least one of the maximum axial width W51, the maximum axial top width W52, and the maximum axial bottom width W53 can be different from another of the maximum axial width W51, the maximum axial top width W52, and the maximum axial bottom width W53.

A ratio of the maximum axial top width W52 to the maximum axial bottom width W53 ranges from 10% to 90%. The ratio of the maximum axial top width W52 to the maximum axial bottom width W53 preferably ranges from 20% to 80%. More preferably, the ratio of the maximum axial top width W52 to the maximum axial bottom width W53 ranges from 30% to 70. In this embodiment, the ratio of the maximum axial top width W52 to the maximum axial bottom width W53 is 65%. However, the ratio of the maximum axial top width W52 to the maximum axial bottom width W53 is not limited to this embodiment and the above ranges.

The shifting-facilitation tooth 48 has an additional axial width W54. The additional axial width W54 is defined in the axial direction D2. The additional axial width W54 is defined on the first pitch circle PC1. The additional axial width W54 is smaller than the maximum axial top width W52. A ratio of the additional axial width W54 to the maximum axial bottom width W53 ranges from 10% to 90%. The ratio of the additional axial width W54 to the maximum axial bottom width W53 preferably ranges from 20% to 50%. In this embodiment, the ratio of the additional axial width W54 to the maximum axial bottom width W53 is 34%. However, the ratio of the additional axial width W54 to the maximum axial bottom width W53 is not limited to this embodiment and the above ranges.

The shifting-facilitation tooth 48 has a symmetrical shape with respect to the first center plane CP1. However, the shifting-facilitation tooth 48 can have an asymmetrical shape with respect to the first center plane CP1.

Figure 20:
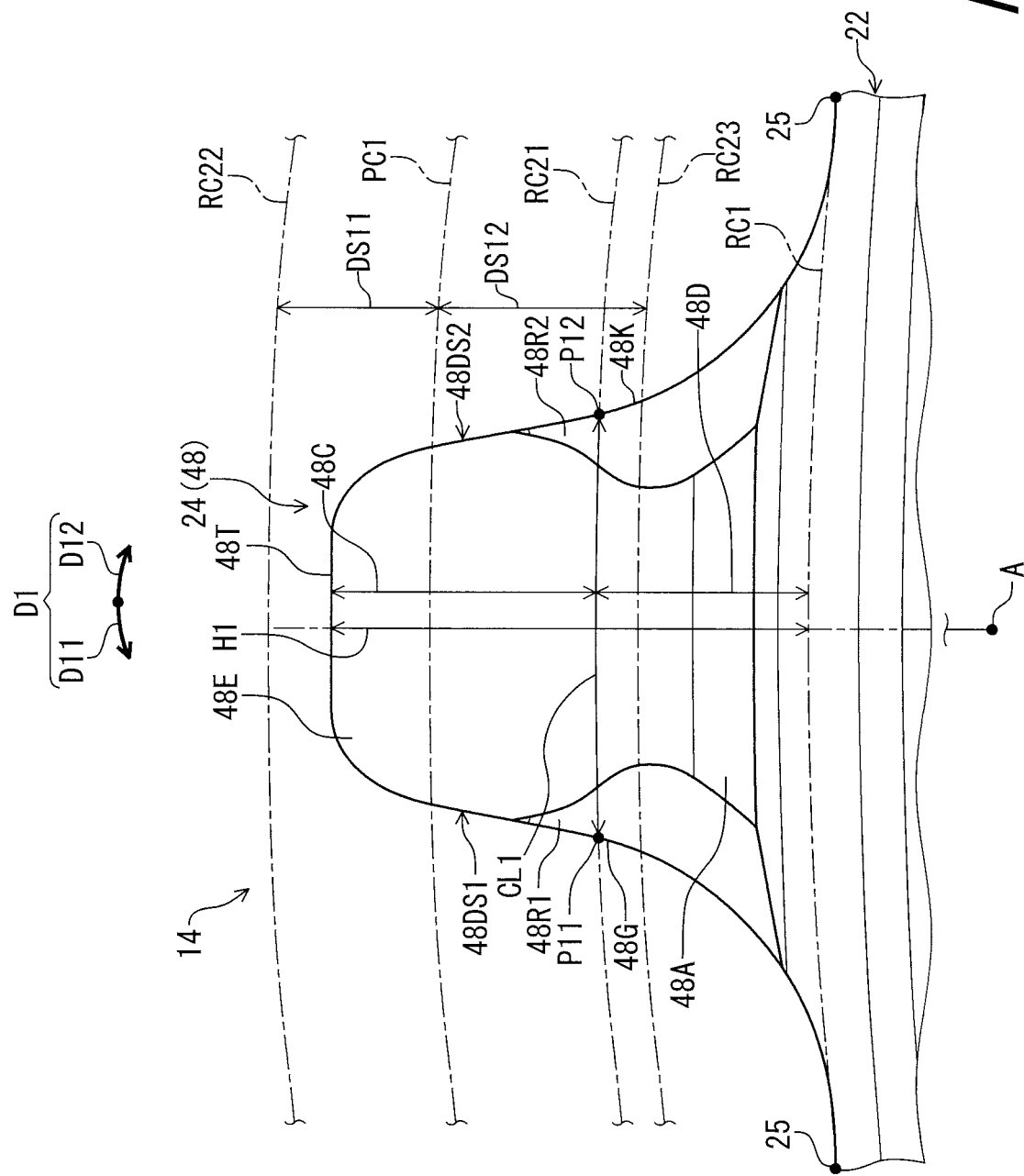
FIG. 20 is a side elevational view of a shifting-facilitation tooth of the first sprocket of the bicycle sprocket assembly illustrated in FIG. 1.

As seen in FIG. 20, the top portion 48C is provided radially outwardly of the reference circle RC21. The bottom portion 48D is provided radially inwardly of the reference circle RC21. The top portion 48C is provided between the reference circle RC21 and the radially outermost edge 48T of the shifting-facilitation tooth 48. The bottom portion 48D is provided between the reference circle RC21 and the first root circle RC1.

As seen in FIG. 19, the shifting-facilitation tooth 48 includes a first projection 48P1 provided on one of a first axial side 48S1 and a second axial side 48S2 of the bottom portion 48D. The shifting-facilitation tooth 48 includes a second projection 48P2 provided on another of the first axial side 48S1 and the second axial side 48S2 of the bottom portion 48D. The first axial side 48S1 is reverse side of the second axial side 48S2 in the axial direction D2 parallel to the rotational center axis A1. In this embodiment, the first projection 48P1 is provided on the first axial side 48S1 of the bottom portion 48D. The second projection 48P2 is provided on the second axial side 48S2. However, at least one of the first projection 48P1 and the second projection 48P2 can be omitted from the shifting-facilitation tooth 48.

In this embodiment, the first projection 48P1 is provided on only the first axial side 48S1 of the bottom portion 48D. The second projection 48P2 is provided on only the second axial side 48S2 of the bottom portion 48D. However, the first projection 48P1 can be provided on the first axial side 48S1 of the top portion 48C and the bottom portion 48D. The second projection 48P2 can be provided on the second axial side 48S2 of the top portion 48C and the bottom portion 48D.

As seen in FIG. 20, the shifting-facilitation tooth 48 includes a driving surface 48DS1 and a non-driving surface 48DS2. The driving surface 48DS1 faces in the first circumferential direction D11. The non-driving surface 48DS2 faces in the second circumferential direction D12.

As seen in FIGS. 9 and 20, the bottom portion 48D of the shifting-facilitation tooth 48 includes the chain-engagement surface 48A, a first bottom driving surface 48G, and a first chamfer 48R1. The first chamfer 48R1 is provided between the chain-engagement surface 48A and the first bottom driving surface 48G. The first bottom driving surface 48G faces in the first circumferential direction D11. The driving surface 48DS1 includes the first bottom driving surface 48G.

The bottom portion 48D of the shifting-facilitation tooth 48 includes a first bottom non-driving surface 48K and a second chamfer 48R2. The second chamfer 48R2 is provided between the chain-engagement surface 48A and the first bottom non-driving surface 48K. The first bottom non-driving surface 48K faces the second circumferential direction D12 opposite to the first circumferential direction D11. The non-driving surface 48DS2 includes the first bottom non-driving surface 48K.

Figure 21:
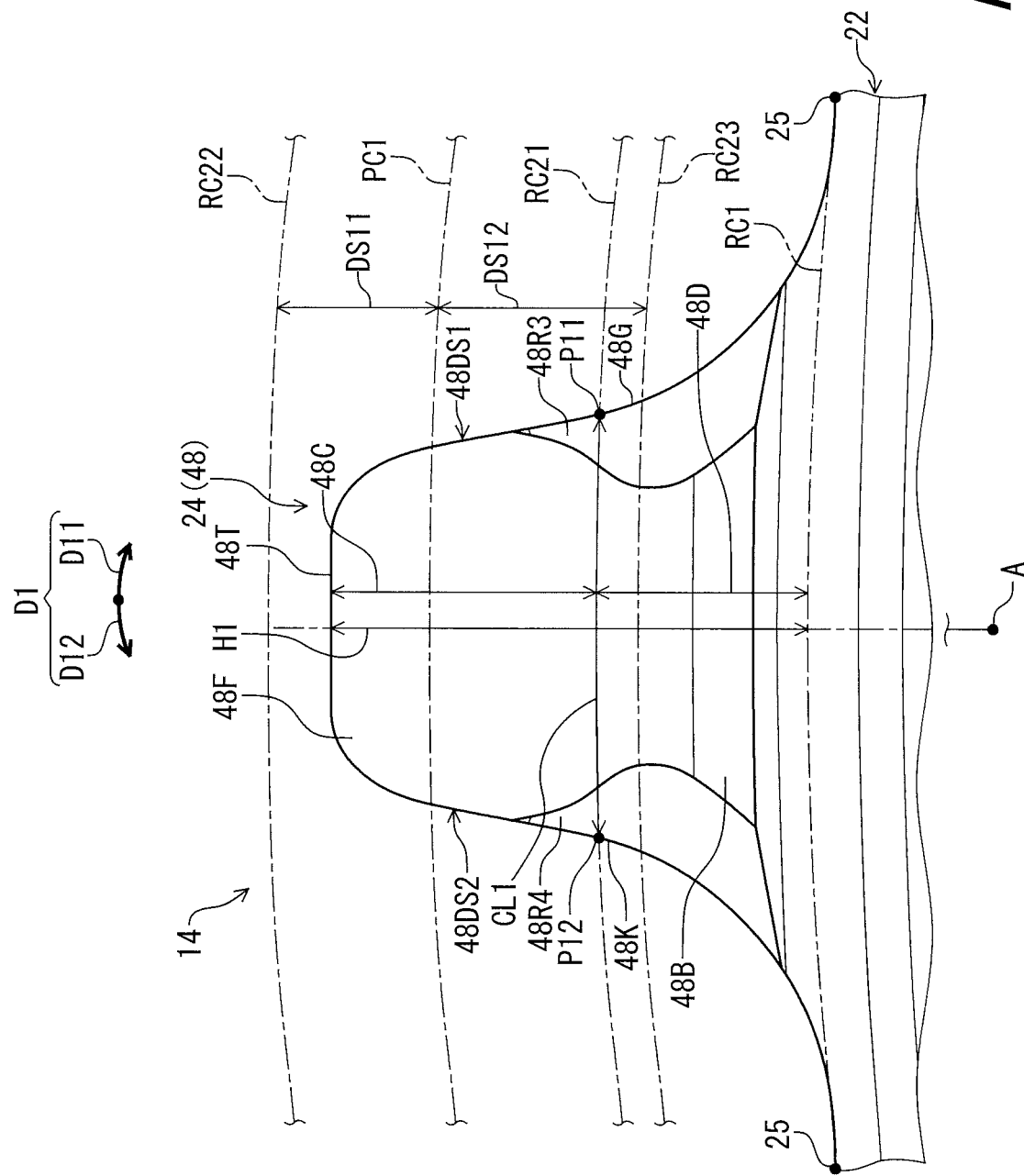
FIG. 21 is another side elevational view of a shifting-facilitation tooth of the first sprocket of the bicycle sprocket assembly illustrated in FIG. 1.

As seen in FIGS. 11 and 21, the bottom portion 48D of the shifting-facilitation tooth 48 includes a third chamfer 48R3. The third chamfer 48R3 is provided between the additional chain-engagement surface 48B and the first bottom driving surface 48G. The top portion 48C and the bottom portion 48D includes the third chamfer 48R3. The chain-engagement surface 48A is provided in only the bottom portion 48D.

The bottom portion 48D of the shifting-facilitation tooth 48 includes a fourth chamfer 48R4. The fourth chamfer 48R4 is provided between the additional chain-engagement surface 48B and the first bottom non-driving surface 48K. The top portion 48C and the bottom portion 48D includes the fourth chamfer 48R4. The additional chain-engagement surface 48B is provided in only the bottom portion 48D.

As seen in FIG. 17, the plurality of first teeth 26 includes a first driving tooth 50. The first driving tooth 50 extends radially outwardly from the first sprocket body 22. The first driving tooth 50 is provided outside the shifting facilitation area SF.

As seen in FIG. 5, the first driving tooth 50 has the first maximum axial width W11, the first chain-engagement surface 26A, the first additional chain-engagement surface 26B, the first inclined surface 26E, the first additional inclined surface 26F, the radially outermost edge 26T, the first inclination angle AG11, the first additional inclination angle AG12, the maximum axial top width W12, and the maximum axial bottom width W13. Thus, the first driving tooth 50 will not be described in detail here for the sake of brevity. As seen in FIG. 6, the plurality of second teeth 28 has the maximum axial width W21 smaller than the maximum axial bottom width W13 of the first driving tooth 50. In other words, the maximum axial bottom width W13 of the first driving tooth 50 is larger than the maximum axial width W21 of the second tooth 28.

As seen in FIG. 19, the maximum axial top width W52 of the shifting-facilitation tooth 48 is smaller than the maximum axial top width W12 of the first driving tooth 50. The maximum axial bottom width W53 of the shifting-facilitation tooth 48 is substantially equal to the maximum axial bottom width W13 of the first driving tooth 50. The maximum axial width W51 and the maximum axial bottom width W53 are substantially equal to the first maximum axial width W11, the maximum axial top width W12, and the maximum axial bottom width W13. The maximum axial top width W52 is substantially equal to the maximum axial width W21, the maximum axial top width W22, and the maximum axial bottom width W23. However, the dimensional relationship between the widths W11, W12, W13, W51, W52, and W53 is not limited to this embodiment. The dimensional relationship between the widths W21, W22, W23, and W52 is not limited to this embodiment.

As seen in FIG. 17, the plurality of second teeth 28 includes a second driving tooth 52 extending radially outwardly from the first sprocket body 22. The second driving tooth 52 is provided outside the shifting facilitation area SF.

As seen in FIG. 6, the second driving tooth 52 has the maximum axial width W21, the second chain-engagement surface 28A, the second additional chain-engagement surface 28B, the second inclined surface 28E, the second additional inclined surface 28F, the radially outermost edge 28T, the second inclination angle AG21, the second additional inclination angle AG22, the maximum axial top width W22, and the maximum axial bottom width W23. Thus, the second driving tooth 52 is substantially identical with second tooth 28, and will not be described in detail here for the sake of brevity.

As seen in FIG. 19, the maximum axial top width W52 of the shifting-facilitation tooth 48 is smaller than the maximum top with W22 of the second driving tooth 52. However, the maximum axial top width W52 of the shifting-facilitation tooth 48 can be equal to or larger than the maximum top with W22 of the second driving tooth 52.

As seen in FIG. 18, the plurality of second teeth 28 includes a derailing tooth 54 configured to first derail the bicycle chain C from the first sprocket 14 in a second shifting operation in which the bicycle chain C is shifted from the first sprocket 14 to the second sprocket 16. The shifting-facilitation tooth 48 can also be referred to as a first shifting-facilitation tooth 48. The derailing tooth 54 can also be referred to as a second shifting-facilitation tooth 54.

The shifting-facilitation tooth 48 is provided on a downstream side of the derailing tooth 54 in the first circumferential direction D11 in which the bicycle sprocket assembly 12 is rotated about the rotational center axis A1 during pedaling. The shifting-facilitation tooth 48 is adjacent to the derailing tooth 54 in the first circumferential direction D11 without another tooth between the shifting-facilitation tooth 48 and the derailing tooth 54.

Figure 23:
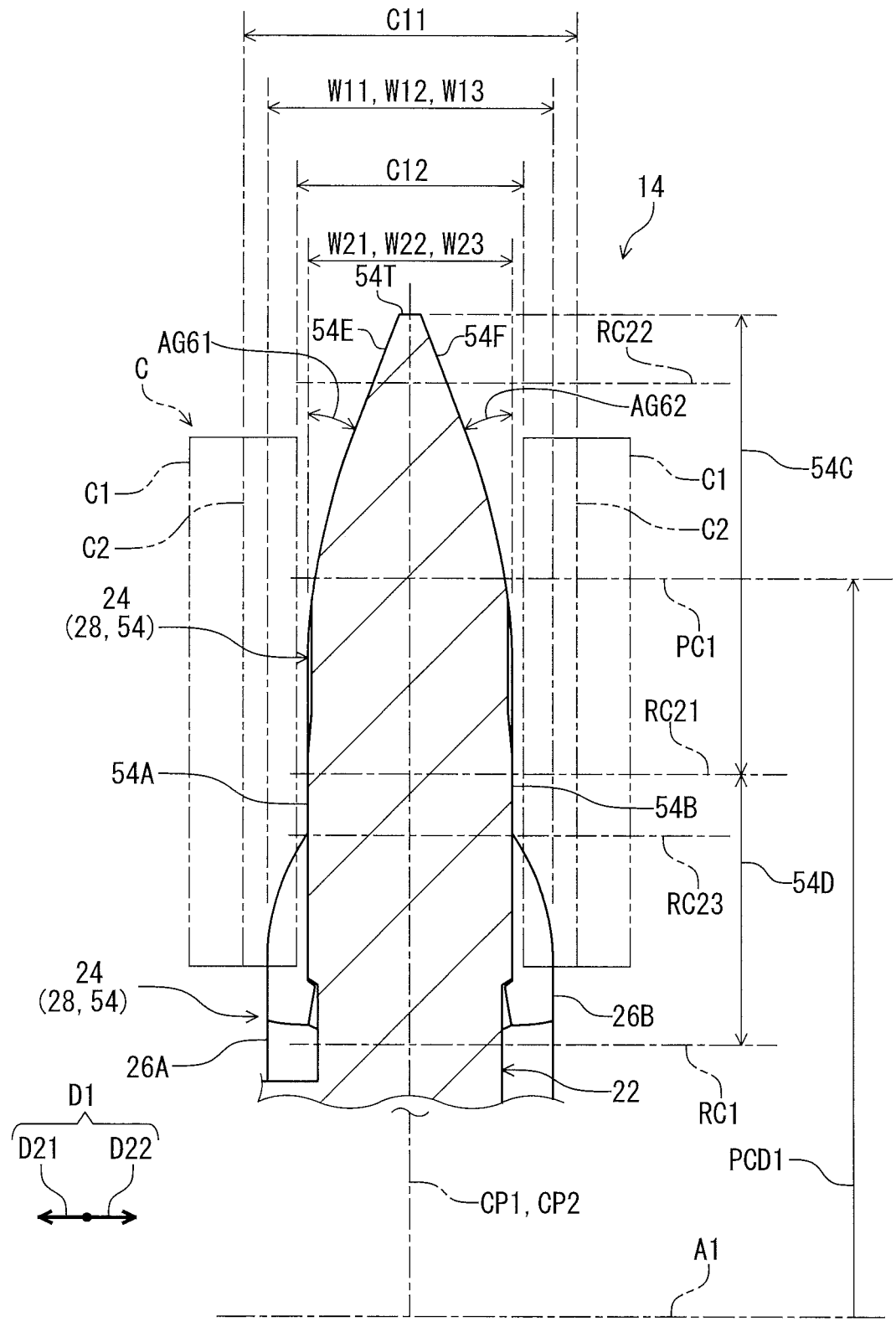
FIG. 23 is a cross-sectional view of the first sprocket taken along line XXIII-XXIII of FIG. 22.

As seen in FIG. 23, the derailing tooth 54 is configured to engage with the inner link space C21 provided between the opposed pair of inner link plates C2 of the bicycle chain C. The derailing tooth 54 extends radially outwardly from the first sprocket body 22 to be received in only the inner link space C21.

The derailing tooth 54 has the maximum axial width W21 defined in the axial direction D2. The derailing tooth 54 includes a chain-engagement surface 54A and an additional chain-engagement surface 54B. The chain-engagement surface 54A faces in the axial direction D2. The additional chain-engagement surface 54B faces in the axial direction D2 and is provided on a reverse side of the chain-engagement surface 54A. The maximum axial width W21 is defined between the chain-engagement surface 54A and the additional chain-engagement surface 54B in the axial direction D2.

The derailing tooth 54 includes an inclined surface 54E, an additional inclined surface 54F, and a radially outermost edge 54T. The inclined surface 54E extends from the radially outermost edge 54T toward the chain-engagement surface 54A. The additional inclined surface 54F extends from the radially outermost edge 54T toward the additional chain-engagement surface 54B. The inclined surface 54E is inclined relative to the chain-engagement surface 54A by a second inclination angle AG61. The additional inclined surface 54F is inclined relative to the additional chain-engagement surface 54B by a second additional inclination angle AG62. The second inclination angle AG61 is substantially equal to the second additional inclination angle AG62. However, the second inclination angle AG61 can be different from the second additional inclination angle AG62.

As seen in FIG. 23, the derailing tooth 54 has a maximum axial top width W22 and a maximum axial bottom width W23. The derailing tooth 54 includes a top portion 54C and a bottom portion 54D. The top portion 54C extends radially outwardly from the bottom portion 54D. The top portion 54C has the maximum axial top width W22. The bottom portion 54D has the maximum axial bottom width W23. The maximum axial width W21 of the derailing tooth 54 is smaller than the maximum axial bottom width W13 of the first tooth 26.

Figure 24:
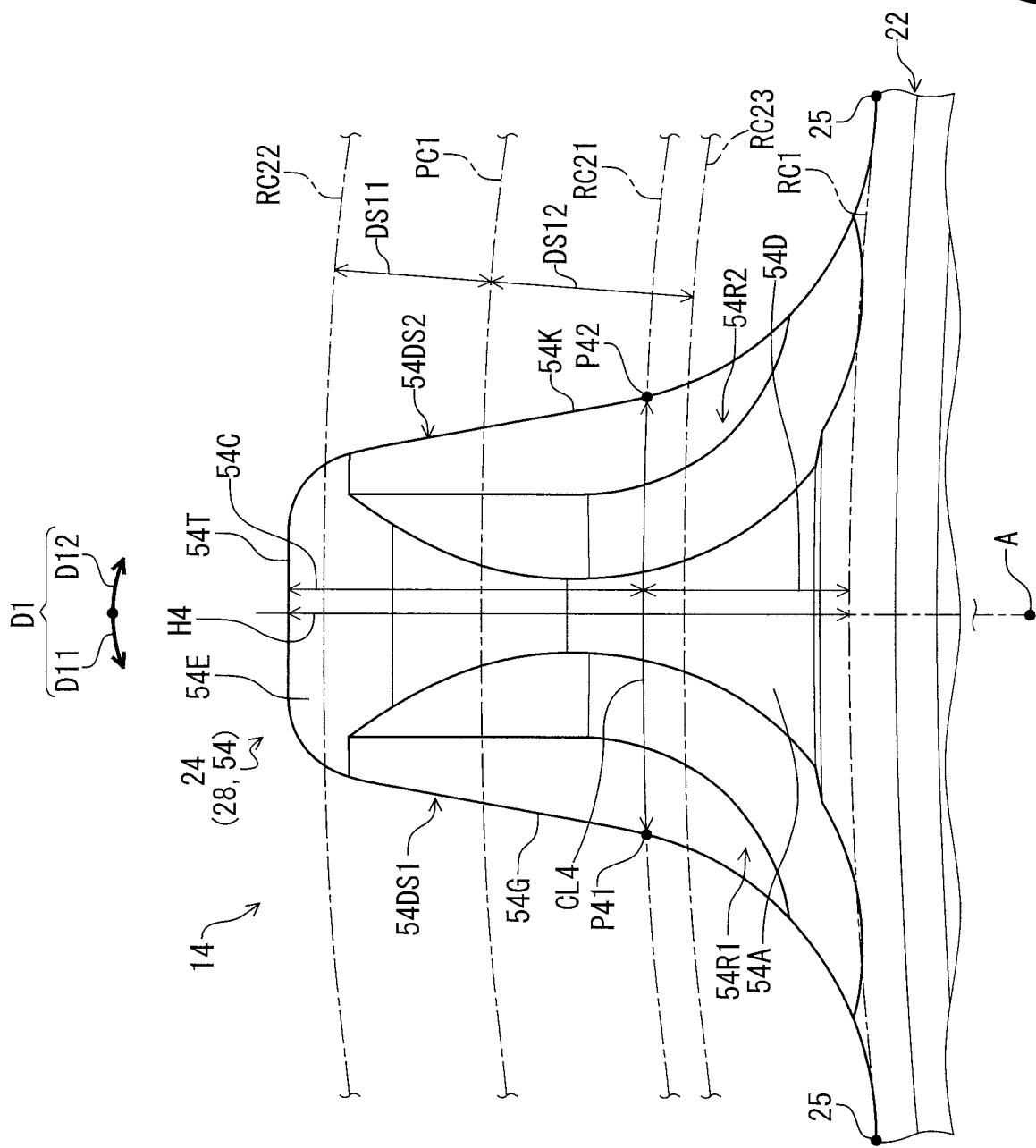
FIG. 24 is a side elevational view of a derailing tooth of the first sprocket of the bicycle sprocket assembly illustrated in FIG. 1.

As seen in FIG. 24, the top portion 54C is provided radially outwardly of the reference circle RC21. The bottom portion 54D is provided radially inwardly of the reference circle RC21. The top portion 54C is provided between the reference circle RC21 and the radially outermost edge 54T of the derailing tooth 54. The bottom portion 54D is provided between the reference circle RC21 and the first root circle RC1.

The derailing tooth 54 includes a driving surface 54DS1 and a non-driving surface 54DS2. The driving surface 54DS1 faces in the first circumferential direction D11 in which the bicycle sprocket assembly 12 is rotated about the rotational center axis A1 during pedaling. The non-driving surface 54DS2 faces in the second circumferential direction D12 opposite to the first circumferential direction D11.

As seen in FIGS. 9 and 24, the bottom portion 54D of the derailing tooth 54 includes the chain-engagement surface 54A, a second bottom driving surface 54G, and a first recess 54R1. The first recess 54R1 is provided between the chain-engagement surface 54A and the second bottom driving surface 54G. The top portion 54C and the bottom portion 54D include the chain-engagement surface 54A. The top portion 54C and the bottom portion 54D includes the first recess 54R1.

The bottom portion 54D of the derailing tooth 54 includes a second bottom non-driving surface 54K and a second recess 54R2. The second recess 54R2 is provided between the chain-engagement surface 54A and the second bottom non-driving surface 54K. The non-driving surface 54DS2 includes the second bottom non-driving surface 54K. The top portion 54C and the bottom portion 54D includes the second recess 54R2.

Figure 25:
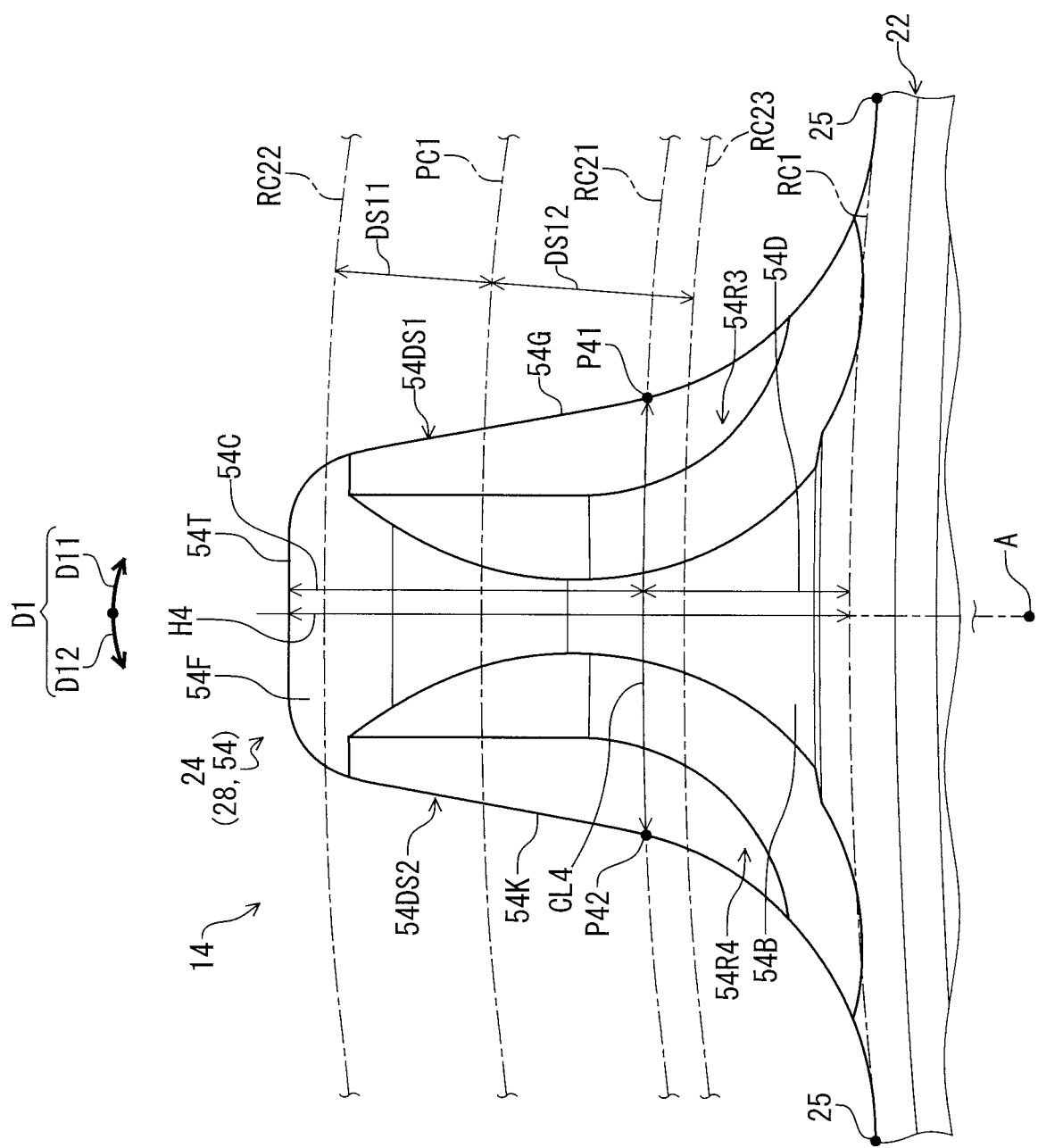
FIG. 25 is another side elevational view of the derailing tooth of the first sprocket of the bicycle sprocket assembly illustrated in FIG. 1.

As seen in FIGS. 11 and 25, the bottom portion 54D of the derailing tooth 54 a third recess 54R3. The third recess 54R3 is provided between the additional chain-engagement surface 54B and the second bottom driving surface 54G. The top portion 54C and the bottom portion 54D include the additional chain-engagement surface 54B. The top portion 54C and the bottom portion 54D includes the third recess 54R3.

The bottom portion 54D of the derailing tooth 54 includes a fourth recess 54R4. The fourth recess 54R4 is provided between the additional chain-engagement surface 54B and the second bottom non-driving surface 54K. The top portion 54C and the bottom portion 54D includes the fourth recess 54R4.

As seen in FIG. 17, the plurality of second teeth 28 includes an additional shifting-facilitation tooth 56. The additional shifting-facilitation tooth 56 is the closest to the first additional shifting facilitation projection 44 among the plurality of first sprocket teeth 24. The additional shifting-facilitation tooth 56 can also be referred to as a third shifting-facilitation tooth 56.

The shifting-facilitation tooth 48 is provided on an upstream side of the additional shifting-facilitation tooth 56 in the first circumferential direction D11. The shifting-facilitation tooth 48 is adjacent to the additional shifting-facilitation tooth 56 in the first circumferential direction D11 without another tooth between the shifting-facilitation tooth 48 and the additional shifting-facilitation tooth 56. The shifting-facilitation tooth 48 is provided between the derailing tooth 54 and the additional shifting-facilitation tooth 56 in the circumferential direction D1.

Figure 26:
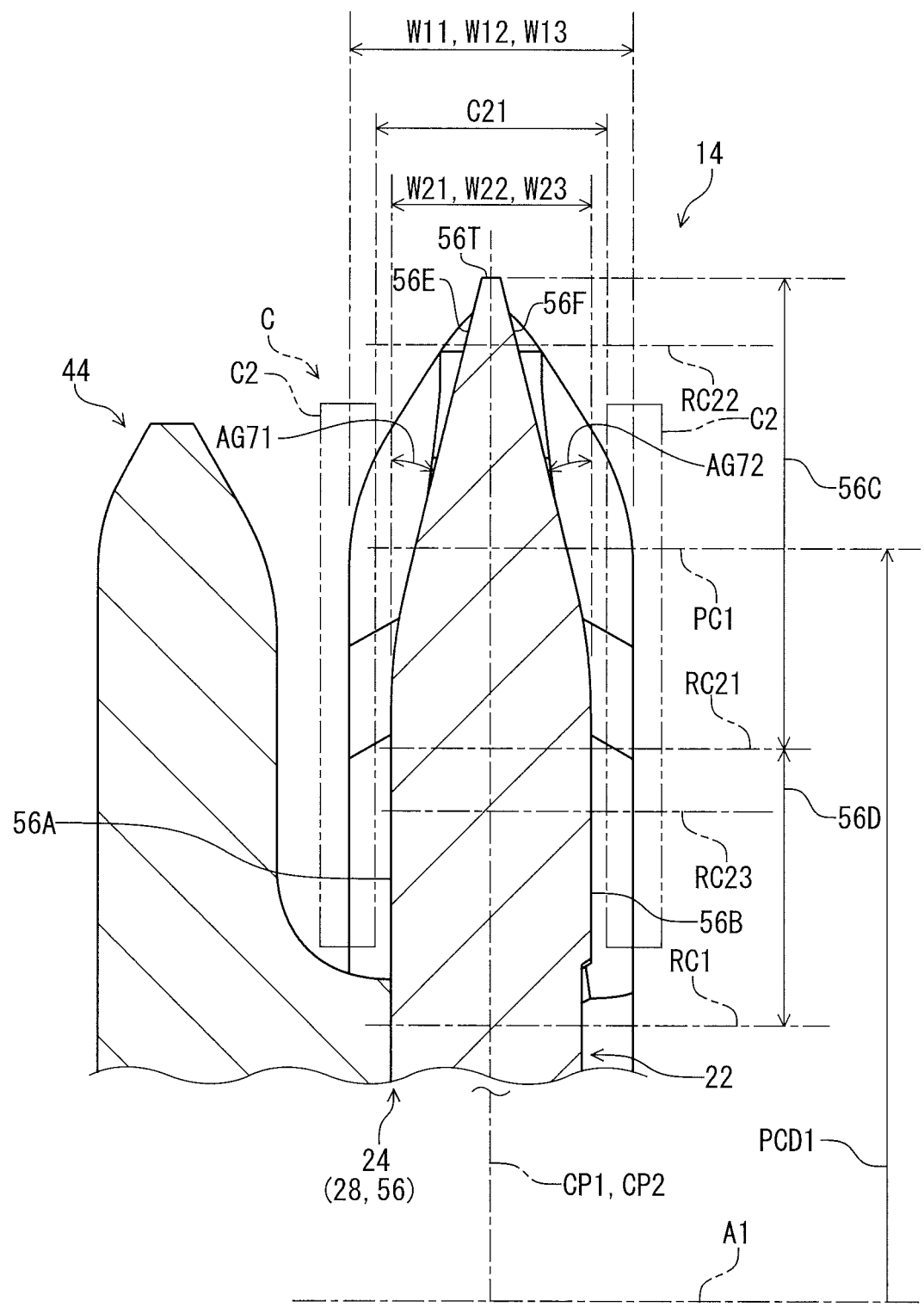
FIG. 26 is a cross-sectional view of the first sprocket taken along line XXVI-XXVI of FIG. 22.

As seen in FIG. 26, the additional shifting-facilitation tooth 56 is configured to engage with the inner link space C21 provided between the opposed pair of inner link plates C2 of the bicycle chain C. The additional shifting-facilitation tooth 56 extends radially outwardly from the first sprocket body 22 to be received in only the inner link space C21.

The additional shifting-facilitation tooth 56 has the maximum axial width W21 defined in the axial direction D2. The additional shifting-facilitation tooth 56 includes a chain-engagement surface 56A and an additional chain-engagement surface 56B. The chain-engagement surface 56A faces in the axial direction D2. The additional chain-engagement surface 56B faces in the axial direction D2 and is provided on a reverse side of the chain-engagement surface 56A. The maximum axial width W21 is defined between the chain-engagement surface 56A and the additional chain-engagement surface 56B in the axial direction D2.

The additional shifting-facilitation tooth 56 includes an inclined surface 56E, an additional inclined surface 56F, and a radially outermost edge 56T. The inclined surface 56E extends from the radially outermost edge 56T toward the chain-engagement surface 56A. The additional inclined surface 56F extends from the radially outermost edge 56T toward the additional chain-engagement surface 56B. The inclined surface 56E is inclined relative to the chain-engagement surface 56A by a second inclination angle AG71. The additional inclined surface 56F is inclined relative to the additional chain-engagement surface 56B by a second additional inclination angle AG72. The second inclination angle AG71 is substantially equal to the second additional inclination angle AG72. However, the second inclination angle AG71 can be different from the second additional inclination angle AG72.

As seen in FIG. 26, the additional shifting-facilitation tooth 56 has a maximum axial top width W22 and a maximum axial bottom width W23. The additional shifting-facilitation tooth 56 includes a top portion 56C and a bottom portion 56D. The top portion 56C extends radially outwardly from the bottom portion 56D. The top portion 56C has the maximum axial top width W22. The bottom portion 56D has the maximum axial bottom width W23. The maximum axial width W21 of the additional shifting-facilitation tooth 56 is smaller than the maximum axial bottom width W13 of the first tooth 26.

Figure 27:
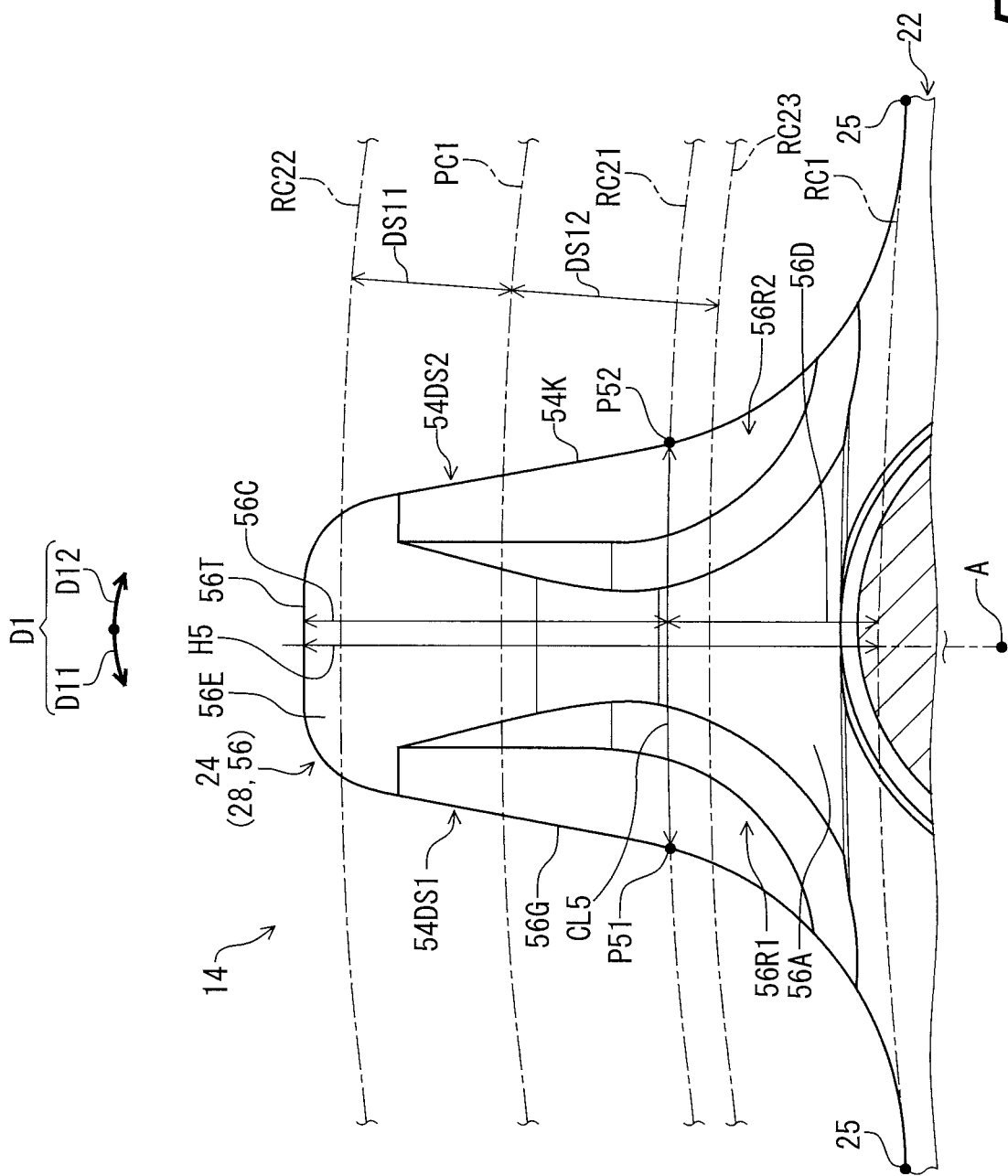
FIG. 27 is a side elevational view of an additional tooth of the first sprocket of the bicycle sprocket assembly illustrated in FIG. 1.

As seen in FIG. 27, the top portion 56C is provided radially outwardly of the reference circle RC21. The bottom portion 56D is provided radially inwardly of the reference circle RC21. The top portion 56C is provided between the reference circle RC21 and the radially outermost edge 56T of the additional shifting-facilitation tooth 56. The bottom portion 56D is provided between the reference circle RC21 and the first root circle RC1.

The additional shifting-facilitation tooth 56 includes a driving surface 56DS1 and a non-driving surface 56DS2. The driving surface 56DS1 faces in the first circumferential direction D11 in which the bicycle sprocket assembly 12 is rotated about the rotational center axis A1 during pedaling. The non-driving surface 56DS2 faces in the second circumferential direction D12 opposite to the first circumferential direction D11.

As seen in FIGS. 9 and 27, the bottom portion 56D of the additional shifting-facilitation tooth 56 includes the chain-engagement surface 56A, a second bottom driving surface 56G, and a first recess 56R1. The first recess 56R1 is provided between the chain-engagement surface 56A and the second bottom driving surface 56G. The top portion 56C and the bottom portion 56D include the chain-engagement surface 56A. The top portion 56C and the bottom portion 56D include the first recess 56R1.

The bottom portion 56D of the additional shifting-facilitation tooth 56 includes a second bottom non-driving surface 56K and a second recess 56R2. The second recess 56R2 is provided between the chain-engagement surface 56A and the second bottom non-driving surface 56K. The non-driving surface 56DS2 includes the second bottom non-driving surface 56K. The top portion 56C and the bottom portion 56D include the second recess 56R2.

Figure 28:
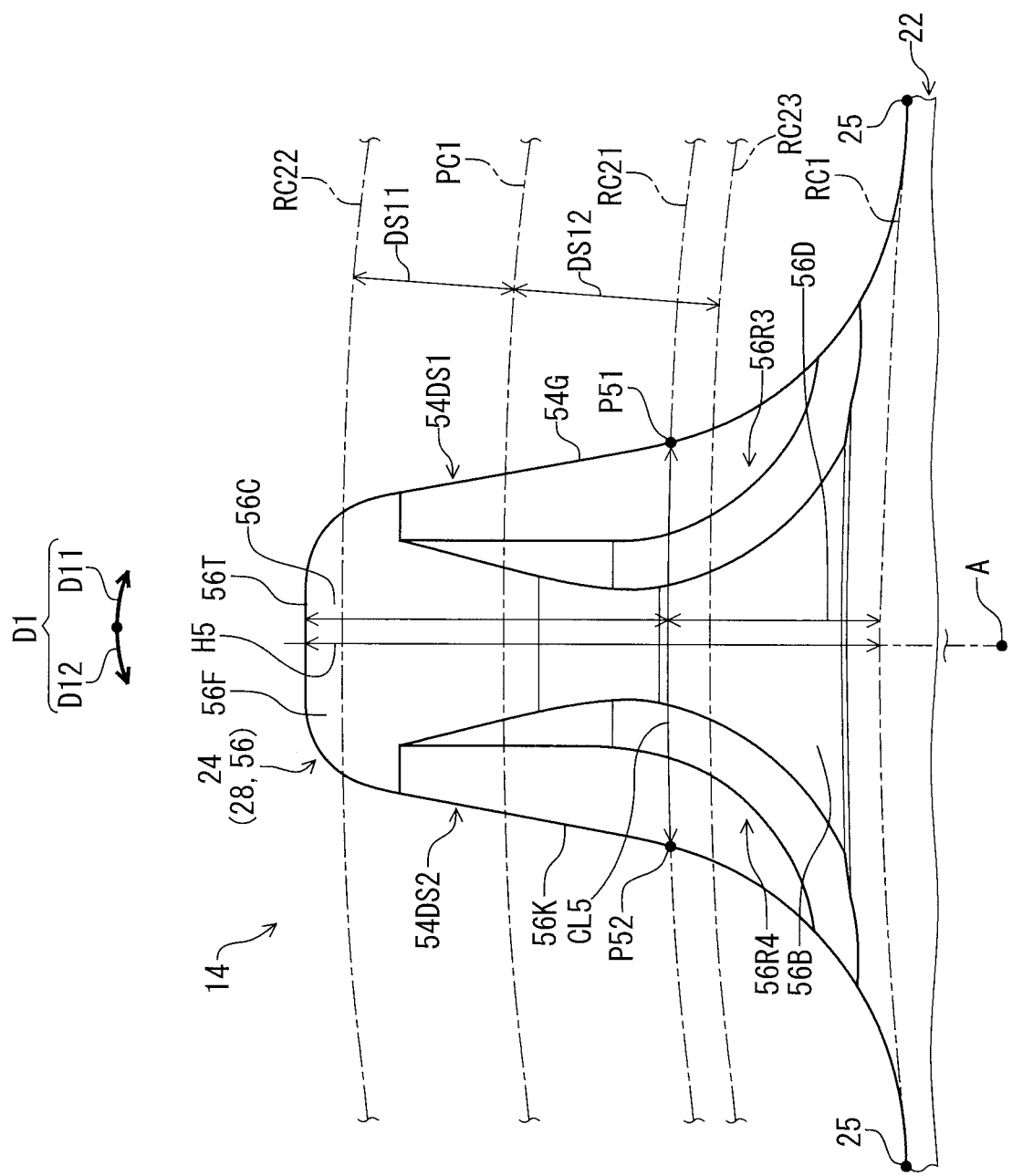
FIG. 28 is another side elevational view of the additional tooth of the first sprocket of the bicycle sprocket assembly illustrated in FIG. 1.

As seen in FIGS. 11 and 28, the bottom portion 56D of the additional shifting-facilitation tooth 56 includes a third recess 56R3. The third recess 56R3 is provided between the additional chain-engagement surface 56B and the second bottom driving surface 56G. The top portion 56C and the bottom portion 56D include the additional chain-engagement surface 56B. The top portion 56C and the bottom portion 56D include the third recess 56R3.

The bottom portion 56D of the additional shifting-facilitation tooth 56 includes a fourth recess 56R4. The fourth recess 56R4 is provided between the additional chain-engagement surface 56B and the second bottom non-driving surface 56K. The top portion 56C and the bottom portion 56D include the fourth recess 56R4.

The additional shifting-facilitation tooth 56 has substantially the same structure as that of the derailing tooth 54. However, the structure of the additional shifting-facilitation tooth 56 can be different from that of the derailing tooth 54.

As seen in FIG. 20, the shifting-facilitation tooth 48 has a first radial height H1 extending radially outwardly from the first sprocket body 22 to the radially outermost edge 48T of the shifting-facilitation tooth 48. The first radial height H1 extends radially outwardly from the first root circle RC1 to the radially outermost edge 48T.

As seen in FIG. 7, the first driving tooth 50 has a second radial height H2 extending radially outwardly from the first sprocket body 22 to the radially outermost edge 26T of the first driving tooth 50. The second radial height H2 extends radially outwardly from the first root circle RC1 to the radially outermost edge 26T. As seen in FIGS. 7 and 20, the first radial height H1 is smaller than the second radial height H2. However, the first radial height H1 can be equal to or larger than the second radial height H2.

As seen in FIG. 8, the second driving tooth 52 has a third radial height H3 extending radially outwardly from the first sprocket body 22 to the radially outermost edge 28T of the second driving tooth 52. The third radial height H3 extends radially outwardly from the first root circle RC1 to the radially outermost edge 28T. As seen in FIGS. 8 and 20, the first radial height H1 is smaller than the third radial height H3. Further, the third radial height H3 is smaller than the second radial height. Since the third radial height H3 is smaller than the second radial height, it is possible to reduce a possibility of unintentional disengagement of the bicycle chain C (chain dropping) from the second driving tooth 52 in a second shifting operation in which the bicycle chain C is shifted from the first sprocket 14 to the second sprocket 16. However, the first radial height H1 can be equal to or larger than the third radial height H3.

As seen in FIG. 24, the derailing tooth 54 has a fourth radial height H4 extending radially outwardly from the first sprocket body 22 to a radially outermost edge 54T of the derailing tooth 54. The fourth radial height H4 extends radially outwardly from the first root circle RC1 to the radially outermost edge 54T. As seen in FIGS. 20 and 24, the first radial height H1 is smaller than the fourth radial height H4. However, the first radial height H1 can be equal to or larger than the fourth radial height H4.

As seen in FIG. 27, the additional shifting-facilitation tooth 56 has a fifth radial height H5 extending radially outwardly from the first sprocket body 22 to a radially outermost edge 56T of the additional shifting-facilitation tooth 56. The fifth radial height H5 extends radially outwardly from the first root circle RC1 to the radially outermost edge 56T. As seen in FIGS. 20 and 27, the first radial height H1 is smaller than the fifth radial height H5. However, the first radial height H1 can be equal to or larger than the fifth radial height H5.

As seen in FIG. 20, the shifting-facilitation tooth 48 has a first circumferential length CL1 defined between the driving surface 48DS1 and the non-driving surface 48DS2 in the circumferential direction D1 of the rotational center axis A1. The first circumferential length CL1 extends from a cross point P11 of the reference circle RC21 and the driving surface 48DS1 to a cross point P12 of the reference circle RC11 to the non-driving surface 48DS2 in the circumferential direction D1 when viewed in the axial direction D2.

As seen in FIG. 7, the first driving tooth 50 has a second circumferential length CL2 defined between the driving surface 26DS1 and the non-driving surface 26DS2 in the circumferential direction D1. The second circumferential length CL2 extends from a cross point P21 of the reference circle RC21 and the driving surface 26DS1 to a cross point P22 of the reference circle RC11 to the non-driving surface 26DS2 in the circumferential direction D1 when viewed in the axial direction D2. As seen in FIGS. 7 and 20, the first circumferential length CL1 is smaller than the second circumferential length CL2.

As seen in FIG. 8, the second driving tooth 52 has a third circumferential length CL3 defined between the driving surface 28DS1 and the non-driving surface 28DS2 in the circumferential direction D1. The third circumferential length CL3 extends from a cross point P51 of the reference circle RC21 and the driving surface 28DS1 to a cross point P52 of the reference circle RC11 to the non-driving surface 28DS2 in the circumferential direction D1 when viewed in the axial direction D2. As seen in FIGS. 8 and 20, the first circumferential length CL1 is smaller than the third circumferential length CL3. As seen in FIGS. 7 and 8, the third circumferential length CL3 is smaller than the second circumferential length CL2. However, the third circumferential length CL3 can be equal to or larger than the second circumferential length CL2.

As seen in FIG. 24, the derailing tooth 54 has a fourth circumferential length CL4 defined between the driving surface 54DS1 and the non-driving surface 54DS2 in the circumferential direction D1. The fourth circumferential length CL4 extends from a cross point P41 of the reference circle RC21 and the driving surface 54DS1 to a cross point P42 of the reference circle RC11 to the non-driving surface 54DS2 in the circumferential direction D1 when viewed in the axial direction D2. As seen in FIGS. 8 and 24, the fourth circumferential length CL4 is smaller than the third circumferential length CL3.

As seen in FIG. 27, the additional shifting-facilitation tooth 56 has a fifth circumferential length CL5 defined between the driving surface 56DS1 and the non-driving surface 56DS2 in the circumferential direction D1. The fifth circumferential length CL5 extends from a cross point P51 of the reference circle RC21 and the driving surface 56DS1 to a cross point P52 of the reference circle RC11 to the non-driving surface 56DS2 in the circumferential direction D1 when viewed in the axial direction D2. As seen in FIGS. 8 and 27, the fifth circumferential length CL5 is smaller than the third circumferential length CL3. As seen in FIGS. 24 and 27, the fifth circumferential length CL5 is smaller than the fourth circumferential length CL4.

Figure 29:
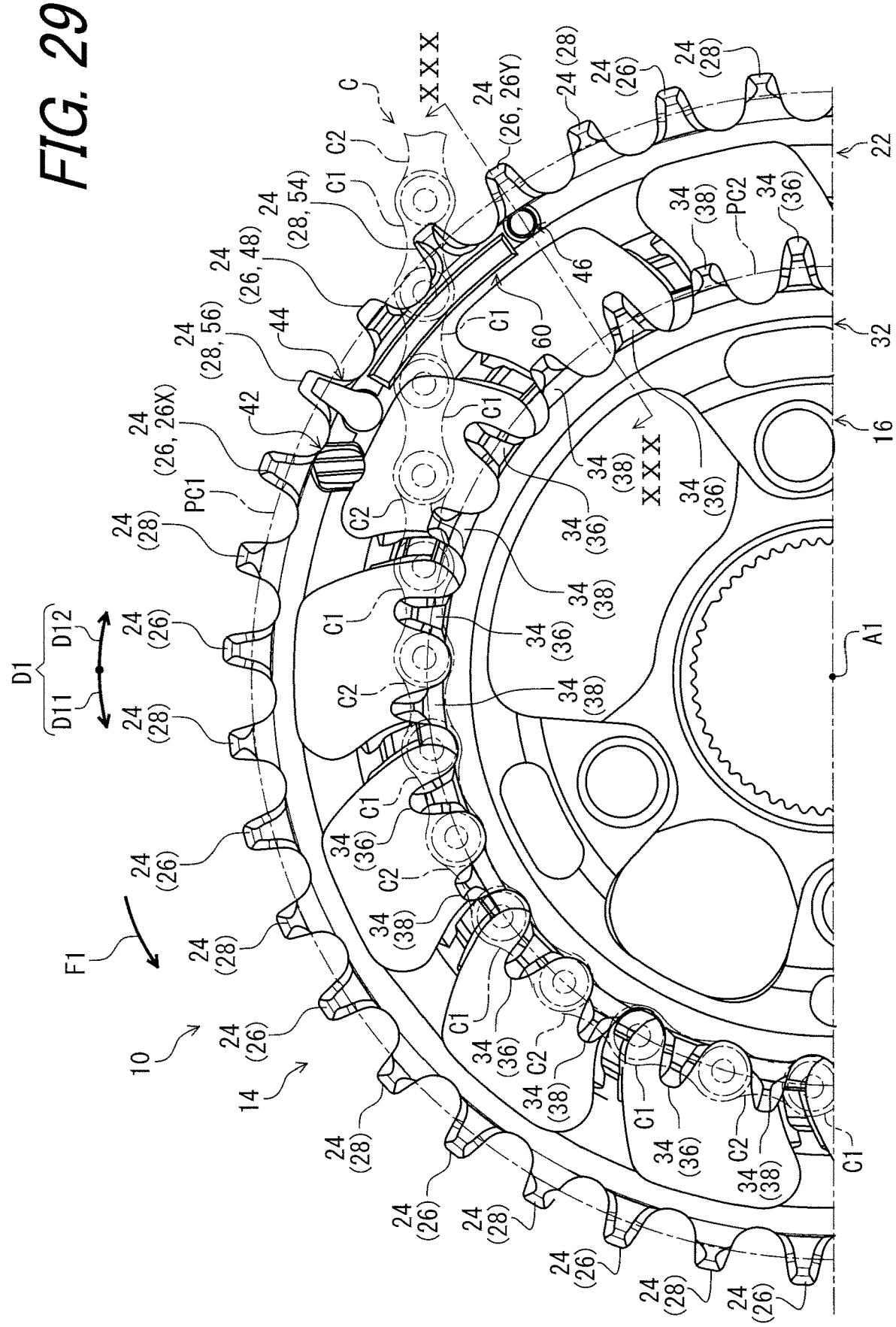
FIG. 29 is a partial side elevational view of the bicycle sprocket assembly illustrated in FIG. 1 with the bicycle chain.
Figure 30:
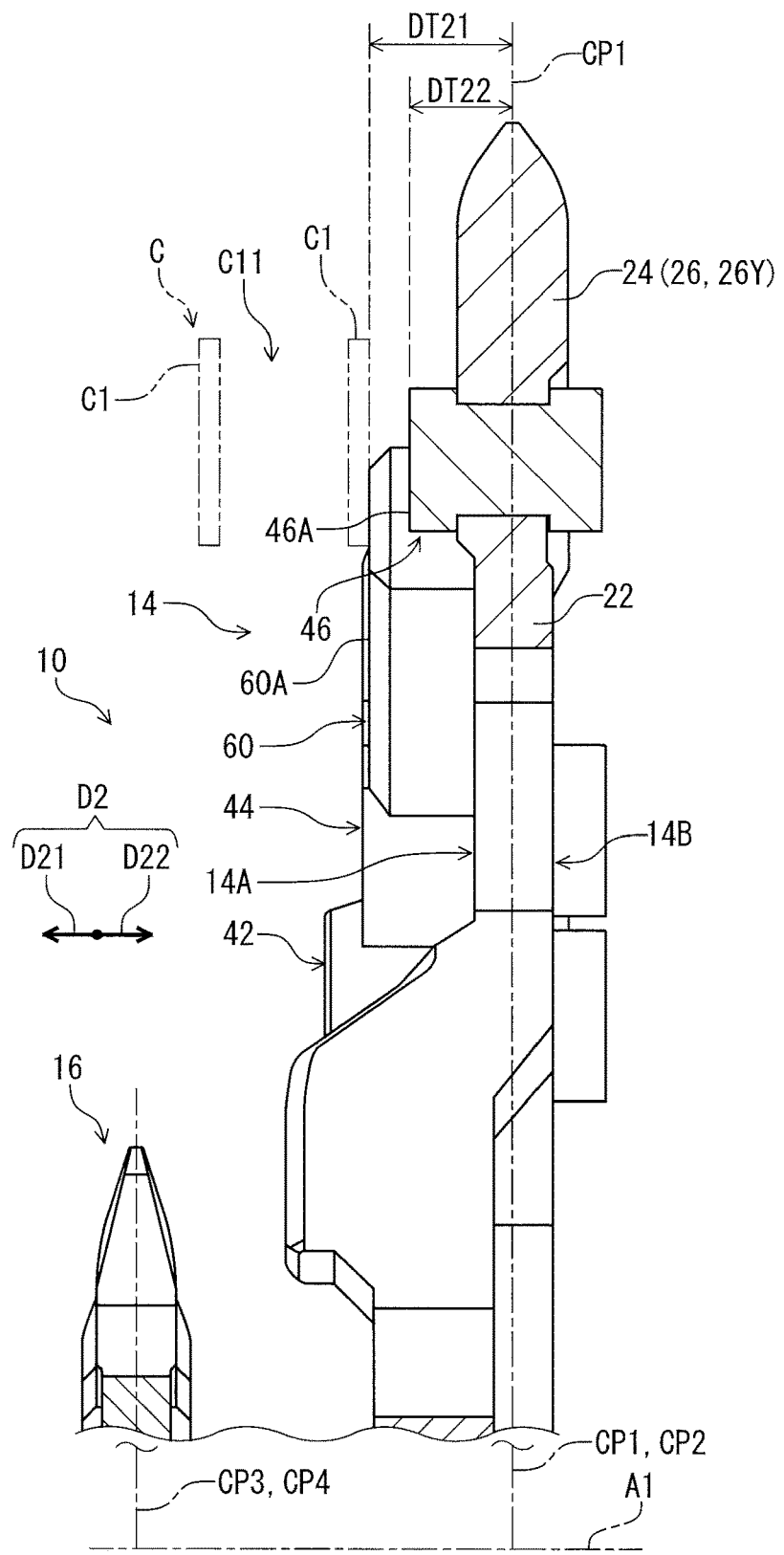
FIG. 30 is a cross-sectional view of the first sprocket taken along line XXX-XXX of FIG. 29.

As seen in FIG. 29, the first sprocket 14 comprises a guide portion 60. The guide portion 60 is provided on a downstream side of the second shifting facilitation projection 46 to reduce interference between the second shifting facilitation projection 46 and the bicycle chain C in the first shifting operation. In other words, the guide portion 60 is configured to guide the bicycle chain C toward the second sprocket 16 to prevent the bicycle chain from unintentionally engaged with the second shifting facilitation projection 46 in the first shifting operation. The guide portion 60 is provided between the first additional shifting facilitation projection 44 and the second shifting facilitation projection 46 in the circumferential direction D1. The guide portion 60 is provided between the first shifting facilitation projection 42 and the second shifting facilitation projection 46 in the circumferential direction D1. The guide portion 60 having a longitudinal portion that extends from the first additional shifting facilitation projection 44 to the second shifting facilitation projection 46 in the circumferential direction D1. As seen in FIG. 30, the guide portion 60 extends from the first sprocket body 22 toward the second sprocket 16 in the axial direction D2. A first axial distance DT21 is defined between the first center plane CP1 and an axial end surface 60A of the guide portion 60 in the axial direction D2. A second axial distance DT22 is defined between the first center plane CP1 and an axial end surface 46A of the second shifting facilitation projection 46 in the axial direction D2. The first axial distance DT21 is larger than the second axial distance DT22. However, the first axial distance DT21 can be equal to or smaller than the second axial distance DT22. The guide portion 60 can be omitted form the first sprocket 14.

The first shifting operation will be described in detail below referring to FIGS. 17 and 31 to 35.

Figure 31:
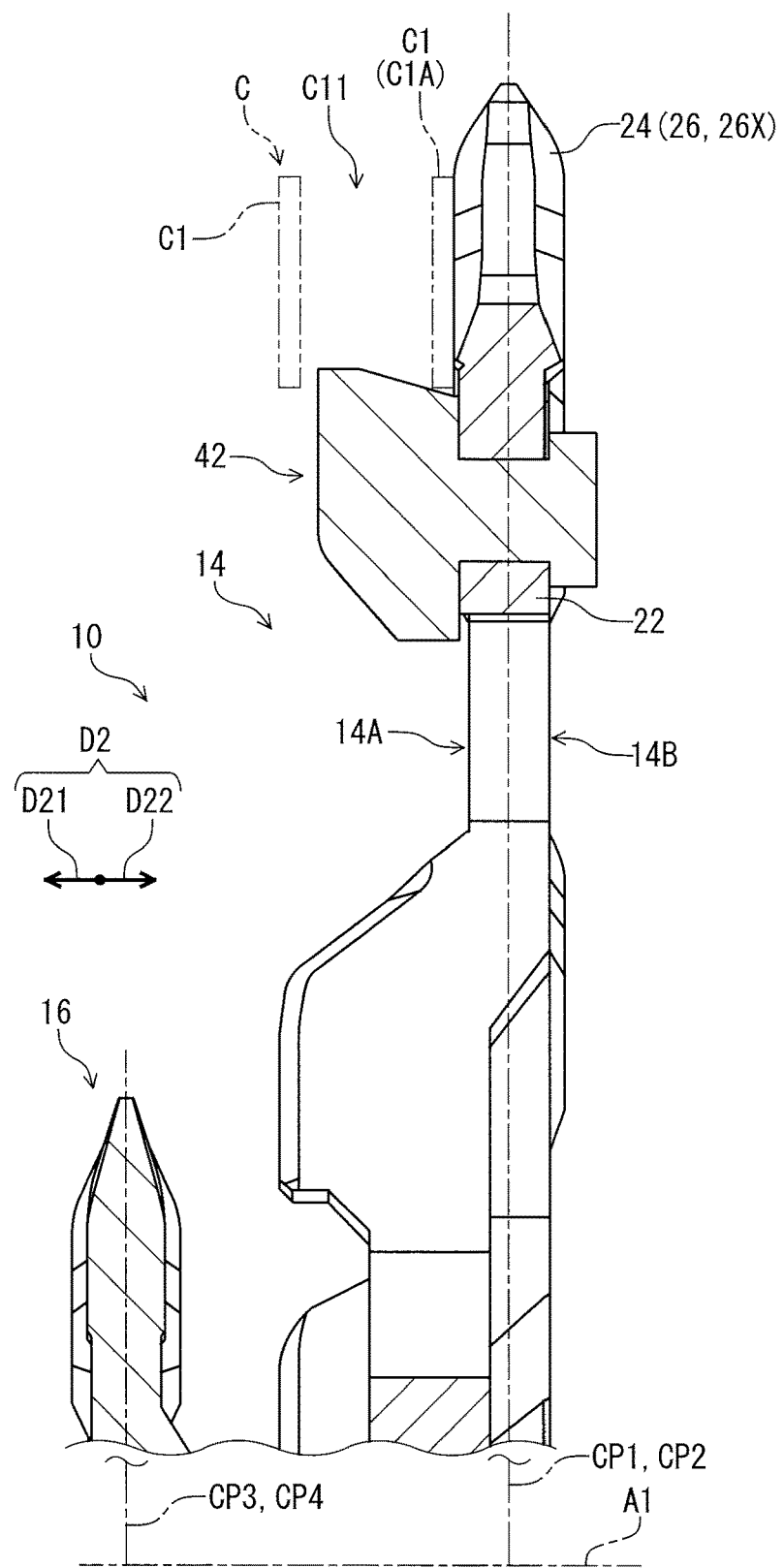
FIG. 31 is a cross-sectional view of the first sprocket taken along line XXXI-XXXI of FIG. 17.
Figure 32:
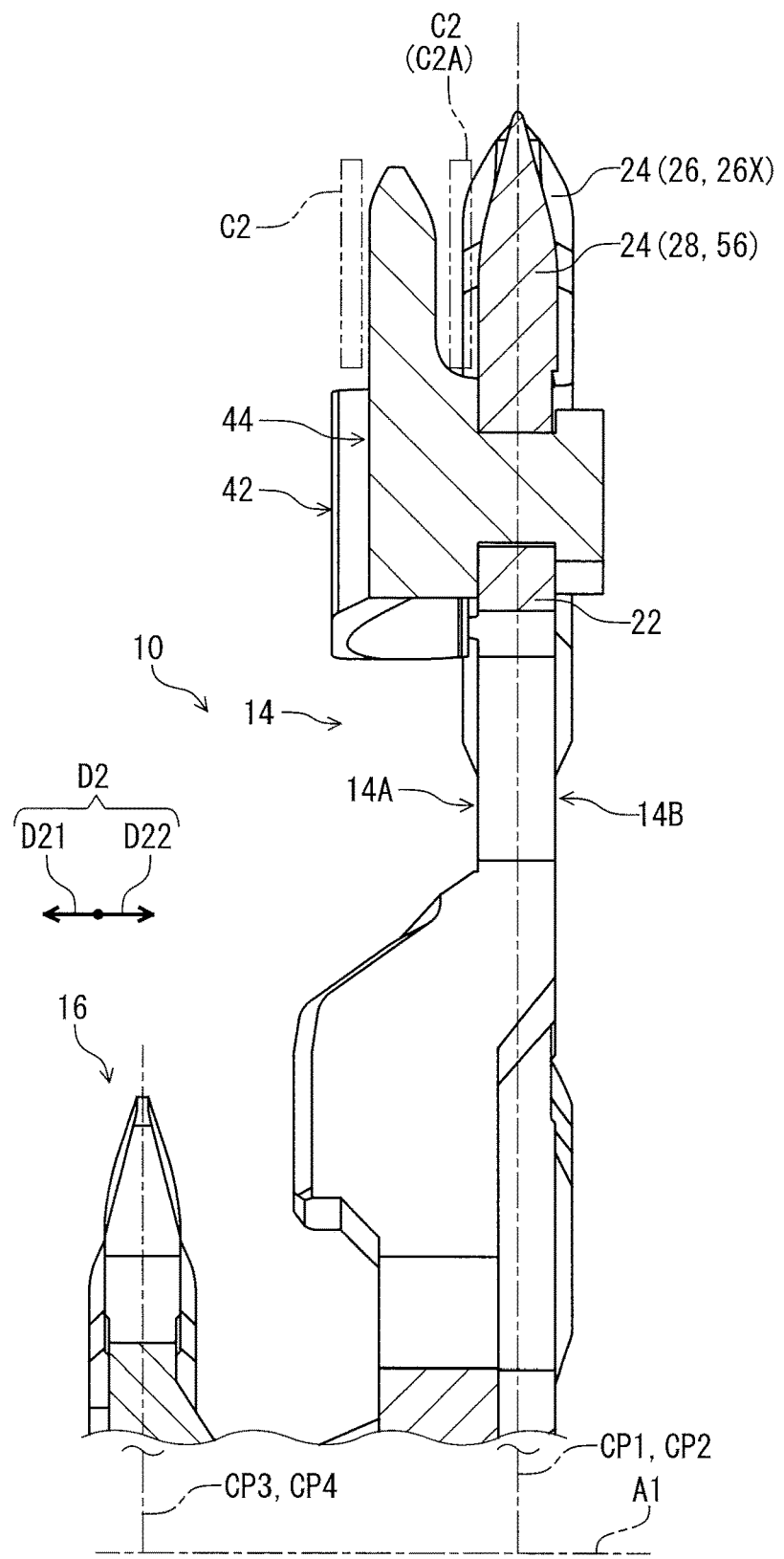
FIG. 32 is a cross-sectional view of the first sprocket taken along line XXXII-XXXII of FIG. 17.
Figure 33:
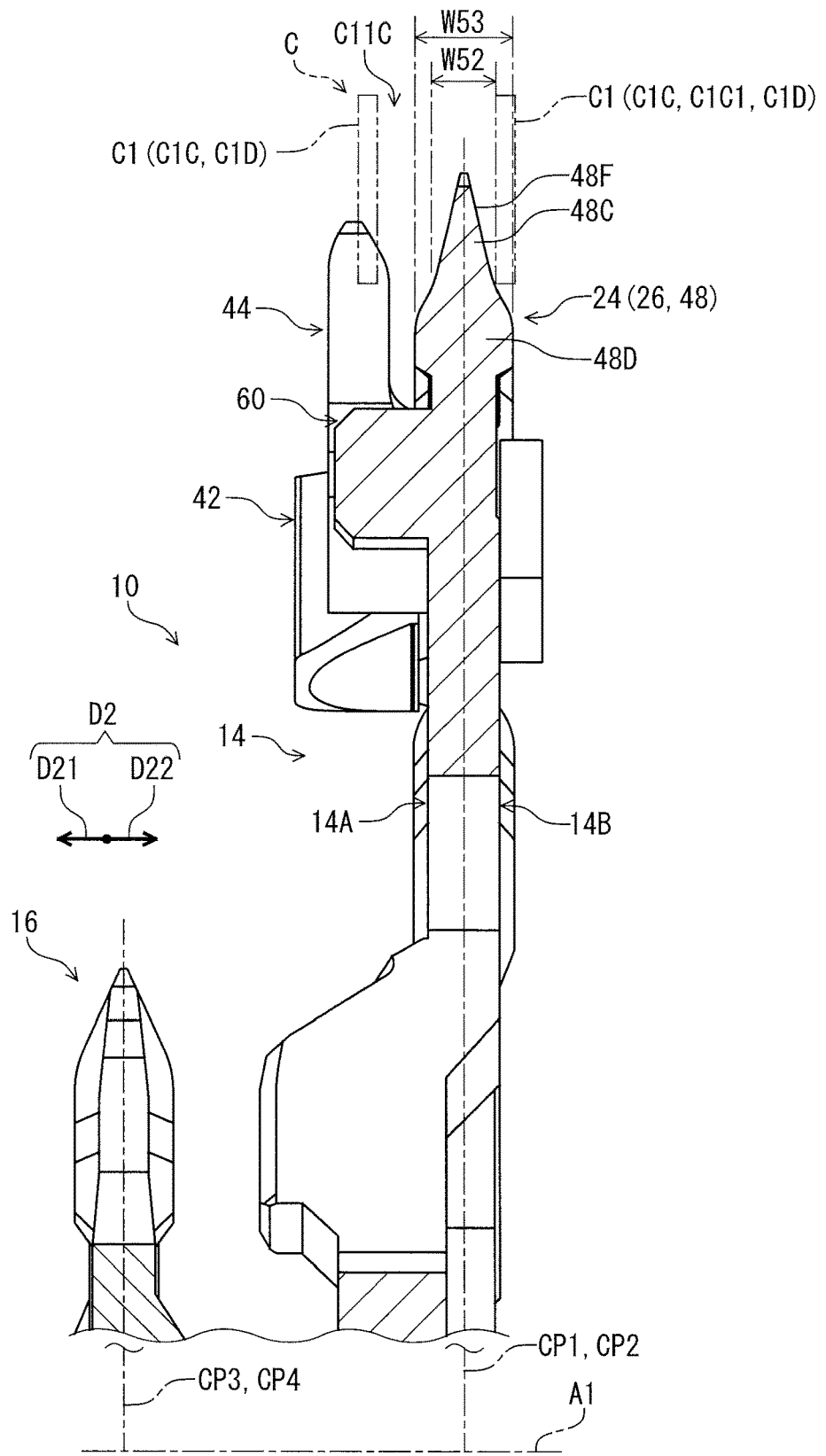
FIG. 33 is a cross-sectional view of the first sprocket taken along line XXXIII-XXXIII of FIG. 17.

As seen in FIGS. 17 and 31, the outer link plate C1A of the bicycle chain C is lifted by the first shifting facilitation projection 42 in the first shifting operation when the bicycle chain C is moved toward the first sprocket 14 by the front derailleur in a state where the bicycle chain C is engaged with the second sprocket 16. As seen in FIG. 32, the inner link plate C2A of the bicycle chain C is engaged with the first additional shifting facilitation projection 44 and moved toward the first sprocket 14 by the first additional shifting facilitation projection 44 in the first shifting operation. As seen in FIGS. 17 and 33, the outer link plates C1C of the bicycle chain C is received by the shifting-facilitation tooth 48 in the first shifting operation.

Figure 34:
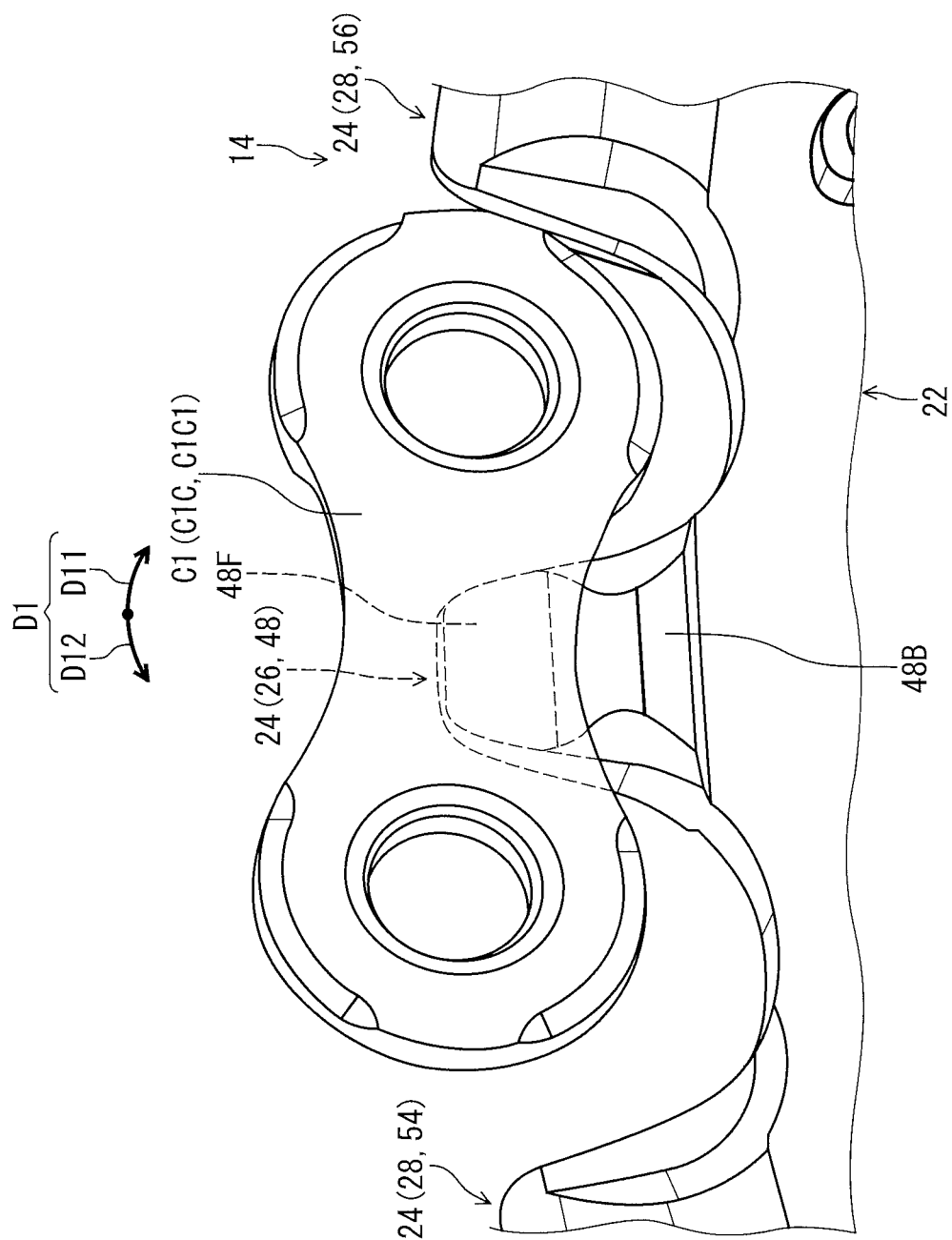
FIG. 34 is a partial perspective view of the bicycle sprocket assembly and a link plate of the bicycle chain (first shifting operation).
Figure 35:
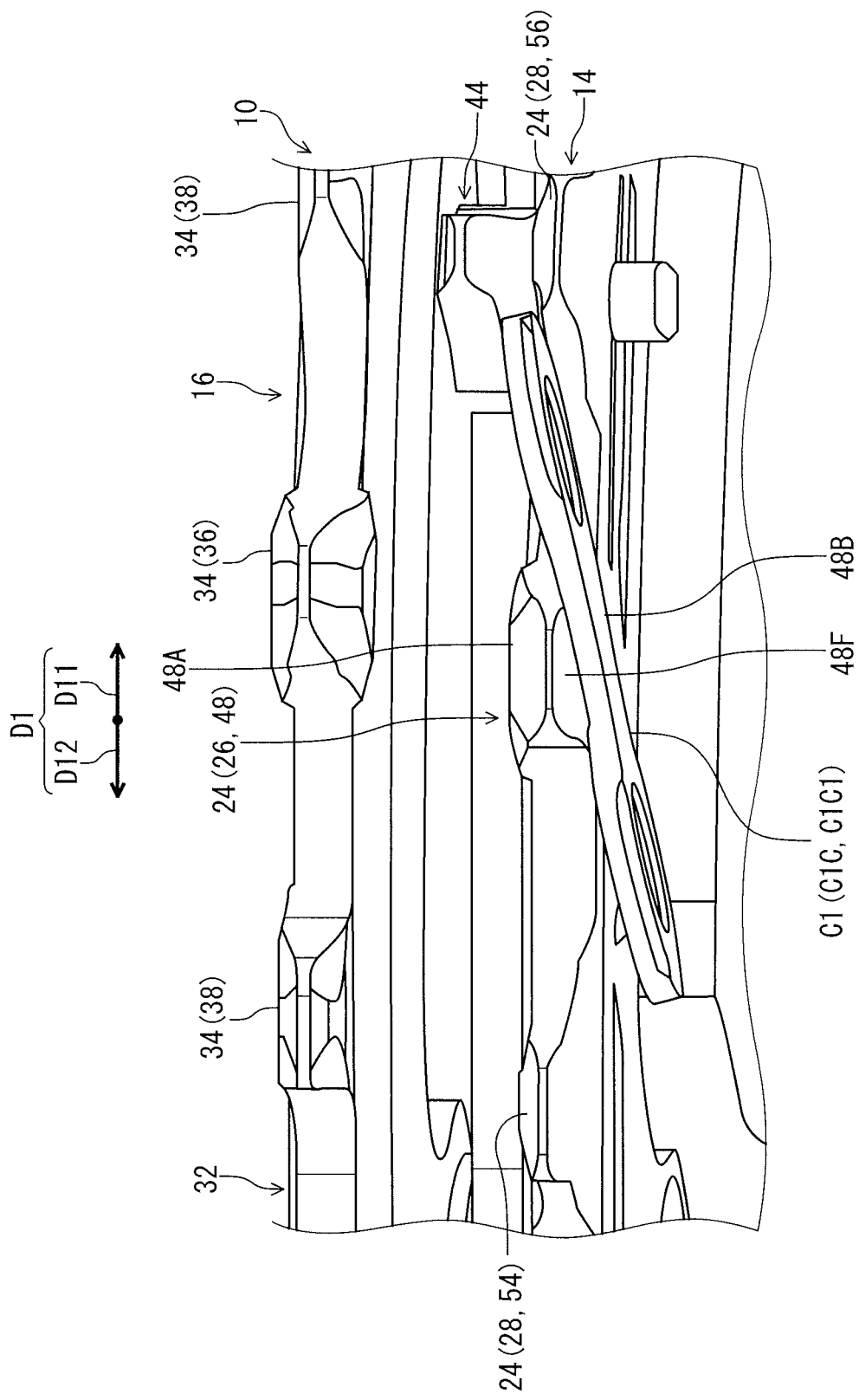
FIG. 35 is a partial plan view of the bicycle sprocket assembly and the link plate of the bicycle chain (first shifting operation).

As seen in FIG. 33, the top portion 48C of the shifting-facilitation tooth 48 is easily inserted into the outer link space C11C of the bicycle chain C since the top portion 48C has the maximum axial top width W52 smaller than the maximum axial bottom width W53 of the bottom portion 48D. As seen in FIGS. 33 to 35, the outer link plate C1C1 of the bicycle chain C is guided by the inclined surface 48F when the top portion 48C is inserted into the outer link space C11C. This facilitates the first shifting operation in which the bicycle chain C is shifted from the second sprocket 16 to the first sprocket 14.

As seen in FIG. 30, the guide portion 60 reduces the interference between the second shifting facilitation projection 46 and the bicycle chain C in the first shifting operation, smoothening the first shifting operation even if the first sprocket 14 comprises the second shifting facilitation projection 46.

Figure 22:
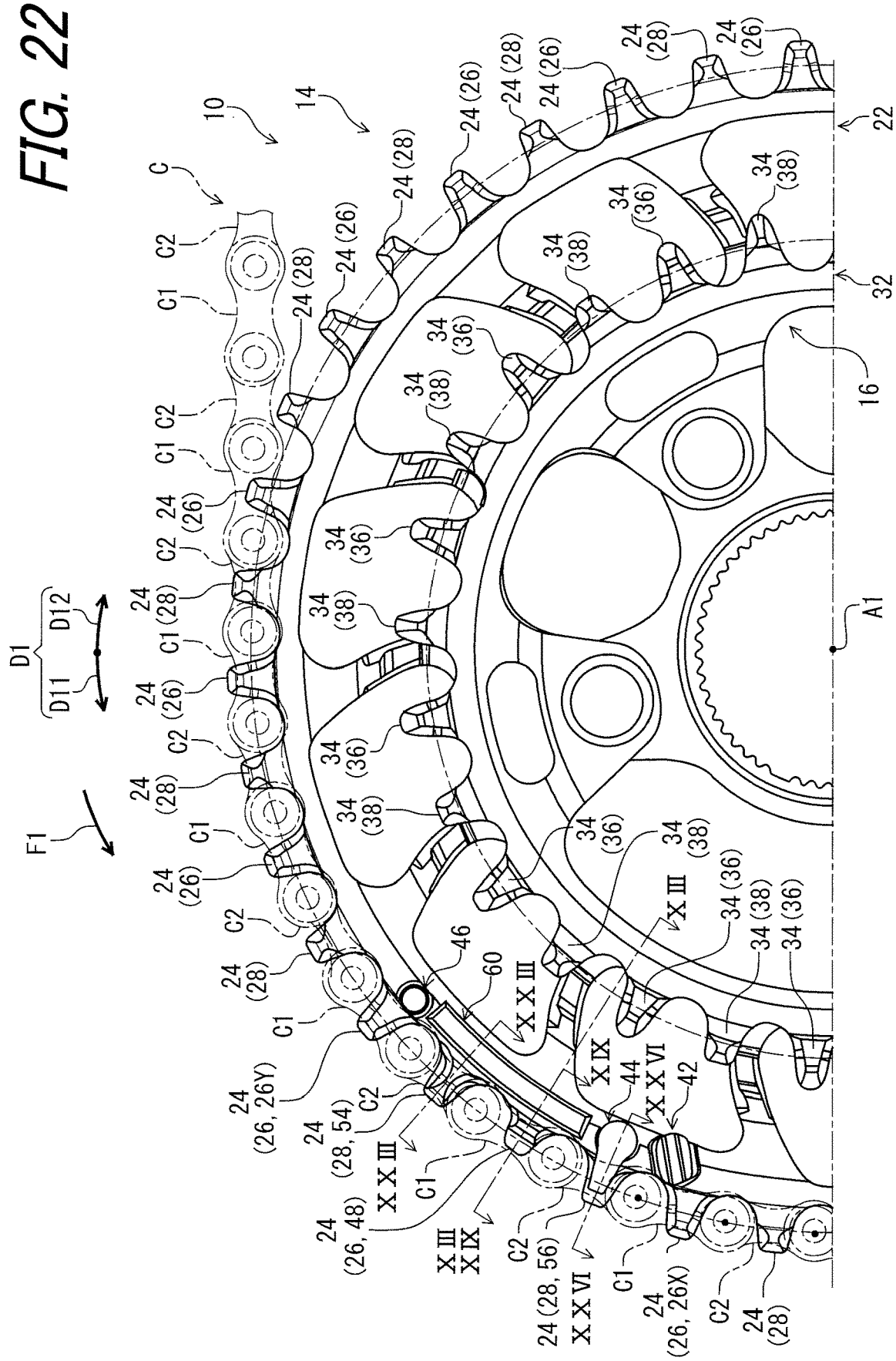
FIG. 22 is a partial side elevational view of the bicycle sprocket assembly illustrated in FIG. 1 with the bicycle chain.

As seen in FIGS. 22 and 26, the additional shifting-facilitation tooth 56 is engaged in the inner link space C21 of the bicycle chain C instead of the first additional shifting facilitation projection 44 in a first chain-engagement state where the first sprocket 14 is engaged with the bicycle chain C to transmit the pedaling force F1 after the first shifting operation.

Figure 36:
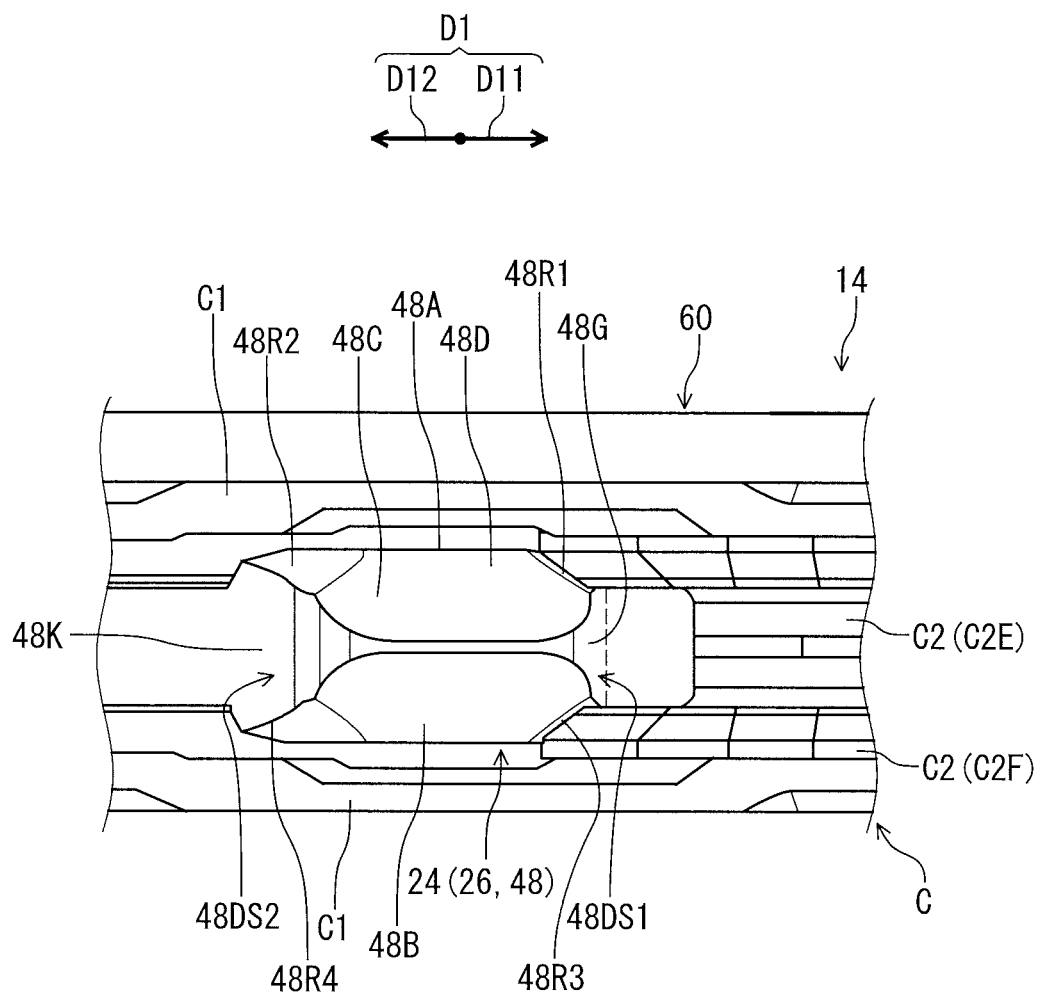
FIG. 36 is a partial plan view of the bicycle sprocket assembly and the link plates of the bicycle chain.
Figure 37:
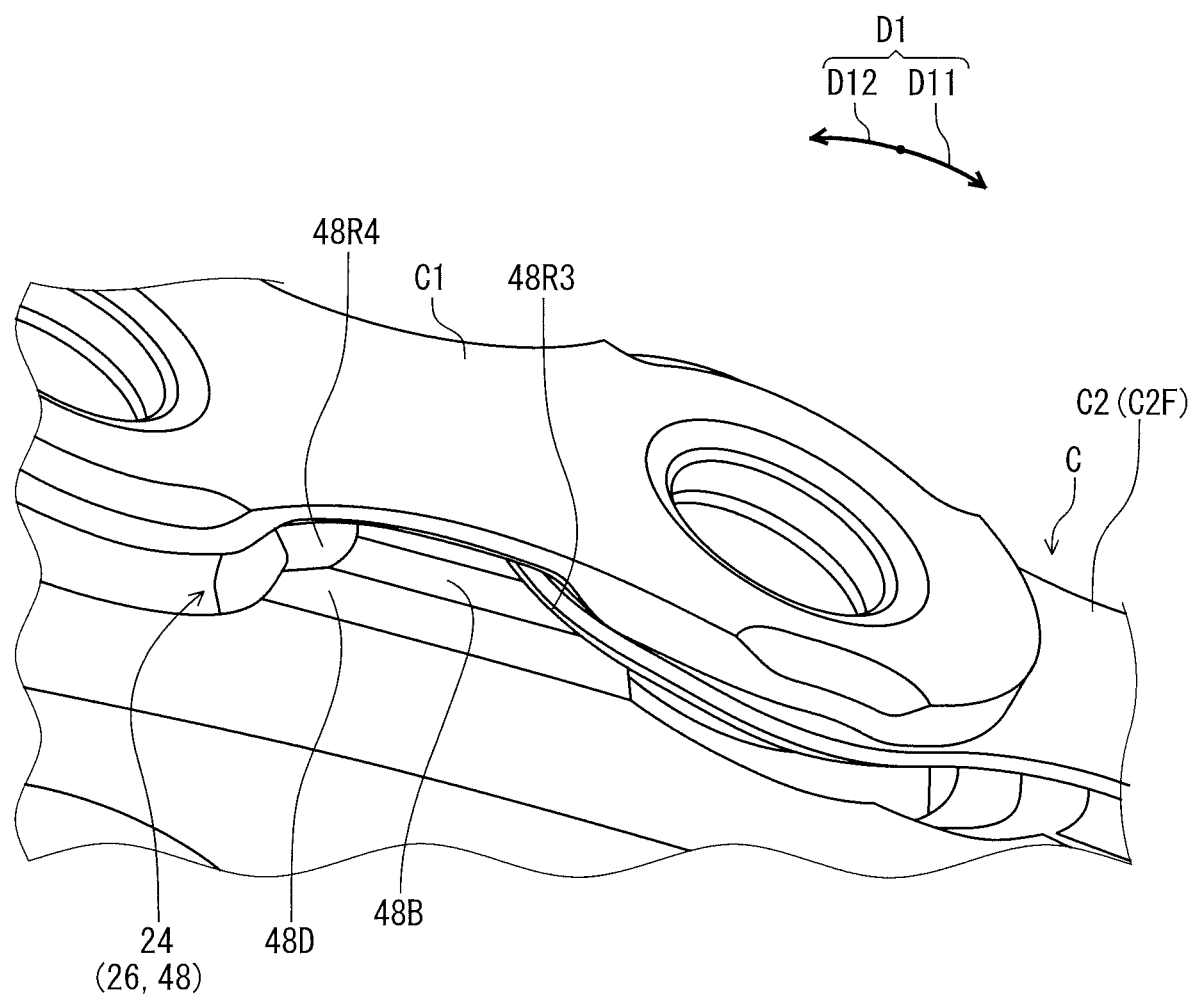
FIG. 37 is a partial perspective view of the bicycle sprocket assembly and the link plates of the bicycle chain.

As seen in FIGS. 19 and 22, the shifting-facilitation tooth 48 is engaged in the outer link space C11 of the bicycle chain C in the first chain-engagement state where the first sprocket 14 is engaged with the bicycle chain C to transmit the pedaling force F1 after the first shifting operation. As seen in FIGS. 36 and 37, the bottom portion 48D of the shifting-facilitation tooth 48 holds the outer link plates C1 and the inner link plates C2. For example, the first chamfer 48R1 of the bottom portion 48D is in contact with the inner link plate C2E, and the third chamfer 48R3 of the bottom portion 48D is in contact with the inner link plate C2F. Thus, the outer link plates C1 and the inner link plates C2 are held by the shifting-facilitation tooth 48 in the first chain-engagement state.

The second shifting operation will be described in detail below referring to FIGS. 18, 33, 38, and 39.

Figure 38:
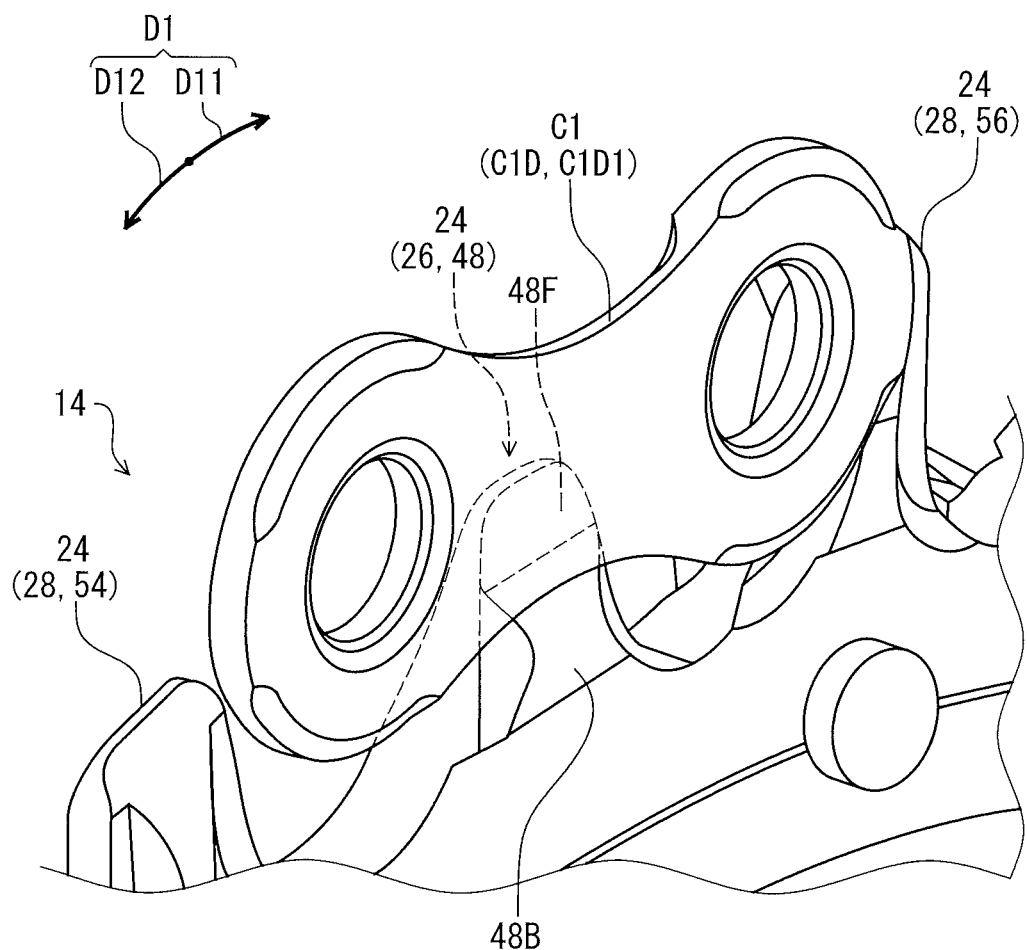
FIG. 38 is a partial perspective view of the bicycle sprocket assembly and the link plate of the bicycle chain (second shifting operation).
Figure 39:
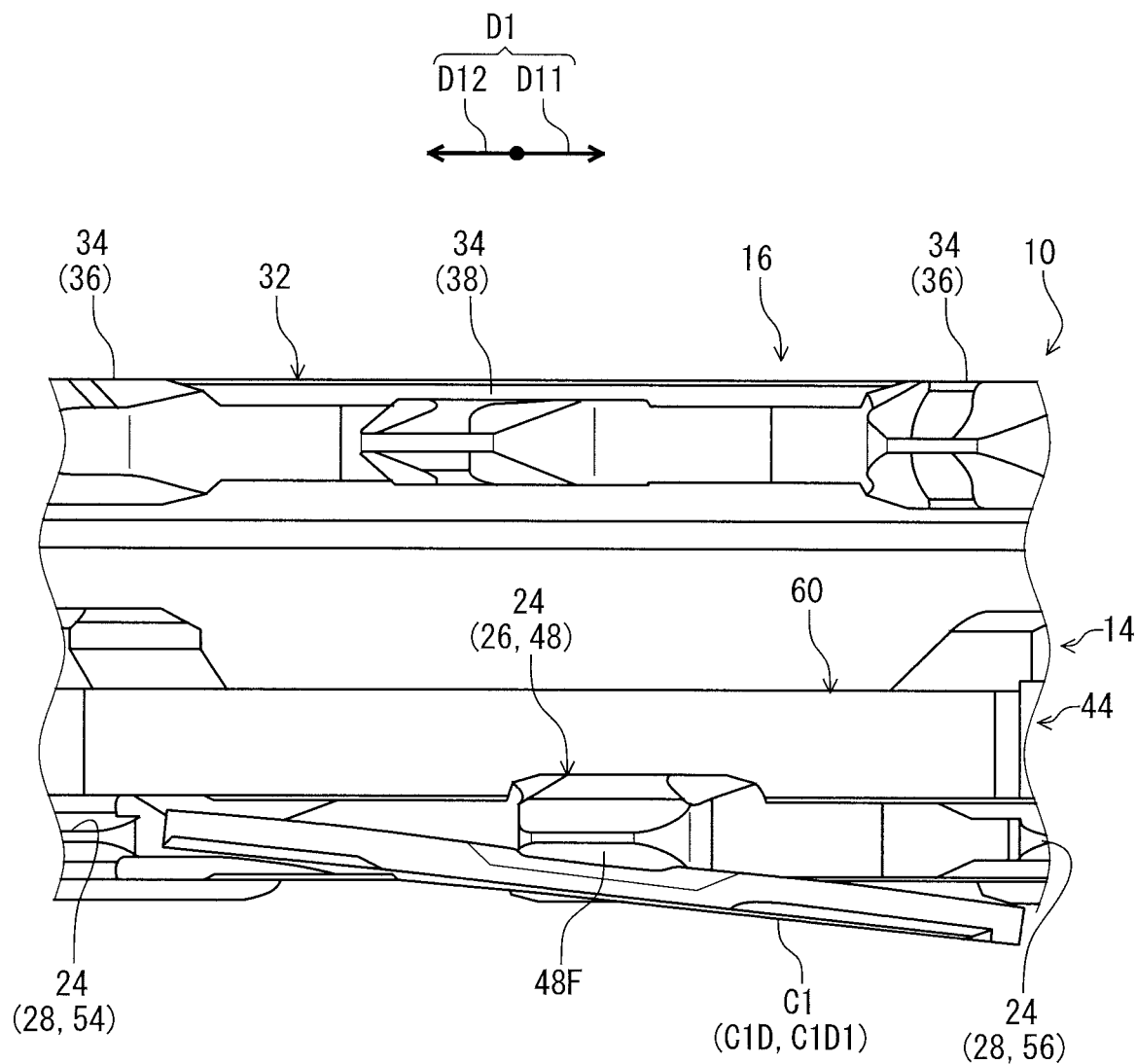
FIG. 39 is a partial plan view of the bicycle sprocket assembly and the link plate of the bicycle chain (second shifting operation).

As seen in FIG. 18, the bicycle chain C is first derailed from the first sprocket 14 at the derailing tooth 54 when the bicycle chain C is moved toward the second sprocket 16 by the front derailleur in a state where the bicycle chain C is engaged with the first sprocket 14. As seen in FIGS. 33, 38, and 39, the top portion 48C of the shifting-facilitation tooth 48 allows the outer link plates C1D of the bicycle chain C to move relative to the shifting-facilitation tooth 48 toward the second sprocket 16 until the outer link plate C1D1 comes into contact with the inclined surface 48F since the top portion 48C has the maximum axial top width W52 smaller than the maximum axial bottom width W53 of the bottom portion 48D. This makes the derailing tooth 54 easier to derail first the inner link plates C2B (FIG. 18) in the second shifting operation.

Figure 40:
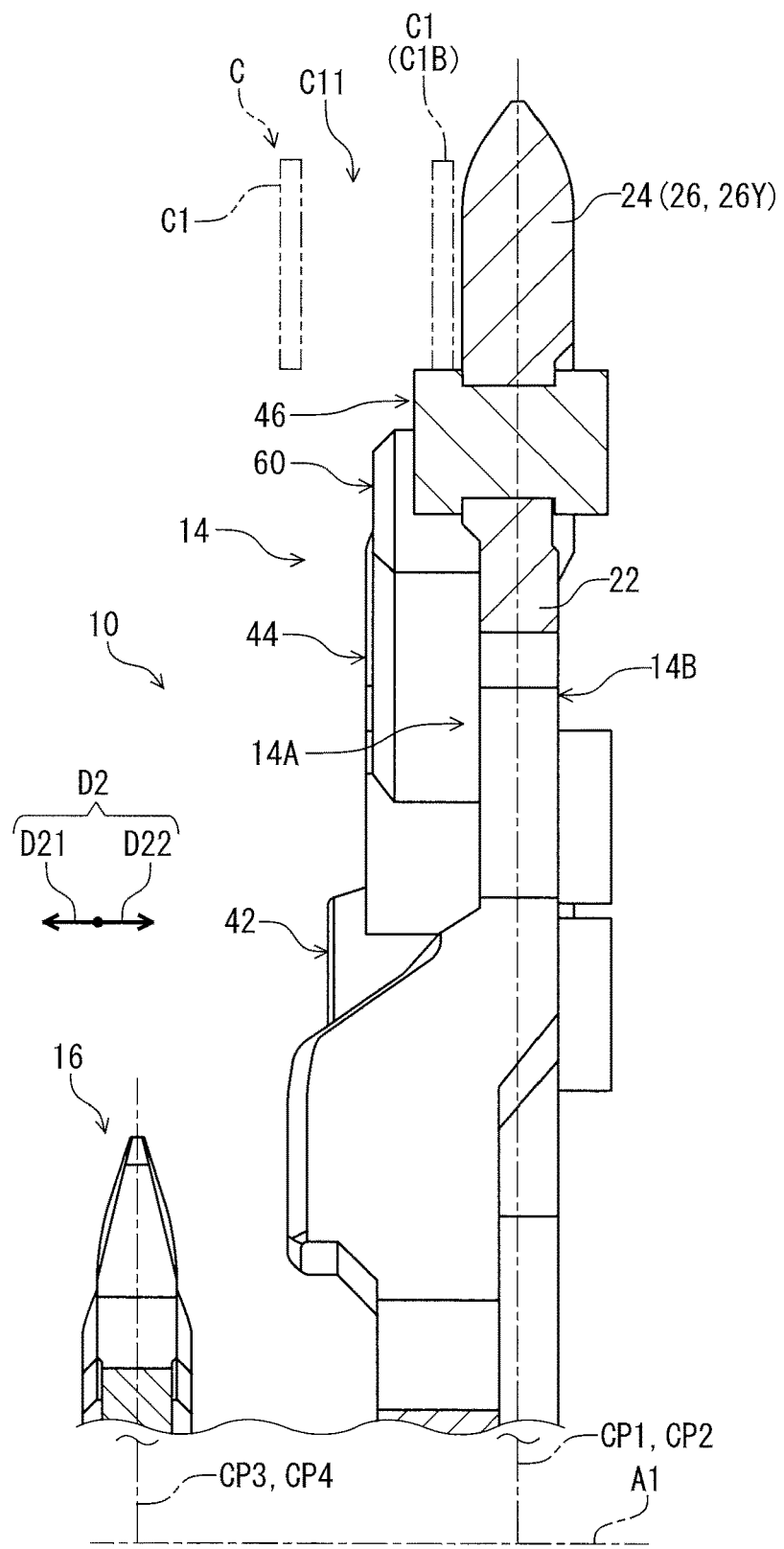
FIG. 40 is a cross-sectional view of the first sprocket taken along line XXXX-XXXX of FIG. 18.

As seen in FIGS. 18 and 40, the outer link plate C1B is engaged with the second shifting facilitation projection 46 to adjust the chain phase of the bicycle chain C for the second sprocket 16 such that the outer link plates C1 of the bicycle chain C is engaged received in the third teeth 36 in the second shifting operation. This facilitates the second shifting operation in which the bicycle chain C is shifted from the first sprocket 14 to the second sprocket 16.

Second Embodiment

A bicycle sprocket assembly 212 in accordance with a second embodiment will be described below referring to FIGS. 41 to 43. The bicycle sprocket assembly 212 has the same structure and/or configuration as those of the bicycle sprocket assembly 212 except for the second shifting facilitation projection 46 and the guide portion 60. Thus, elements having substantially the same function as those in the first embodiment will be numbered the same here, and will not be described and/or illustrated again in detail here for the sake of brevity.

Figure 41:
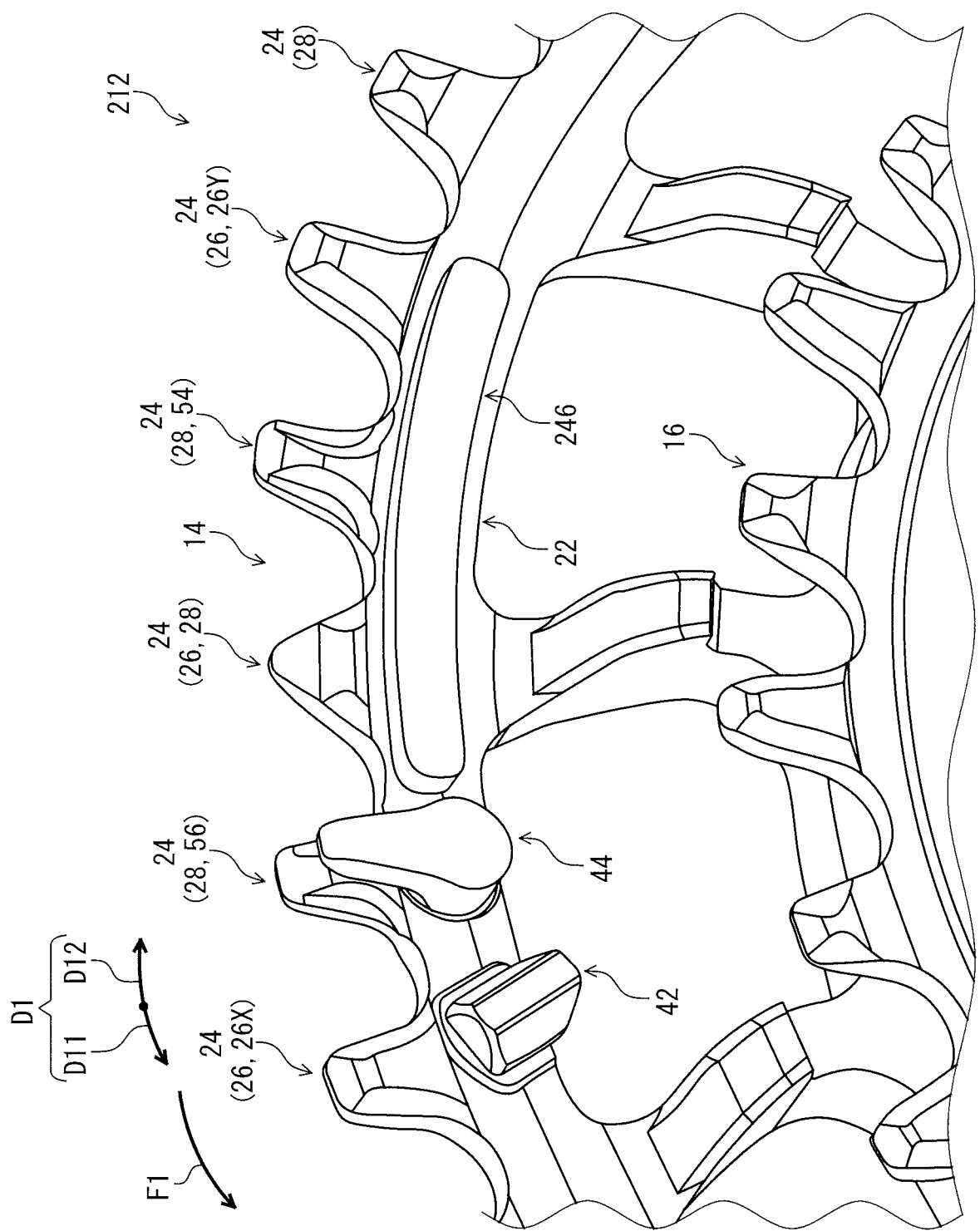
FIG. 41 is a partial perspective view of a bicycle sprocket assembly in accordance with a second embodiment.

As seen in FIG. 41, in the bicycle sprocket assembly 212, the first sprocket 14 comprises a second shifting facilitation projection 246 to facilitate the shifting operation. In this embodiment, the second shifting facilitation projection 246 extends in the circumferential direction D1. The second shifting facilitation projection 246 is provided by forming integrally with the second shifting facilitation projection 46 and the guide portion 60. Thus, the second shifting facilitation projection 246 has substantially the same function as those of the second shifting facilitation projection 46 and the guide portion 60.

Figure 42:
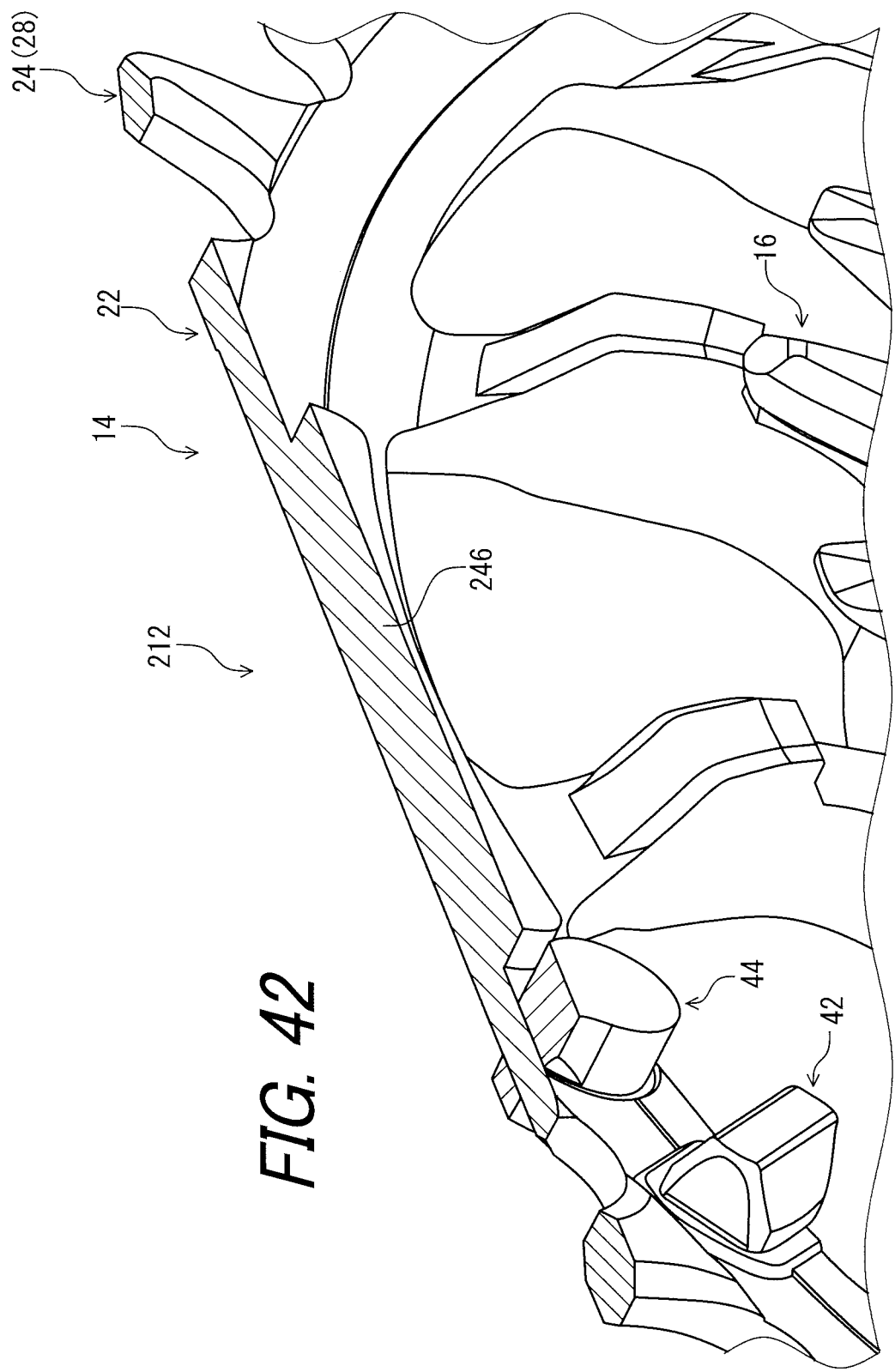
FIG. 42 is a partial perspective view of the bicycle sprocket assembly illustrated in FIG. 41, with a cross-section.

As seen in FIG. 42 that shows a cross sectional view of the shifting facilitation projection 246, the second shifting facilitation projection 246 is provided integrally with the first sprocket body 22. As seen in FIG. 43 that shows a cross sectional view of the shifting facilitation projection 246, however, the second shifting facilitation projection 246 can be a separate member from the first sprocket body 22. In this modification, the second shifting facilitation projection 246 includes a projection body 246A and coupling parts 246B. The coupling parts 246B couple the projection body 246A to the first sprocket body 22. The coupling parts 246B have a structure such as rivets.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket assembly comprising:
   a first sprocket comprising:
      a first sprocket body having a rotational center axis;
      a shifting facilitation area to facilitate a shifting operation in which a bicycle chain is shifted between the first sprocket and a second sprocket adjacent to the first sprocket; and
      a plurality of first sprocket teeth each of which has a maximum axial top width and a maximum axial bottom width, the plurality of first sprocket teeth including:
         a plurality of first teeth configured to engage with an outer link space provided between an opposed pair of outer link plates of the bicycle chain, the plurality of first teeth including:
            a shifting-facilitation tooth extending radially outwardly from the first sprocket body, the shifting-facilitation tooth being provided in the shifting facilitation area, the maximum axial top width of the shifting-facilitation tooth being smaller than the maximum axial bottom width of the shifting-facilitation tooth; and a first driving tooth extending radially outwardly from the first sprocket body, the first driving tooth being provided outside the shifting facilitation area, the maximum axial top width of the shifting-facilitation tooth being smaller than the maximum axial top width of the first driving tooth; and a plurality of second teeth configured to engage with an inner link space provided between an opposed pair of inner link plates of the bicycle chain, the plurality of second teeth including a second driving tooth extending radially outwardly from the first sprocket body, the second driving tooth being provided outside the shifting facilitation area, the plurality of second teeth having the maximum axial width smaller than the maximum axial bottom width of the first driving tooth.

2. The bicycle sprocket assembly according to claim 1, wherein
the shifting-facilitation tooth has a first radial height extending radially outwardly from the first sprocket body to a radially outermost edge of the shifting-facilitation tooth,
the first driving tooth has a second radial height extending radially outwardly from the first sprocket body to a radially outermost edge of the first driving tooth, and
the first radial height is smaller than the second radial height.

3. The bicycle sprocket assembly according to claim 1, wherein
the shifting-facilitation tooth has a first radial height extending radially outwardly from the first sprocket body to a radially outermost edge of the shifting-facilitation tooth,
the second driving tooth has a third radial height extending radially outwardly from the first sprocket body to a radially outermost edge of the second driving tooth, and
the first radial height is smaller than the third radial height.

4. The bicycle sprocket assembly according to claim 1, wherein
the first sprocket comprises a first shifting facilitation projection to facilitate the shifting operation, and
the shifting-facilitation tooth is provided on an upstream side of the first shifting facilitation projection in a first circumferential direction in which the bicycle sprocket assembly is rotated about the rotational center axis during pedaling.

5. The bicycle sprocket assembly according to claim 4, wherein
the shifting-facilitation tooth is spaced apart from the first shifting facilitation projection by a first distance corresponding to two chain pitches of the bicycle chain.

6. The bicycle sprocket assembly according to claim 4, wherein
the shifting-facilitation tooth is configured to be first engaged with an outer link space of the bicycle chain in a first shifting operation in which the bicycle chain is shifted from the second sprocket to the first sprocket, the first sprocket having a first pitch-circle diameter larger than a second pitch-circle diameter of the second sprocket.

7. The bicycle sprocket assembly according to claim 1, wherein the plurality of second teeth includes a derailing tooth configured to first derail the bicycle chain from the first sprocket in a second shifting operation in which the bicycle chain is shifted from the first sprocket to the second sprocket, the first sprocket having a first pitch-circle diameter larger than a second pitch-circle diameter of the second sprocket, and
the shifting-facilitation tooth is provided on a downstream side of the derailing tooth in a first circumferential direction in which the bicycle sprocket assembly is rotated about the rotational center axis during pedaling.

8. The bicycle sprocket assembly according to claim 7, wherein
the shifting-facilitation tooth is adjacent to the derailing tooth in the first circumferential direction without another tooth between the shifting-facilitation tooth and the derailing tooth.

9. The bicycle sprocket assembly according to claim 1, wherein
each of the plurality of first sprocket teeth includes a bottom portion and a top portion extending radially outwardly from the bottom portion, the bottom portion having the maximum axial bottom width of each of the plurality of first sprocket teeth, and the top portion having the maximum axial top width of each of the plurality of first sprocket teeth,
the first sprocket has a reference circle with respect to a rotational center axis of the bicycle sprocket assembly,
the bottom portion is provided radially inwardly of the reference circle, and
the top portion is provided radially outwardly of the reference circle.

10. The bicycle sprocket assembly according to claim 9, wherein
the first sprocket has a first pitch circle, a first outer circle, and a first inner circle,
a first outward distance is defined radially outwardly from the first pitch circle to the first outer circle,
the first outward distance is equal to or smaller than 3 mm,
a first inward distance is defined radially inwardly from the first pitch circle to the first inner circle,
the first inward distance is equal to or smaller than 4 mm, and
the reference circle is provided between the first outer circle and the first inner circle.

11. The bicycle sprocket assembly according to claim 9, wherein
each of the plurality of first teeth includes a first projection provided on one of a first axial side and a second axial side of the bottom portion, the first axial side being a reverse side of the second axial side in an axial direction parallel to the rotational center axis.

12. The bicycle sprocket assembly according to claim 11, wherein
each of the plurality of first teeth includes a second projection provided on another of the first axial side and the second axial side of the bottom portion.

13. The bicycle sprocket assembly according to claim 9, wherein
the bottom portion of the plurality of first teeth includes a first chain-engagement surface, a first bottom driving surface, and a first chamfer provided between the first chain-engagement surface and the first bottom driving surface, the first chain-engagement surface facing in the axial direction, the first bottom driving surface facing in a first circumferential direction in which the bicycle sprocket assembly is rotated about the rotational center axis during pedaling.

14. The bicycle sprocket assembly according to claim 9, wherein
the bottom portion of the plurality of first teeth includes a first chain-engagement surface, a first bottom non-driving surface, and a second chamfer provided between the first chain-engagement surface and the first bottom non-driving surface, the first chain-engagement surface facing in the axial direction, the first bottom non-driving surface facing in a second circumferential direction opposite to a first circumferential direction in which the bicycle sprocket assembly is rotated about the rotational center axis during pedaling.

15. The bicycle sprocket assembly according to claim 1, wherein
the maximum axial bottom width of the shifting-facilitation tooth is substantially equal to the maximum axial bottom width of the first driving tooth.

16. The bicycle sprocket assembly according to claim 1, wherein
the first sprocket comprises a second shifting facilitation projection to facilitate the shifting operation, and
the shifting-facilitation tooth is provided on a downstream side of the second shifting facilitation projection in a first circumferential direction in which the bicycle sprocket assembly is rotated about the rotational center axis during pedaling.

17. The bicycle sprocket assembly according to claim 16, wherein
the shifting-facilitation tooth is spaced apart from the second shifting facilitation projection by a second distance corresponding to two chain pitches of the bicycle chain.

18. The bicycle sprocket assembly according to claim 1, wherein
the maximum axial top width of the shifting-facilitation tooth is smaller than the maximum top with of the second driving tooth.

19. The bicycle sprocket assembly according to claim 1, wherein
each of the plurality of first teeth includes a driving surface and a non-driving surface,
the shifting-facilitation tooth has a first circumferential length defined between the driving surface and the non-driving surface in a circumferential direction of the rotational center axis,
the first driving tooth has a second circumferential length defined between the driving surface and the non-driving surface in the circumferential direction, and
the first circumferential length is smaller than the second circumferential length.

20. The bicycle sprocket assembly according to claim 19, wherein
the driving surface of the plurality of first teeth is arranged in the circumferential direction at a constant pitch.

21. A bicycle sprocket assembly comprising:
a first sprocket comprising:
a first sprocket body having a rotational center axis;
a shifting facilitation area to facilitate a shifting operation in which a bicycle chain is shifted between the first sprocket and a second sprocket adjacent to the first sprocket; and
a plurality of first sprocket teeth made of a first material having a first wear resistance, the plurality of first sprocket teeth including
a plurality of first teeth configured to engage with an outer link space provided between an opposed pair of outer link plates of the bicycle chain; and
a plurality of second teeth configured to engage with an inner link space provided between an opposed pair of inner link plates of the bicycle chain; and
the second sprocket comprising:
a second sprocket body having a rotational center axis; and
a plurality of second sprocket teeth made of a second material having a second wear resistance, a total number of the plurality of second sprocket teeth being smaller than a total number of the plurality of first sprocket teeth, the first wear resistance being greater than the second wear resistance, wherein
the first material includes a metallic material, and
the plurality of first sprocket teeth are not covered by resin.

22. A bicycle sprocket assembly comprising:
a first sprocket having a first pitch-circle diameter, the first sprocket comprising:
a first sprocket body having a rotational center axis;
a shifting facilitation area to facilitate a shifting operation in which a bicycle chain is shifted between the first sprocket and a second sprocket adjacent to the first sprocket; and
a plurality of first sprocket teeth including
a plurality of first teeth having a first maximum axial width, and
a plurality of second teeth having a second maximum axial width smaller than the first maximum axial width; and
the second sprocket having a second pitch-circle diameter smaller than the first pitch circle diameter, the second sprocket comprising:
a second sprocket body having the rotational center axis; and
a plurality of second sprocket teeth including
a plurality of third teeth having a third maximum axial width, at least one tooth of the plurality of third teeth including
a radially outermost edge,
a chain-engagement surface facing in an axial direction parallel to the rotational center axis,
an inclined surface extending from the chain-engagement surface toward the radially outermost edge, the inclined surface being inclined relative to the chain-engagement surface by a first inclination angle which is equal to or larger than 40 degrees,
an additional chain-engagement surface facing in an opposite direction to the chain-engagement surface, and
an additional inclined surface extending from the additional chain-engagement surface toward the radially outermost edge, the additional inclined surface being inclined relative to the additional chain-engagement surface, and
a plurality of fourth teeth having a fourth maximum axial width smaller than the third maximum axial width, wherein
a first imaginary plane is defined along the chain-engagement surface,
a second imaginary plane is defined along the inclination surface,
the first imaginary plane and the second imaginary plane intersecting at a first cross point, a first radial distance is radially defined from a root circle of the at least one tooth of the plurality of third teeth to the first cross point, a third imaginary plane is defined along the additional chain-engagement surface, a fourth imaginary plane is defined along the additional inclination surface, the third imaginary plane and the fourth imaginary plane intersecting at a second cross point, a second radial distance is radially defined from the root circle to the second cross point, and the second radial distance is equal to the first radial distance.

23. The bicycle sprocket assembly according to claim 22, wherein the additional inclined surface is inclined relative to the additional chain-engagement surface by a second inclination angle equal to the first inclination angle.

* * * * *